(12) United States Patent
Kenney et al.

(10) Patent No.: US 8,774,573 B2
(45) Date of Patent: Jul. 8, 2014

(54) OPTICAL DEVICES INCLUDING RESONANT CAVITY STRUCTURES

(75) Inventors: John Kenney, Palo Alto, CA (US); Jian Jim Wang, Orefield, PA (US); William M. Pfenninger, Fremont, CA (US); Nemanja Vockic, San Jose, CA (US); John Midgley, San Carlos, CA (US); Kai Shum, Orefield, PA (US)

(73) Assignee: OMNIPV, Inc., San Carlos, CA (US)

( * ) Notice: Subject to any disclaimer, the term of this patent is extended or adjusted under 35 U.S.C. 154(b) by 1177 days.

(21) Appl. No.: 12/708,507

(22) Filed: Feb. 18, 2010

(65) Prior Publication Data
US 2010/0316331 A1    Dec. 16, 2010

Related U.S. Application Data

(60) Provisional application No. 61/154,256, filed on Feb. 20, 2009, provisional application No. 61/231,586, filed on Aug. 5, 2009.

(51) Int. Cl.
| | |
|---|---|
| G02B 6/26 | (2006.01) |
| G02B 6/30 | (2006.01) |
| G02B 6/42 | (2006.01) |
| G02B 5/00 | (2006.01) |
| G02B 7/00 | (2006.01) |
| G02B 27/00 | (2006.01) |
| G01D 11/28 | (2006.01) |
| G09F 13/00 | (2006.01) |
| F21V 7/04 | (2006.01) |
| F21V 11/00 | (2006.01) |

(52) U.S. Cl.
USPC ............ 385/27; 385/39; 362/23.16; 362/356; 362/551; 362/558; 359/597; 359/894

(58) Field of Classification Search
USPC ........ 385/146; 136/246, 247, 255; 362/23.16, 362/356, 551, 558; 359/597, 894
See application file for complete search history.

(56) References Cited

U.S. PATENT DOCUMENTS

| | | | |
|---|---|---|---|
| 4,184,895 A | 1/1980 | Oster, Jr. | |
| 4,227,939 A | 10/1980 | Zewail et al. | |

(Continued)

FOREIGN PATENT DOCUMENTS

| | | |
|---|---|---|
| WO | WO-03/079457 A1 | 9/2003 |
| WO | WO-2006/088369 A2 | 8/2006 |
| WO | WO2009002943 | 12/2008 |

OTHER PUBLICATIONS

OMNI PV, Inc., PCT/US2010/024825 filed Feb. 19, 2010. Int'l Search Report & Written Opinion (Sep. 27, 2010).

(Continued)

*Primary Examiner* — Ryan Lepisto
*Assistant Examiner* — Erin Chiem
(74) *Attorney, Agent, or Firm* — Foley & Lardner LLP; Cliff Z. Liu

(57) ABSTRACT

Described herein are optical devices including resonant cavity structures. In one embodiment, an optical fiber includes: (1) an elongated core including an outer surface; (2) an inner reflector disposed adjacent to the outer surface of the core and extending substantially along a length of the core; (3) an outer reflector spaced apart from the inner reflector and extending substantially along the length of the core; and (4) an emission layer disposed between the outer reflector and the inner reflector and extending substantially along the length of the core, the emission layer configured to emit radiation that is guided within the optical fiber.

12 Claims, 30 Drawing Sheets

(56) References Cited

U.S. PATENT DOCUMENTS

| | | | |
|---|---|---|---|
| 5,165,005 | A | 11/1992 | Klainer et al. |
| 5,674,325 | A * | 10/1997 | Albright et al. ............... 136/250 |
| 6,476,312 | B1 | 11/2002 | Barnham |
| 7,169,669 | B2 | 1/2007 | Blakers et al. |
| 7,641,815 | B2 | 1/2010 | Varadarajan et al. |
| 2001/0011551 | A1* | 8/2001 | Peumans et al. ............... 136/246 |
| 2004/0223525 | A1 | 11/2004 | Kahen |
| 2005/0272225 | A1 | 12/2005 | Weber et al. |
| 2008/0014463 | A1* | 1/2008 | Varadarajan et al. ......... 428/690 |
| 2008/0121269 | A1 | 5/2008 | Welser |
| 2008/0223438 | A1 | 9/2008 | Xiang |
| 2008/0271776 | A1 | 11/2008 | Morgan |
| 2009/0027872 | A1 | 1/2009 | Debije et al. |
| 2009/0056791 | A1 | 3/2009 | Pfenninger et al. |

OTHER PUBLICATIONS

OMNI PV, Inc., PCT/US2010/024822 filed Feb. 19, 2010. Int'l Search Report & Written Opinion (Sep. 30, 2010).

Kenney, et al. U.S. Appl. No. 12/708,502, filed Feb. 18, 2010 for "Solar Modules Including Spectral Concentrators and Related Manufacturing Methods".

Kenny et al., U.S. Appl. No. 12/708,507, filed Feb. 18, 2010 for "Optical Devices Including Resonant Cavity Structures".

Barnham et al., "Quantum-dot Concentrator and Thermodynamic Model for the Global Redshift," Applied Physics Letters, vol. 76, No. 9, pp. 1197-1199 (2000).

Beard et al., "Multiple Exciton Generation in Colloidal Silicon Nanocrystals," Nano Letters, vol. 7, No. 8, pp. 2506-2512 (2007).

Bender et al., "Synthesis and Fluorescence of Neodymium-Doped Barioum Fluoride Nanoparticles," Chem. Mater. 2000, 12 pp. 1969-1976.

Ema et al., "Huge Exchange Energy and Fine Structure of Excitons in an Organic-Inorganic Quantum Well," Physical Review B, vol. 73, pp. 241310-1 to 241310-4 (2006).

Huang et al., "The Modal Characteristics of ARROW structures," Journal of Lightwave Technology, vol. 10, No. 8, pp. 1015-1022 (1992).

Kagan et al., "Organic-Inorganic Hybrid Materials as Semiconducting Channels in Thin-Film Field-Effect Transistors," Science, vol. 286, pp. 945-947 (1999).

Klepper et al., "Growth of Thin Films of Co3O4 by Atomic Layer Deposition," Thin Solid Films, vol. 515, No. 20-21, pp. 7772-7781 (2007).

Knutson et al., "Tuning the Bandgap in Hybrid Tin Iodide Perovskite Semiconductors Using Structural Templating," Inorg. Chem., vol. 44, pp. 4699-4705 (2005).

Litchinitser et al., "Application of an ARROW Model for Designing Tunable Photonic Devices," Optics Express, vol. 12, No. 8, pp. 1540-1550 (2004).

Liu et al., "Characteristic Equations for Different ARROW Structures," Optical and Quantum Electronics, vol. 31, pp. 1267-1276 (1999).

Mitzi et al., "Conducting Layered Organic-inorganic Halides Containing 110-Oriented Perovskite Sheets," Science, vol. 267, pp. 1473-1476 (1995).

Mitzi, "Solution-processed Inorganic Semiconductors," J. Mater. Chem., vol. 14, pp. 2355-2365 (2004).

Nanu et al., "CuInS2—TiO2 Heterojunctions Solar Cells Obtained by Atomic Layer Deposition," Thin Solid Films, vol. 431-432, pp. 492-496 (2003).

"Refractive Index of Water", from the Physics Factbook, http://hypertextbook.com/facts/2005/AmyHo.shtml, printed Sep. 20, 2013.

Shalav et al., "Luminescent Layers for Enhanced Silicon Solar Cell Performance: Up-conversion," Solar Energy Materials & Solar Cells, vol. 91, pp. 829-842 (2007).

Spiering et al., "Stability Behaviour of Cd-free Cu(In,Ga)Se2 Solar Modules with In2S3 Buffer Layer Prepared by Atomic Layer Deposition," Thin Solid Films, vol. 480-481, pp. 195-198 (2005).

Swartz, "Photon Trapping and Energy Transfer in Multiple-Dye Plastic Matrices: an Efficient Solar-Energy Concentrator;" Optics Letters, vol. 1, p. 73 (1977).

Symonds et al., "Emission of Hybrid Organic-inorganic Exciton Plasmon Mixed States," Applied Physics Letters, vol. 90, Sep. 11, 2007 (2007).

Tanaka et al., "Comparative Study on the Excitons in Lead-halide-based Perovskite-type crystals CH3NH3PbBr3 CH3NH3PbI3," Solid State Communications, vol. 127, pp. 619-623 (2003).

US Office Action on U.S. Appl. No. 12/708,502 Dated Oct. 2, 2013.
US Office Action on U.S. Appl. No. 12/708,502 Dated Feb. 28, 2013.
US Office Action on U.S. Appl. No. 12/708,505 Dated Apr. 24, 2013.
US Office Action on U.S. Appl. No. 12/708,505 Dated Sep. 26, 2013.

Van Sark et al., "Enhancing Solar Cell Efficiency by Using Spectral Converters," Solar Energy Materials & Solar Cells, vol. 87, pp. 395-409 (2005).

Zheng, Xue-Heng, "Theory of Two-Dimensional 'Fingerprint' Resonators," Electronics Letters, 1989, 25, 19, pp. 1311-1312.

Zoubi et al., "Polarization Mixing in Hybrid Organic-Inorganic Microcavities," Organic Electronics, vol. 8, pp. 127-135 (2007).

* cited by examiner

US 8,774,573 B2

OPTICAL DEVICES INCLUDING RESONANT CAVITY STRUCTURES

CROSS-REFERENCE TO RELATED APPLICATIONS

This application claims the benefit of U.S. Provisional Application Ser. No. 61/154,256, filed on Feb. 20, 2009, and the benefit of U.S. Provisional Application Ser. No. 61/231,586, filed on Aug. 5, 2009, the disclosures of which are incorporated herein by reference in their entireties.

FIELD OF THE INVENTION

The invention relates generally to optical devices. More particularly, the invention relates to optical devices including resonant cavity structures.

BACKGROUND

Optical devices are currently used and are contemplated for future use in a number of applications, such as communications, networking, displays, illumination, imaging, quantum computing, medicine, sensing, spectroscopy, weaponry, and so forth. Optical devices can be implemented in a number of forms, such as optical fibers, lasers, light-emitting diodes, optical amplifiers, optical modulators, optical switches, solid-state lighting devices, display devices, and so forth.

For example, a conventional optical fiber can be a glass fiber or a polymer fiber that carries light along its length. The light can be suitably modulated so as to convey information from one end of the optical fiber to another end of the optical fiber. Optical fibers are advantageously used in fiber-optic communications, since the fibers permit transmission of information over longer distances and at higher bandwidths. Compared to, for example, metal wires, optical fibers can allow information to be transmitted with reduced loss and with greater immunity to electromagnetic interference. Optical fibers are also used for illumination, and are sometimes wrapped in bundles to carry images, thus allowing viewing in tight spaces for medical applications. Suitably designed optical fibers are also included in, for example, sensors and lasers.

As various applications continue to expand their need for optical devices, it is becoming increasingly important to introduce new technologies to keep up with growing demands. It is against this background that a need arose to develop the optical devices described herein.

SUMMARY

Embodiments of the invention relate to optical devices, including optical fibers and electro-optical devices including resonant cavity structures. In one embodiment, an optical fiber includes: (1) an elongated core including an outer surface; (2) an inner reflector disposed adjacent to the outer surface of the core and extending substantially along a length of the core; (3) an outer reflector spaced apart from the inner reflector and extending substantially along the length of the core; and (4) an emission layer disposed between the outer reflector and the inner reflector and extending substantially along the length of the core, the emission layer configured to emit radiation that is guided within the optical fiber.

In another embodiment, an electro-optical device includes: (1) an outer electrode layer; (2) an inner electrode layer; and (3) an emission layer disposed between the outer electrode layer and the inner electrode layer, the emission layer including an electroluminescent material having the formula: $[A_aB_bX_x]$, A is selected from potassium, rubidium, and cesium; B is selected from germanium, tin, and lead; X is selected from chlorine, bromine, and iodine; a is in the range of 1 to 9; b is in the range of 1 to 5; and x is equal to a+2b.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings.

DETAILED DESCRIPTION

Overview

Figure 1:
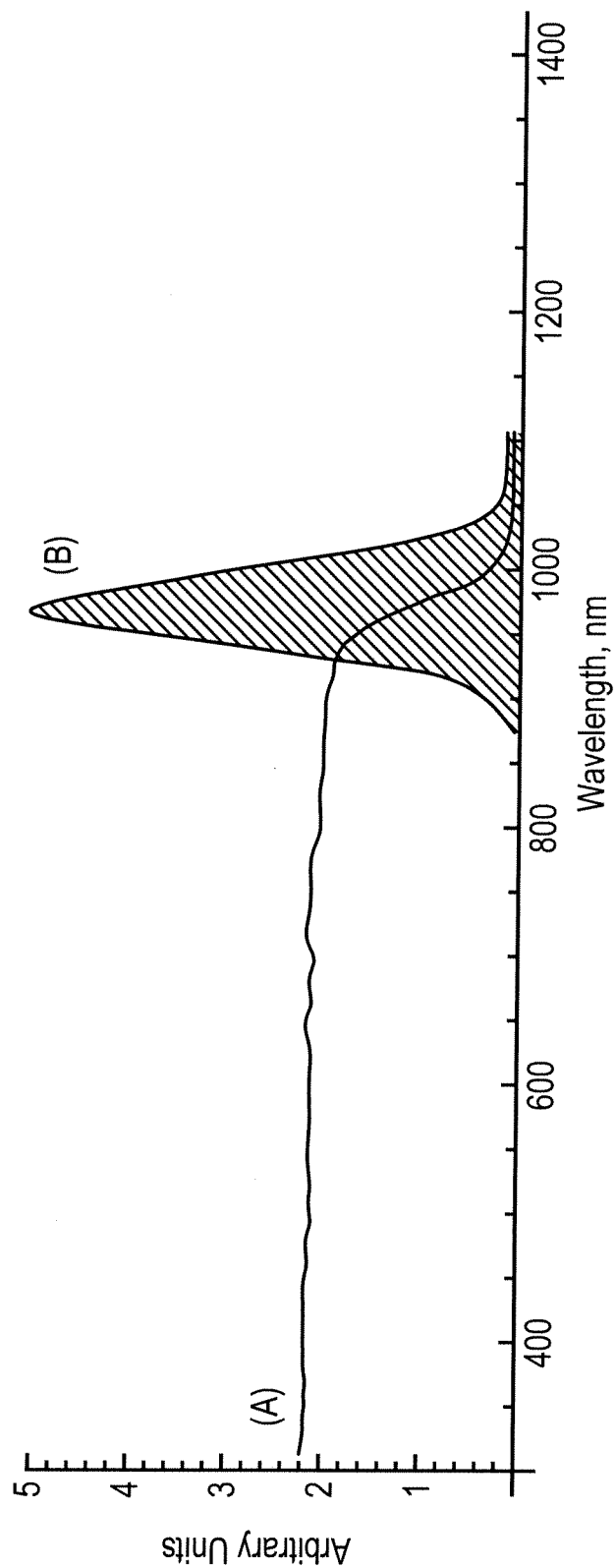
FIG. 1 illustrates a combined representation of measured absorption and emission spectra of UD930 in accordance with an embodiment of the invention.

Embodiments of the invention relate to optical devices including resonant cavity structures. As described herein, improvements in efficiency can be achieved by incorporating a suitable set of luminescent materials within an optical device and by exploiting resonant cavity effects in the design of the optical device.

DEFINITIONS

The following definitions apply to some of the elements described with regard to some embodiments of the invention. These definitions may likewise be expanded upon herein.

As used herein, the singular terms "a," "an," and "the" include plural referents unless the context clearly dictates otherwise. Thus, for example, reference to a luminescent material can include multiple luminescent materials unless the context clearly dictates otherwise.

As used herein, the term "set" refers to a collection of one or more elements. Thus, for example, a set of layers can include a single layer or multiple layers. Elements of a set can also be referred to as members of the set. Elements of a set can be the same or different. In some instances, elements of a set can share one or more common characteristics.

As used herein, the term "adjacent" refers to being near or adjoining. Adjacent elements can be spaced apart from one another or can be in actual or direct contact with one another. In some instances, adjacent elements can be connected to one another or can be formed integrally with one another.

As used herein, the terms "connect," "connected," and "connection" refer to an operational coupling or linking. Connected elements can be directly coupled to one another or can be indirectly coupled to one another, such as via another set of elements.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels of the manufacturing operations described herein.

As used herein, the terms "optional" and "optionally" mean that the subsequently described event or circumstance may or may not occur and that the description includes instances where the event or circumstance occurs and instances in which it does not.

As used herein, relative terms, such as "outer," "inner," "top," "bottom," "middle," "side," "exterior," "external," "interior," "internal," and "vertical," refer to an orientation of a set of elements with respect to one another, such as in accordance with the drawings, but do not require a particular orientation of those elements during manufacturing or use.

As used herein, the term "ultraviolet range" refers to a range of wavelengths from about 5 nm to about 400 nm.

As used herein, the term "visible range" refers to a range of wavelengths from about 400 nm to about 700 nm.

As used herein, the term "infrared range" refers to a range of wavelengths from about 700 nm to about 2 mm. The infrared range includes the "near infrared range," which refers to a range of wavelengths from about 700 nm to about 5 μm, the "middle infrared range," which refers to a range of wavelengths from about 5 μm to about 30 μm, and the "far infrared range," which refers to a range of wavelengths from about 30 μm to about 2 mm.

As used herein, the terms "reflection," "reflect," and "reflective" refer to a bending or a deflection of light, and the term "reflector" refers to an element that causes, induces, or is otherwise involved in such bending or deflection. A bending or a deflection of light can be substantially in a single direction, such as in the case of specular reflection, or can be in multiple directions, such as in the case of diffuse reflection or scattering. In general, light incident upon a material and light reflected from the material can have wavelengths that are the same or different.

As used herein, the terms "luminescence," "luminesce," and "luminescent" refer to an emission of light in response to an energy excitation. Luminescence can occur based on relaxation from excited electronic states of atoms or molecules and can include, for example, chemiluminescence, electroluminescence, photoluminescence, thermoluminescence, triboluminescence, and combinations thereof. Luminescence can also occur based on relaxation from excited states of quasi-particles, such as excitons, bi-excitons, and exciton-polaritons. For example, in the case of electroluminescence, an excited state can be produced based on an electrical excitation, such as an electrical current. As another example, in the case of photoluminescence, which can include fluorescence and phosphorescence, an excited state can be produced based on a light excitation, such as absorption of light. In general, light incident upon a material and light emitted by the material can have wavelengths that are the same or different.

As used herein with respect to photoluminescence, the term "quantum efficiency" refers to a ratio of the number of output photons to the number of input photons. Quantum efficiency of a photoluminescent material can be characterized with respect to its "internal quantum efficiency," which refers to a ratio of the number of photons emitted by the photoluminescent material to the number of photons absorbed by the photoluminescent material. In some instances, a photoluminescent material can be included within a structure that is exposed to a light excitation at an input portion, and the structure can direct, guide, or propagate emitted light towards an output portion. In such instances, another characterization of quantum efficiency can be an "external quantum efficiency" of the structure, which refers to a ratio of the number of photons that reach the output portion to the number of photons that are absorbed by the photoluminescent material within the structure. Alternatively, quantum efficiency of the structure can be characterized with respect to its "overall external quantum efficiency," which refers to a ratio of the number of photons that reach the output portion to the number of photons that are incident upon the input portion. As can be appreciated, an overall external quantum efficiency of a structure can account for potential losses, such as reflection, that reduce the fraction of incident photons that can reach a photoluminescent material. A further characterization of quantum efficiency can be an "energy quantum efficiency," in which the various ratios discussed above can be expressed in terms of ratios of energies, rather than ratios of numbers of photons. An energy-based quantum efficiency can be less than its corresponding photon number-based quantum efficiency in the event of down-conversion, namely if a higher energy photon is absorbed and converted to a lower energy emitted photon.

As used herein with respect to electroluminescence, the term "quantum efficiency" refers to a ratio of the number of output photons to the number of input charge carriers, such as electrons or holes. Quantum efficiency of an electroluminescent material can be characterized with respect to its "internal quantum efficiency," which refers to a ratio of the number of photons emitted by the electroluminescent material to the number of charge carriers flowing through the electroluminescent material. In some instances, an electroluminescent material can be included within a structure to which an electrical current is applied, and the structure can direct, guide, or propagate emitted light towards an output portion. In such instances, another characterization of quantum efficiency can be an "external quantum efficiency" of the structure, which refers to a ratio of the number of photons that reach the output portion to the number of charge carriers that flow through the electroluminescent material within the structure. Alternatively, quantum efficiency of the structure can be characterized with respect to its "overall external quantum efficiency," which refers to a ratio of the number of photons that reach the output portion to the number of charge carriers that flow through the structure. As can be appreciated, an overall external quantum efficiency of a structure can account for potential losses that reduce the fraction of charge carriers that can reach an electroluminescent material. A further characterization of quantum efficiency can be an "energy quantum efficiency," in which the various ratios discussed above can be expressed in terms of ratios of energies, rather than ratios of numbers of photons and charge carriers. An energy-based quantum efficiency can be less than its corresponding number-based quantum efficiency.

As used herein, the term "absorption spectrum" refers to a representation of absorption of light over a range of wavelengths. In some instances, an absorption spectrum can refer to a plot of absorbance (or transmittance) of a material as a function of wavelength of light incident upon the material.

As used herein, the term "emission spectrum" refers to a representation of emission of light over a range of wavelengths. In some instances, an emission spectrum can refer to a plot of intensity of light emitted by a material as a function of wavelength of the emitted light.

As used herein, the term "excitation spectrum" refers to another representation of emission of light over a range of wavelengths. In some instances, an excitation spectrum can refer to a plot of intensity of light emitted by a material as a function of wavelength of light incident upon the material.

As used herein, the term "Full Width at Half Maximum" or "FWHM" refers to a measure of spectral width. In some instances, a FWHM can refer to a width of a spectrum at half of a peak intensity value.

As used herein with respect to an absorption spectrum or an excitation spectrum, the term "substantially flat" refers to being substantially invariant with respect to a change in wavelength. In some instances, a spectrum can be referred to as being substantially flat over a range of wavelengths if absorbance or intensity values within that range of wavelengths exhibit a standard deviation of less than about 20 percent with respect to an average intensity value, such as less than about 10 percent or less than about 5 percent.

As used herein with respect to an emission spectrum, the term "substantially monochromatic" refers to emission of light over a narrow range of wavelengths. In some instances, an emission spectrum can be referred to as being substantially monochromatic if a spectral width is no greater than about 120 nm at FWHM, such as no greater than about 100 nm at FWHM, no greater than about 80 nm at FWHM, or no greater than about 50 nm at FWHM.

As used herein, the term "nanometer range" or "nm range" refers to a range of dimensions from about 1 nm to about 1 µm. The nm range includes the "lower nm range," which refers to a range of dimensions from about 1 nm to about 10 nm, the "middle nm range," which refers to a range of dimensions from about 10 nm to about 100 nm, and the "upper nm range," which refers to a range of dimensions from about 100 nm to about 1 µm.

As used herein, the "micrometer range" or "µm range" refers to a range of dimensions from about 1 µm to about 1 mm. The µm range includes the "lower µm range," which refers to a range of dimensions from about 1 µm to about 10 µm, the "middle µm range," which refers to a range of dimensions from about 10 µm to about 100 µm, and the "upper µm range," which refers to a range of dimensions from about 100 µm to about 1 mm.

As used herein, the term "size" refers to a characteristic dimension of an object. In the case of an object that is spherical, a size of the object can refer to a diameter of the object. In the case of an object that is non-spherical, a size of the object can refer to an average of various orthogonal dimensions of the object. Thus, for example, a size of an object that is a spheroidal can refer to an average of a major axis and a minor axis of the object. When referring to a set of objects as having a particular size, it is contemplated that the objects can have a distribution of sizes around that size. Thus, as used herein, a size of a set of objects can refer to a typical size of a distribution of sizes, such as an average size, a median size, or a peak size.

As used herein, the term "nanoparticle" refers to a particle that has a size in the nm range. A nanoparticle can have any of a variety of shapes, such as box-shaped, cube-shaped, cylindrical, disk-shaped, spherical, spheroidal, tetrahedral, tripodal, tube-shaped, pyramid-shaped, or any other regular or irregular shape, and can be formed from any of a variety of materials. In some instances, a nanoparticle can include a core formed from a first material, which core can be optionally surrounded by a coating or a shell formed from a second material. The first material and the second material can be the same or different. Depending on the configuration of a nanoparticle, the nanoparticle can exhibit size dependent characteristics associated with quantum confinement. However, it is also contemplated that a nanoparticle can substantially lack size dependent characteristics associated with quantum confinement or can exhibit such size dependent characteristics to a low degree.

As used herein, the term "microparticle" refers to a particle that has a size in the µm range. A microparticle can have any of a variety of shapes, such as box-shaped, cube-shaped, cylindrical, disk-shaped, spherical, spheroidal, tetrahedral, tripodal, tube-shaped, pyramid-shaped, or any other regular or irregular shape, and can be formed from any of a variety of materials. In some instances, a microparticle can include a core formed from a first material, which core can be optionally surrounded by a coating or a shell formed from a second material. The first material and the second material can be the same or different.

As used herein, the term "dopant" refers to a chemical entity that is present in a material as an additive or an impurity. In some instances, the presence of a dopant in a material can alter a set of characteristics of the material, such as its chemical, magnetic, electronic, or optical characteristics.

Luminescent Materials

A variety of luminescent materials can be used to form the optical devices described herein. Examples include organic fluorophors, inorganic fluorophors and phosphors, nanoparticles, and semiconductor materials.

Inorganic fluorophors having optical transitions in the range of about 900 nm to about 980 nm, or another range, can be suitable for certain implementations. An inorganic fluorophor having a suitable emission wavelength can be selected based on an atomic moiety involved. For example, inorganic fluorophors with luminescence derived from transition or rare earth atoms can be used. Other examples of inorganic fluorophors include oxides or chalcoginides with luminescence derived from a defect state in a crystal. Inorganic phosphors can also be suitable for certain implementations.

Nanoparticles, such as nanoparticles formed from silicon or germanium, can be useful for certain implementations. The nanoparticles can be formed as self-assembled nanoparticles, such as by vacuum deposition, or as discrete nanoparticles, such as in a colloidal solution. The nanoparticles can be formed with a high internal quantum efficiency for photoluminescence by reducing defect density, typically to less than one defect per nanoparticle. In addition, surfaces of the nanoparticles can be properly terminated to enhance the photoluminescence. Emission wavelength of the nanoparticles can be dependent upon, or controlled by, their sizes. A narrow distribution of sizes can be desirable, so that a resulting spectral width is narrow, and there is reduced self-absorption of emitted light from smaller-sized nanoparticles by larger-sized nanoparticles.

Semiconductor materials, including Group III-V materials, such as indium phosphide or InP and gallium arsenide or GaAs, and Group II-VI materials, such as cadmium selenide or CdSe, cadmium sulfide or CdS, cadmium telluride or CdTe, zinc oxide or ZnO, zinc selenide or ZnSe, zinc sulfide or ZnS, and zinc telluride or ZnTe, with a suitable bandgap energy can also be used. In particular, semiconductor materials with a bandgap energy in the range of about 1.1 eV to about 1.5 eV, such as from about 1.2 eV to about 1.4 eV, at 300K can be suitable in certain implementations.

For example, indium phosphide has a direct, allowed bandgap energy of about 1.35 eV and an absorption coefficient of about $10^5$ cm$^{-1}$. Indium phosphide, or another semiconductor material, can be deposited as a film in a single layer or in multiple layers interspersed with other layers. The other layers can be included for optical and efficiency purposes and for chemical and environmental protection, such as silica and alumina as hermetic sealants. The absorption coefficient of indium phosphide, or another semiconductor material, in certain optical wavelengths can be in the range of about $10^4$ cm$^{-1}$ or greater at energies larger than the bandgap edge. A film thickness in the micrometer range, such as a few micrometers or less, can have an optical density of 2 or more to allow at least about 99 percent of incident radiation to be absorbed. Indium phosphide, or another semiconductor material, can also be deposited into porous matrices or deposited as nanoparticles. For example, indium phosphide can be formed as nanoparticles and dispersed in a matrix such as an optically stable polymer or an inorganic glass. The total amount of absorbing semiconductor material can be equivalent to an optical density of 2 or more to allow at least about 99 percent of incident radiation to be absorbed. Indium phosphide, or another semiconductor material, can be used in an intrinsic form, or can be suitably doped with p-dopants or n-dopants. Use of a resonant cavity structure allows the efficient use of semiconductor materials in the form of thin films. Furthermore, the resonant cavity structure, by modification of a radiation matrix, allows the use of semiconductor materials with forbidden optical transitions and indirect optical transitions in the desired wavelength range. Lower bandgap energy materials can also be made to luminesce by quantum confinement, either in thin films or by formation of nanoparticles.

A new class of luminescent materials is disclosed in U.S. patent application Ser. No. 11/689,381 (now U.S. Pat. No. 7,641,815), entitled "Luminescent Materials that Emit Light in the Visible Range or the Near Infrared Range" and filed on Mar. 21, 2007, the disclosure of which is incorporated herein by reference in its entirety. This class of luminescent materials includes semiconductor materials that can be represented with reference to the formula:

$$[A_a B_b X_x][\text{dopants}] \quad (I)$$

In formula (I), A is selected from elements of Group IA, such as sodium (e.g., as Na(I) or Na$^{1+}$), potassium (e.g., as K(I) or K$^{1+}$), rubidium (e.g., as Rb(I) or Rb$^{1+}$), and cesium (e.g., as Cs(I) or Cs$^{1+}$); B is selected from elements of Group VA, such as vanadium (e.g., as V(III) or V$^{+3}$), elements of Group IB, such as copper (e.g., as Cu(I) or Cu$^{+1}$), silver (e.g., as Ag(I) or Ag$^{+1}$), and gold (e.g., as Au(I) or Au$^{+1}$), elements of Group IIB, such as zinc (e.g., as Zn(II) or Zn$^{+2}$), cadmium (e.g., as Cd(II) or Cd$^{+2}$), and mercury (e.g., as Hg(II) or Hg$^{+2}$), elements of Group IIIB, such as gallium (e.g., as Ga(I) or Ga$^{+1}$), indium (e.g., as In(I) or In$^{+1}$), and thallium (e.g., as Tl(I) or Tl$^{+1}$), elements of Group IVB, such as germanium (e.g., as Ge(II) or Ge$^{+2}$ or as Ge(IV) or Ge$^{+4}$), tin (e.g., as Sn(II) or Sn$^{+2}$ or as Sn(IV) or Sn$^{+4}$), and lead (e.g., as Pb(II) or Pb$^{+2}$ or as Pb(IV) or Pb$^{+4}$), and elements of Group VB, such as bismuth (e.g., as Bi(III) or Bi$^{+3}$); and X is selected from elements of Group VIIB, such as fluorine (e.g., as F$^{-1}$), chlorine (e.g., as CO, bromine (e.g., as Br$^{-1}$), and iodine (e.g., as I$^{-1}$). Still referring to formula (I), a is an integer that can be in the range of 1 to 12, such as from 1 to 9 or from 1 to 5; b is an integer that can be in the range of 1 to 8, such as from 1 to 5 or from 1 to 3; and x is an integer that can be in the range of 1 to 12, such as from 1 to 9 or from 1 to 5. In some instances, a can be equal to 1, and x can be equal to 1+2b. It is also contemplated that one or more of a, b, and x can have fractional values within their respective ranges. It is further contemplated that $X_x$ in formula (I) can be more generally represented as $X_x X'_{x'} X''_{x''}$, where X, X', and X" can be independently selected from elements of Group VIIB, and the sum of x, x', and x" can be in the range of 1 to 12, such as from 1 to 9 or from 1 to 5. With reference to the generalized version of formula (I), a can be equal to 1, and the sum of x, x', and x" can be equal to 1+2b. Dopants optionally included in a luminescent material represented by formula (I) can be present in amounts that are less than about 5 percent, such as less than about 1 percent, in terms of elemental composition, and can derive from reactants that are used to form the luminescent material. In particular, the dopants can include cations and anions, which form electron acceptor/electron donor pairs that are dispersed within a microstructure of the luminescent material. For certain implementations, the luminescent material represented by formula (I) can be suitably doped with p-dopants or n-dopants, such as elements of Group 111B, elements of Group VB, and elements of Group VIB, such as oxygen in a suitable oxidation state.

Luminescent materials represented by formula (I) can be formed via reaction of a set of reactants at high yields and at moderate temperatures and pressures. The reaction can be represented with reference to the formula:

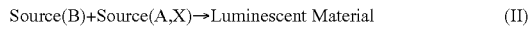

Source(B)+Source(A,X)→Luminescent Material  (II)

In formula (II), source(B) serves as a source of B, and, in some instances, source(B) can also serve as a source of dopants. In the case that B is tin, for example, source(B) can include one or more types of tin-containing compounds selected from tin(II) compounds of the form BY, $BY_2$, $B_3Y_2$, and $B_2Y$ and tin(IV) compounds of the form $BY_4$, where Y can be selected from elements of Group VIB, such as oxygen (e.g., as $O^{-2}$); elements of Group VIIB, such as fluorine (e.g., as $F^{-1}$), chlorine (e.g., as CO, bromine (e.g., as $Br^{-1}$), and iodine (e.g., as $I^{-1}$); and poly-elemental chemical entities, such as nitrate (i.e., $NO_3^{-1}$), thiocyanate (i.e., $SCN^{-1}$), hypochlorite (i.e., $OCl^{-1}$), sulfate (i.e., $SO_4^{-2}$), orthophosphate (i.e., $PO_4^{-3}$), metaphosphate (i.e., $PO_3^{-1}$), oxalate (i.e., $C_2O_4^{-2}$), methanesulfonate (i.e., $CH_3SO_3^{-1}$), trifluoromethanesulfonate (i.e., $CF_3SO_3^{-1}$), and pyrophosphate (i.e., $P_2O_7^{4}$). Examples of tin(II) compounds include tin(II) fluoride (i.e., $SnF_2$), tin(II) chloride (i.e., $SnCl_2$), tin(II) chloride dihydrate (i.e., $SnCl_2.2H_2O$), tin(II) bromide (i.e., $SnBr_2$), tin(II) iodide (i.e., $SnI_2$), tin(II) oxide (i.e., SnO), tin(II) sulfate (i.e., $SnSO_4$), tin(II) orthophosphate (i.e., $Sn_3(PO_4)_2$), tin(II) metaphosphate (i.e., $Sn(PO_3)_2$), tin(II) oxalate (i.e., $Sn(C_2O_4)$), tin(II) methanesulfonate (i.e., $Sn(CH_3SO_3)_2$), tin(II) pyrophosphate (i.e., $Sn_2P_2O_7$), and tin (II) trifluoromethanesulfonate (i.e., $Sn(CF_3SO_3)_2$). Examples of tin(IV) compounds include tin(IV) chloride (i.e., $SnCl_4$), tin(IV) iodide (i.e., $SnI_4$), and tin(IV) chloride pentahydrate (i.e., $SnCl_4.5H_2O$). Still referring to formula (II), source(A, X) serves as a source of A and X, and, in some instances, source(A, X) can also serve as a source of dopants. Examples of source(A, X) include alkali halides of the form AX. In the case that A is cesium, for example, source(A, X) can include one or more types of cesium(I) halides, such as cesium(I) fluoride (i.e., CsF), cesium(I) chloride (i.e., CsCl), cesium(I) bromide (i.e., CsBr), and cesium(I) iodide (i.e., CsI). It is contemplated that different types of source(A, X) can be used (e.g., as source(A, X), source(A, X'), and source(A, X'') with X, X', and X'' independently selected from elements of Group VIIB) to form a resulting luminescent material having mixed halides.

Several luminescent materials represented by formulas (I) and (II) have characteristics that are desirable for the optical devices described herein. In particular, the luminescent materials can exhibit photoluminescence or electroluminescence with a high internal quantum efficiency that is greater than about 6 percent, such as at least about 10 percent, at least about 20 percent, at least about 30 percent, at least about 40 percent, or at least about 50 percent, and can be up to about 90 percent or more. Also, the luminescent materials can exhibit photoluminescence or electroluminescence with a narrow spectral width that is no greater than about 120 nm at FWHM, such as no greater than about 100 nm, no greater than about 80 nm, or no greater than about 50 nm at FWHM. Thus, for example, the spectral width can be in the range of about 20 nm to about 120 nm at FWHM, such as from about 50 nm to about 120 nm, from about 50 nm to about 100 nm, from about 20 nm to about 80 nm, from about 50 nm to about 80 nm, or from about 20 nm to about 50 nm at FWHM. Incorporation of the luminescent materials within a resonant cavity structure can further narrow the spectral width, such as in the range of about 1 nm to about 20 nm or in the range of about 1 nm to about 10 nm at FWHM.

In addition, the luminescent materials can have bandgap energies that are tunable to desirable levels by adjusting reactants and processing conditions that are used. For example, a bandgap energy can correlate with A, with the order of increasing bandgap energy corresponding to, for example, cesium, rubidium, potassium, and sodium. As another example, the bandgap energy can correlate with X, with the order of increasing bandgap energy corresponding to, for example, iodine, bromine, chlorine, and fluorine. This order of increasing bandgap energy can translate into an order of decreasing peak emission wavelength. Thus, for example, a luminescent material including iodine can sometimes exhibit a peak emission wavelength in the range of about 900 nm to about 1 μm, while a luminescent material including bromine or chlorine can sometimes exhibit a peak emission wavelength in the range of about 700 nm to about 800 nm. By tuning bandgap energies, the resulting photoluminescence or electroluminescence can have a peak emission wavelength located within a desirable range of wavelengths, such as the visible range or the infrared range. In some instances, the peak emission wavelength can be located in the near infrared range, such as from about 900 nm to about 1 μm, from about 910 nm to about 1 μm, from about 910 nm to about 980 nm, or from about 930 nm to about 980 nm. Incorporation of the luminescent materials within a resonant cavity structure can shift or otherwise modify the peak emission wavelength and, in some instances, can yield multiple optical modes each associated with a respective peak emission wavelength and with a respective spectral width.

Moreover, the photoluminescence characteristics described above can be relatively insensitive over a wide range of excitation wavelengths. Indeed, this unusual characteristic can be appreciated with reference to excitation spectra of the luminescent materials, which excitation spectra can be substantially flat over a range of excitation wavelengths encompassing portions of the ultraviolet range, the visible range, and the infrared range. In some instances, the excitation spectra can be substantially flat over a range of excitation wavelengths from about 200 nm to about 1 μm, such as from about 200 nm to about 980 nm or from about 200 nm to about 950 nm. Similarly, absorption spectra of the luminescent materials can be substantially flat over a range of excitation wavelengths encompassing portions of the ultraviolet range, the visible range, and the infrared range. In some instances, the absorption spectra can be substantially flat over a range of excitation wavelengths from about 200 nm to about 1 μm, such as from about 200 nm to about 980 nm or from about 200 nm to about 950 nm.

Certain luminescent materials represented by formulas (I) and (II) can also be represented with reference to the formula:

$[A_aSn_bX_x][dopants]$  (III)

In formula (III), A is selected from sodium, potassium, rubidium, and cesium; and X is selected from chlorine, bromine, and iodine. Still referring to formula (III), x is equal to a+2b. In some instances, a can be equal to 1, and x can be equal to 1+2b. Several luminescent materials with desirable characteristics can be represented as $CsSnX_3$ and include materials designated as UD700 and UD930. In the case of UD700, X is bromine, and, in the case of UD930, X is iodine. UD700 exhibits a peak emission wavelength at about 700 nm, while UD930 exhibits a peak emission wavelength in the range of about 940 nm to about 950 nm. The spectral width of UD700 and UD930 is narrow (e.g., about 50 meV or less at FWHM), and the absorption spectrum is substantially flat from the absorption edge into the far ultraviolet. Photoluminescent emission of UD700 and UD930 is stimulated by a wide range of wavelengths up to the absorption edge of these materials at about 700 nm for UD700 and about 950 nm for UD930. The chloride analog, namely $CsSnCl_3$, exhibits a peak emission wavelength at about 450 nm, and can be desirable for certain implementations. Other luminescent materials with desirable characteristics include $RbSnX_3$, such as $RbSnI_3$ that exhibits a peak emission wavelength in the range of about 715 nm to about 720 nm. Each of these luminescent materials can be deposited as a film in a single layer or in multiple layers interspersed with other layers formed from the same luminescent material or different luminescent materials.

lengths that are matched to the reflectors. Furthermore, the absorption spectrum and the emission spectrum of UD930 overlap to a low degree, thereby reducing instances of self-absorption that would otherwise lead to reduced efficiencies.

Other luminescent materials that are suitable in optical devices include $Zn_3P_2$, $Cu_2O$, CuO, CuInGaS, CuInGaSe, $Cu_xS$, CuInSe, $InS_x$, SrS, CaS, PbS, $InSe_x$, and so forth. Additional suitable luminescent materials include $CuInSe_2$ ($E_g$ of about 1.0), $CuInTe_2$ ($E_g$ of about 1.0-1.1), $CuInS_2$ ($E_g$ of about 1.53), $CuAlTe_2$ ($E_g$ of about 1.3-2.2), $CuGaTe_2$ ($E_g$ of about 1.23), $CuGaSe_2$ ($E_g$ of about 1.7), $AgInSe_2$ ($E_g$ of about 1.2), $AgGaSe_2$ ($E_g$ of about 1.8), $AgAlSe_2$ ($E_g$ of about 1.66), $AgInS_2$ ($E_g$ of about 1.8), $AgGaTe_2$ ($E_g$ of about 1.1), $AgAlTe_2$ ($E_g$ of about 0.56), and so forth.

Table I below lists a variety of semiconductor materials that can be used for the optical devices described herein.

TABLE I

Examples of Luminescent Materials

| material | $E_g$ (eV, 300K) | type | material | $E_g$ (eV, 300K) | type |
|---|---|---|---|---|---|
| Ge QD | 0.8 to 1.5 | | $BaSnO_3$ | 1.4 | |
| Si QD | 1.2 to 1.5 | | $CrCa_2GeO_4$ | 1.1 | |
| InP | 1.34 | direct | $LaMnO_3$ | 1.3 | |
| $Ga_xIn_{1-x}As_yP_{1-y}$ | 1.2 to 1.4 | | $Ba_{1-x}Sr_xSi_2$ | 1.2 | |
| CdTe | 1.475 | direct | $BaSi_2$ | 1.3 | direct |
| $Ga_2Te_3$ | 1.2 | direct | $ZnGeAs_2$ | 1.12 | direct |
| $In_2Se_3$ | 1.3 | direct | $CdSnP_2$ | 1.17 | direct |
| InSe | 1.2 | indirect | $Cu_3AsS_4$ | 1.24 | |
| $In_2Te_3$ | 1.1 | direct | $CdIn_2Te_4$ | 1.25 | direct |
| InTe | 1.16 | direct | $Na_3Sb$ | 1.1 | |
| $CuGaTe_2$ | 1.2 | | $K_3Sb$ | 1.1 | |
| $CuInS_2$ | 1.5 | | CuO | 1.4 | indirect |
| $Cu_3In_5Se_9$ | 1.1 | | $Cu_2O$ | 1.4 | forbidden, direct |
| $CuInS_{2-x}Se_x$ | 1.1 to 1.4 | direct | $Cu_2S$ | 1.3 | direct |
| $Ag_3In_5Se_9$ | 1.22 | | $Cu_2Se$ | 1.2 | direct |
| $AgGaTe_2$ | 1.3 | direct | $Cd_4Sb_3$ | 1.4 | |
| $AgInSe_2$ | 1.2 | direct | TlS | 1.36 | direct |
| $CuTlS_2$ | 1.4 | | $BiS_3$ | 1.3 | |
| $Cr_2S_3$ | 1.1 | | $BiI_3$ | 1.35 | |
| $FeP_2$ | 0.4 | | $NiP_2$ | 0.7 | |
| $FeSi_2$ | 0.8 | | SnS | 1.1 | |
| $Mg_2Si$ | 0.8 | | SnSe | 0.9 | |
| $MoS_2$ inte. | <1.4 | | $Ti_{1+x}S_2$ | 0.7 | |
| $MoSe_2$ inte. | <1.2 | | $TiS_{3-x}$ | 0.9 | |
| $WS_2$ inte. | 1.1 | | $Zn_3N_2$ | 1.2 | |
| $Sr_2CuO_2Cl$ | 1.3 | direct | $Ag_8GeS_6$ | 1.39 | |
| $ZnGeP_2$ | 1.3 | direct | $Ag_8SnS_6$ | 1.28 | |
| $Zn_3P_2$ | 1.35 | indirect | $CdInSe_2$ | 1.4 | |
| $Zn_3P_2$ | 1.4 | direct | $HgTlS_2$ | 1.25 | |
| $\beta ZnP_2$ | 1.3 | direct | BiSeI | 1.3 | |
| $KTaO_3$ | 1.5 | | $MgGa_2S_4$ | 1.2 | |

Desirable characteristics of UD930 can be further appreciated with reference to FIG. 1, which illustrates a combined representation of a measured absorption spectrum (referenced as (A)) and a measured emission spectrum (referenced as (B)) of UD930 in accordance with an embodiment of the invention. In particular, UD930 has a peak emission wavelength of about 950 nm (or about 1.3 eV), and the spectral width is about 50 meV at FWHM (or about 37 nm at FWHM). This, in turn, allows the use of reflectors (e.g., above and below an emission layer) that are tuned to reflect emitted radiation back towards the emission layer, without significant reduction of incident optical excitation that can pass through the reflectors and reach the emission layer. Also, the absorption spectrum of UD930 is substantially flat and extends from the absorption edge at about 950 nm through substantially the visible range and into the ultraviolet. As a result, UD930 can broadly absorb a wide range of wavelengths from incident optical excitation, while emitting a narrow range of wave- Absorption and emission characteristics are typically several orders of magnitude lower for semiconductor materials having indirect optical transitions or forbidden optical transitions compared to those materials having direct optical transitions. However, by modification of a radiation matrix, resonant cavity effects can enhance absorption and emission characteristics and allow the use of semiconductor materials having indirect or forbidden optical transitions. Referring to Table I, CuO is an indirect bandgap semiconductor material having a bandgap energy of about 1.4 eV, and $Cu_2O$ has a direct but spin forbidden bandgap energy of about 1.4 eV. By incorporating within a resonant cavity structure, either, or both, CuO and $Cu_2O$ can be used for optical devices. Still referring to Table I, $Zn_3P_2$ has an indirect optical transition of about 50 meV below a direct optical transition of about 1.4 eV. Resonant cavity effects can allow coupling of the indirect optical transition to the higher energy direct optical transition, thereby providing enhanced absorption and emission.

In addition to the characteristics noted above, the semiconductor materials listed in Table I typically have an index of refraction greater than about 3. For example, InP has an index of refraction of about 3.2. Because of internal reflection, less than about 18 percent of light within a luminescent stack can exit to air. In some instances, light incident upon a surface of the luminescent stack can have a Fresnel reflection loss of about 25 percent to air.

To reduce self-absorption of emitted light within a luminescent stack, luminescence can occur via exciton emission. An exciton corresponds to an electron-hole pair, which can be formed as a result of an energy excitation, such as absorption of light. A bound or free exciton can have a Stokes shift equal to an exciton binding energy. Most semiconductor materials have exciton binding energies of less than about 20 meV or less than about 15 meV. Room temperature is about 25 meV, so excitons are typically not present at room temperature for these materials. For certain applications, a binding energy in the range of about 20 meV to about 100 meV or in the range of about 15 meV to about 100 meV can be desirable, such as from about 25 meV to about 100 meV, from about 15 meV to about 25 meV, from about 25 meV to about 50 meV, from about 25 meV to about 35 meV, or from about 35 meV to about 50 meV. An even larger binding energy can sometimes lead to a Stokes shift in the photoluminescence from the absorption edge that results in an absorption gap, which can sometimes lead to lower efficiencies. Semiconductor materials with large exciton binding energies can be incorporated in a resonant cavity structure to yield suppression of emission in a substantially radial direction and stimulated emission along a substantially longitudinal direction of the cavity structure. The larger a Stokes shift, or exciton binding energy, the more tolerant the cavity structure can be with respect to imperfections. Thus, the cavity structure can be readily formed in an inexpensive manner, without resorting to techniques such as Molecular Beam Epitaxy ("MBE"). Thermal quenching, namely the reduction of luminescence intensity with an increase in temperature, can also be reduced or eliminated by generating an exciton with a binding energy greater than the Boltzmann temperature, which is about 25 meV at room temperature. Several semiconductor materials represented by formula (III) have large exciton binding energies. For example, UD930 has an exciton binding energy in the range of about 10 meV to about 50 meV, such as about 30 meV or about 20 meV. Some semiconductor materials, such as CdTe and HgTe, have excitons with large binding energies and are present at room temperature. However, some of these semiconductor materials may be toxic or relatively expensive. Other semiconductor materials have intrinsic excitons at room temperature, such as bismuth triiodide or BiI$_3$, and can be desirable for the optical devices described herein.

Certain layered semiconductor materials, such as tin and lead halides, can have bandgap and exciton energies tuned by separation of inorganic layers with organic components, such as amines or diamines as organic spacers. These hydrid materials can have large binding energies up to several hundred meV's. The large binding energies can allow a strong effect in a resonant cavity structure that is tolerant to defects, roughness, scattering centers, and other imperfections. These hybrid materials can be relatively straightforward to form and be readily coated from solution or in a vacuum, such as using Molecular Layer Deposition ("MLD"). Examples include organic-inorganic quantum well materials, conducting layered organic-inorganic halides containing 110-oriented perovskite sheets, hybrid tin iodide perovskite semiconductor materials, and lead halide-based perovskite-type crystals. Certain aspects of these semiconductor materials are described in Ema et al., "Huge Exchange Energy and Fine Structure of Excitons in an Organic-Inorganic Quantum Well," Physical Review B, Vol. 73, pp. 241310-1 to 241310-4 (2006); Mitzi et al., "Conducting Layered Organic-inorganic Halides Containing 110-Oriented Perovskite Sheets," Science, Vol. 267, pp. 1473-1476 (1995); Kagan et al., "Organic-Inorganic Hybrid Materials as Semiconducting Channels in Thin-Film Field-Effect Transistors," Science, Vol. 286, pp. 945-947 (1999); Mitzi, "Solution-processed Inorganic Semiconductors," J. Mater. Chem., Vol. 14, pp. 2355-2365 (2004); Symonds et al., "Emission of Hybrid Organic-inorganic Exciton Plasmon Mixed States," Applied Physics Letters, Vol. 90, 091107 (2007); Zoubi et al., "Polarization Mixing in Hybrid Organic-Inorganic Microcavities," Organic Electronics, Vol. 8, pp. 127-135 (2007); Knutson et al., "Tuning the Bandgap in Hybrid Tin Iodide Perovskite Semiconductors Using Structural Templating," Inorg. Chem., Vol. 44, pp. 4699-4705 (2005); and Tanaka et al., "Comparative Study on the Excitons in Lead-halide-based Perovskite-type crystals $CH_3NH_3PbBr_3$, $CH_3NH_3PbI_3$," Solid State Communications, Vol. 127, pp. 619-623 (2003), the disclosures of which are incorporated herein by reference in their entireties.

Also, other layered materials, such as tin sulfide, tin selenide, titanium sulfide, and others listed in Table I, can be tuned by intercalating other materials between the layered materials. A suitable deposition technique can be used to make layered materials with tuned bandgap energies and tuned exciton binding energies. Tuning an exciton to higher energy can reduce self-absorption and enhance the probability of lasing. Such material-process combination can be used to develop a low self-absorption luminescent material by tuned exciton luminescent emission. This can be further combined with a resonant cavity structure, in either a weak or strong coupling regime, to produce a low loss, high quantum efficiency structure.

Several semiconductor materials represented by formula (III) can have layered microstructures. For example and without wishing to be bound by a particular theory, UD930 can be polycrystalline with a layered microstructure relative to natural axes of the material. When incorporated within a resonant cavity structure, UD930 can exhibit an exciton emission that forms exciton-polaritons in the cavity structure. The cavity structure can be highly efficient, even though the cavity structure can be formed with relatively low precision and without control at nanometer tolerances. In some instances, the resulting emission can be indicative of a polariton laser operating in a strong coupling regime.

Another way to reduce self-absorption is via the use of orientated birefringence. In particular, one way to reduce self-absorption in a specific direction within a single crystal or film is to orient a birefringent material. Birefringence refers to a different refractive index along two or more different directions of a material. A birefringent material, such as a semiconductor material, has two or more different bandgap energies along different crystal axes. If a crystal anisotropy has a bandgap in the visible region of an optical spectrum, the material can be referred to as being dichoric rather than birefringent. Various birefringent semiconductor materials can be used in optical devices, such as $CuInSe_{2-x}S_x$, $Zn_3N_2$, and perovskites such as $CsSn_{1+x}I_{3+2x}$. Since there are two or more absorption edges or bandgap energies for a birefringent material, a resulting film can be deposited in an oriented state with the higher bandgap energy (i.e., shorter wavelength absorption edge) along a direction facing towards an output portion. In this case, emitted light in the direction facing towards the output portion can have a lower absorbance because the emission wavelength is longer than the higher bandgap energy.

The use of resonant cavity effects and reflectors can suppress emission in other, more highly self-absorbed directions.

Thermal quenching and self-absorption can also be reduced by modifying material characteristics. For semiconductor materials, an absorption edge can become tilted with increasing temperature and certain types of doping. This absorption edge tilt can sometimes lead to increased self-absorption, and can be described by the Elliott equation. Proper doping and interface or surface modification can be used to control this absorption edge tilt to reduce instances of thermal quenching and self-absorption. In the case of nanoparticles formed from a semiconductor material, coatings formed on the nanoparticles can alter emission characteristics of the semiconductor material by the "Bragg Onion" technique.

Multiple photon generation can be used for certain implementations, and, in general, can involve a conversion of $n_i$ photons to $n_j$ photons, where $n_i$ and $n_j$ are integers, and $n_j > n_i$. Multiple photon generation materials can be included in the optical devices described herein, and the use of resonant cavity effects can enhance emission and efficiency of multiple photon generation processes. Examples of multiple photon generation materials include silicon nanoparticles, such as silicon quantum dots, that emit multiple photons. Certain aspects of silicon nanoparticles are described in Beard et al., "Multiple Exciton Generation in Colloidal Silicon Nanocrystals," Nano Letters, Vol. 7, No. 8, pp. 2506-2512 (2007), the disclosure of which is incorporated herein by reference in its entirety.

Also, a quantum cutting material can exhibit down-conversion by absorbing one shorter wavelength photon and emitting two or more longer wavelength photons, while a down-shifting material can exhibit down-conversion by absorbing one shorter wavelength photon and emitting one longer wavelength photon. Quantum cutting, in general, can involve a conversion of $n_i$ photons to $n_j$ photons, where $n_i$ and $n_j$ are integers, and $n_j > n_i$. Quantum cutting materials and down-shifting materials can be included in the optical devices described herein, such as in the form of oxides or chalcogenides with luminescence derived from a set of rare earth atoms or transition metal atoms via doping or co-doping, and the use of resonant cavity effects can enhance emission and efficiency of quantum cutting and down-shifting processes. For example, certain transition metals, such as chromium (e.g., as Cr(III)), titanium (e.g., as Ti(II)), copper (e.g., as Cu(I) or Cu(II)), and iron (e.g., as Fe(III)), can be used for down-shifting, and certain lanthanides, such as terbium and ytterbium, can be used for quantum cutting when incorporated within a suitable matrix or as a component film. Ytterbium can also be incorporated within $CsSnCl_3$, or another suitable material, and undergo quantum cutting by energy transfer from $CsSnCl_3$ to ytterbium with emission at about 980 nm. A similar energy transfer to ytterbium can occur when both terbium and ytterbium are doped into UD930. Other examples of desirable materials include zinc oxide (i.e., ZnO) doped with aluminum having a suitable oxidation state, zinc sulfide (i.e., ZnS) doped with manganese or magnesium having a suitable oxidation state, aluminum oxide or alumina (i.e., $Al_2O_3$) doped with erbium, chromium, or titanium having a suitable oxidation state, zirconium oxide (i.e., $ZrO_2$) doped with yttrium having a suitable oxidation state, strontium sulfide (i.e., SrS) doped with cerium having a suitable oxidation state, titanium oxide (i.e., $TiO_2$) doped with a suitable rare earth atom, and silicon dioxide (i.e., $SiO_2$) doped with a suitable rare earth atom.

Up-conversion can involve a process where two photons are absorbed and one photon is emitted at a higher energy. Rare earth atoms can be relatively efficient at undergoing up-conversion, and other processes, such as Second Harmonic Generation ("SHG") at relatively high intensities, can also be used. Up-conversion materials can be included in the optical devices described herein, such as in the form of oxides or chalcoginides with luminescence derived from a set of rare earth atoms via doping or co-doping. The use of resonant cavity effects can enhance emission and efficiency of up-conversion and non-linear processes such as SHG. Certain aspects of up-conversion are described in Sark et al., "Enhancing Solar Cell Efficiency by Using Spectral Converters," Solar Energy Materials & Solar Cells, Vol. 87, pp. 395-409 (2005); and Shalav et al., "Luminescent Layers for Enhanced Silicon Solar Cell Performance: Up-conversion," Solar Energy Materials & Solar Cells, Vol. 91, pp. 829-842 (2007), the disclosures of which are incorporated herein by reference in their entireties.

Optical Fibers

Figure 2:
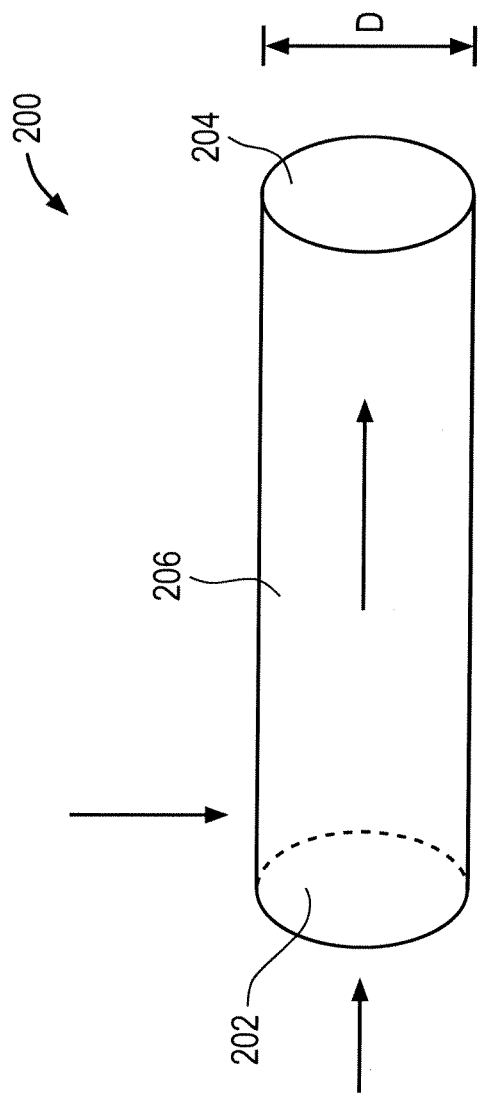
FIG. 2 illustrates an optical fiber implemented in accordance with an embodiment of the invention.

FIG. 2 illustrates an optical fiber 200 implemented in accordance with an embodiment of the invention. In the illustrated embodiment, the optical fiber 200 is formed as an elongated structure having an end surface 202, which corresponds to an input end, and another end surface 204, which corresponds to an output end and faces away from the end surface 202. Extending between the end surfaces 202 and 204 is an outer surface 206, which has a non-planar shape and defines a circumference or a radial boundary of the optical fiber 200. While the optical fiber 200 is illustrated as shaped in the form of a circular cylinder or having a rod shape, it is contemplated that the shape of the optical fiber 200, in general, can be any of a number of shapes, including other types of cylindrical shapes, such as an elliptic cylinder, a square cylinder, and a rectangular cylinder, non-cylindrical shapes, such as a cone, a funnel, and other tapered shapes, and combinations of cylindrical shapes and non-cylindrical shapes, such as cylindrical shapes with tapered ends. For certain implementations, a radial extent D of the optical fiber 200, such as a cross-sectional diameter, can be in the μm range, on the order of a few millimeters, or on the order of a few centimeters. If the optical fiber 200 has a non-uniform cross-section, the radial extent D can correspond to, for example, an average of radial extents along orthogonal, radial directions. While the single optical fiber 200 is illustrated in FIG. 2, it is contemplated that the number of optical fibers can vary for other implementations, such as by including another optical fiber with an end surface adjacent to the end surface 204 of the optical fiber 200 or by including another optical fiber with an outer surface adjacent to the outer surface 206 of the optical fiber 200.

Referring to FIG. 2, the optical fiber 200 includes a set of luminescent materials that converts a particular range of energies of incident radiation into a set of relatively narrow, substantially monochromatic energy bands. During operation of the optical fiber 200, incident radiation strikes either, or both, of the end surface 202 and the outer surface 206 of the optical fiber 200, and a certain fraction of this incident radiation is absorbed and converted into substantially monochromatic, emitted radiation. This emitted radiation is guided longitudinally within the optical fiber 200, and a certain fraction of this emitted radiation reaches the end surface 204. By modulating incident radiation, emitted radiation is suitably modulated so as to convey information from one end of the optical fiber 200 to another end of the optical fiber 200.

In effect, the optical fiber 200 performs a set of operations, including: (1) collecting incident radiation; (2) converting the incident radiation into substantially monochromatic, emitted radiation; and (3) conveying the emitted radiation along a length of the optical fiber 200. The optical fiber 200 can include distinct structures that are optimized or otherwise tailored towards respective ones of the collection, conversion, and conveyance operations. Alternatively, certain of these operations can be implemented within a common structure. These operations that are performed by the optical fiber 200 are further described below.

Collection refers to capturing or intercepting incident radiation in preparation for conversion to emitted radiation. Collection efficiency of the optical fiber 200 can depend upon the amount and distribution of a luminescent material within the optical fiber 200. In some instances, the luminescent material can be viewed as a set of luminescent centers that can intercept incident radiation, and a greater number of luminescent centers typically increases the collection efficiency. Depending upon the distribution of the luminescent centers, collection of incident radiation can occur in a distributed fashion throughout the optical fiber 200, or can occur within one or more regions of the optical fiber 200. The collection efficiency can also depend upon other aspects of the optical fiber 200, including the ability of incident radiation to reach the luminescent material and the positioning and extent of an incident radiation collection area, as represented by, for example, an area of the end surface 202 or the outer surface 206.

Conversion refers to emitting radiation in response to incident radiation, and the efficiency of such conversion refers to the probability that an absorbed incident photon is converted into an emitted photon. Conversion efficiency of the optical fiber 200 can depend upon photoluminescence characteristics of a luminescent material, including its internal quantum efficiency, but can also depend upon interaction of luminescent centers with their local optical environment, including via resonant cavity effects. Depending upon the distribution of the luminescent centers, conversion of incident radiation can occur in a distributed fashion throughout the optical fiber 200, or can occur within one or more regions of the optical fiber 200. Also, depending upon the particular luminescent material used, the conversion efficiency can depend upon wavelengths of incident radiation that are absorbed by the luminescent material.

Conveyance refers to guiding or propagation of emitted radiation along the length of the optical fiber 200, and the efficiency of such conveyance refers to the probability that an emitted photon reaches the end surface 204. Conveyance efficiency of the optical fiber 200 can depend upon photoluminescence characteristics of a luminescent material, including a degree of overlap between emission and absorption spectra, but can also depend upon interaction of luminescent centers with their local optical environment, including via resonant cavity effects.

By performing these operations, the optical fiber 200 can be advantageously used in fiber-optic communications, by permitting transmission of information over long distances, at high bandwidths, and with reduced loss and greater immunity to electromagnetic interference. The optical fiber 200 can be used for a number of other applications, such as for illumination and medical applications. The optical fiber 200 can also be suitably designed for inclusion in, for example, optical amplifiers, optical modulators, optical switches, sensors, and lasers, such as optically pumped lasers.

Figure 3:
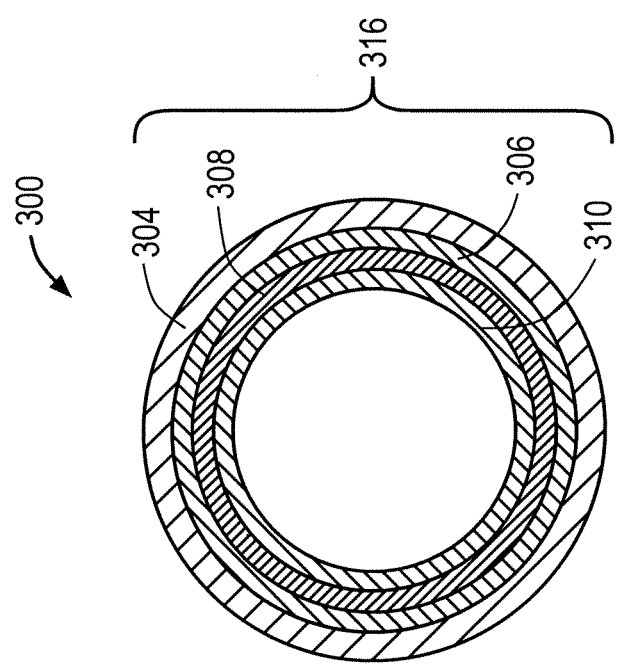
FIG. 3 illustrates a cross-sectional, radial view of an optical fiber implemented in accordance with an embodiment of the invention.
Figure 4A:
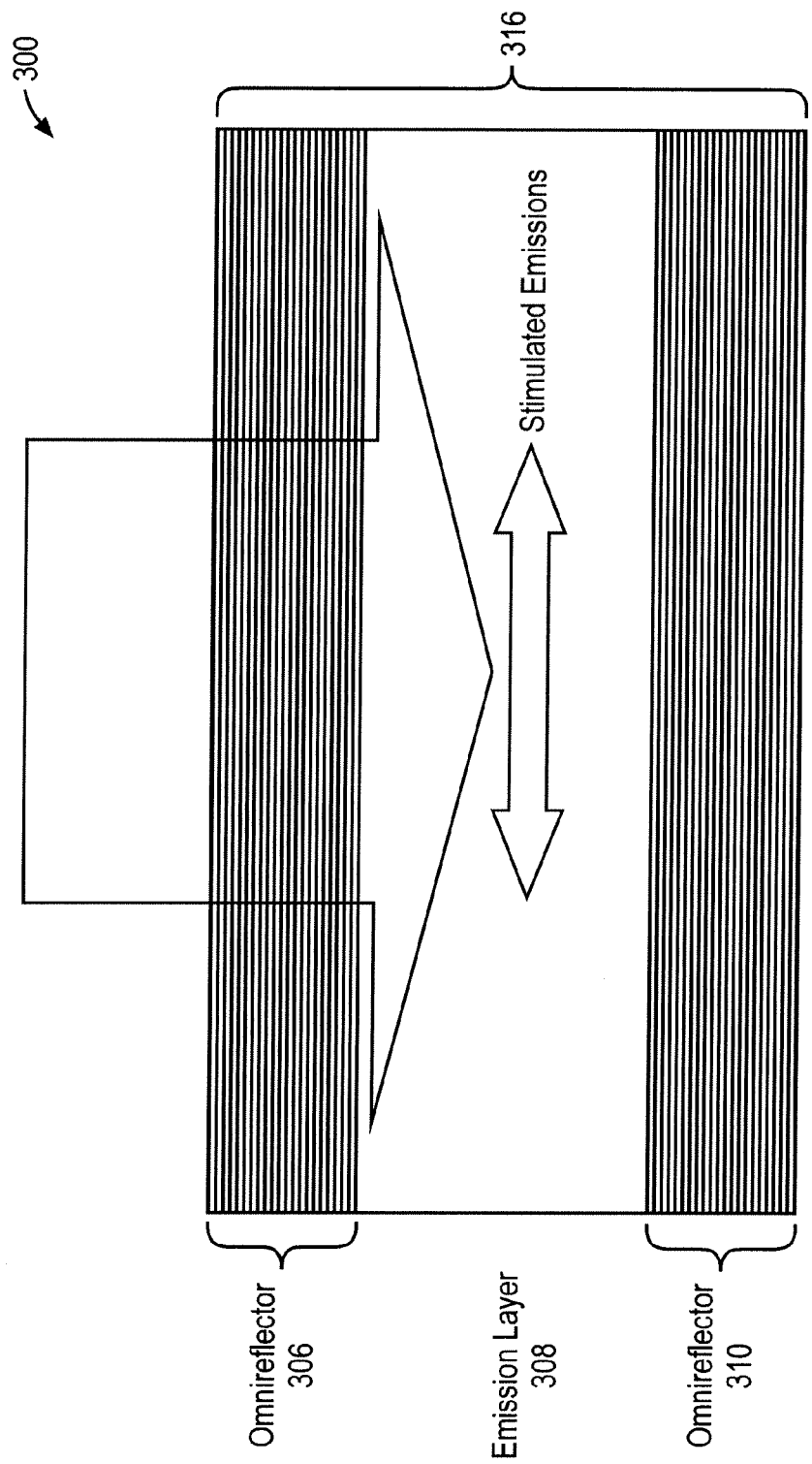
FIG. 4A and FIG. 4B illustrate a cross-sectional, longitudinal view of a portion of the optical fiber of FIG. 3.
Figure 4B:
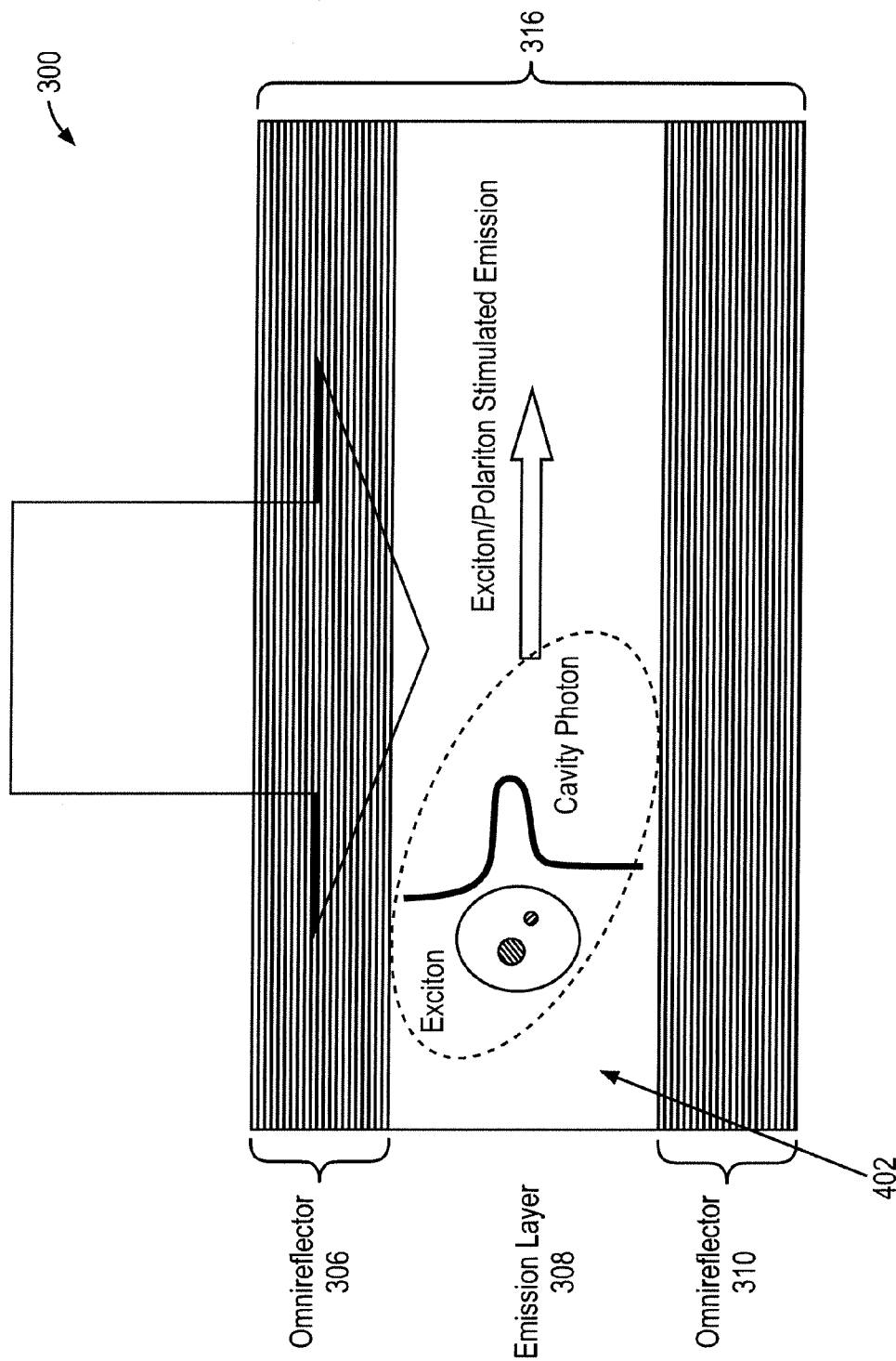

FIG. 3, FIG. 4A, and FIG. 4B illustrate an optical fiber 300 implemented in accordance with an embodiment of the invention. In particular, FIG. 3 illustrates a cross-sectional, radial view of the optical fiber 300, and FIG. 4A and FIG. 4B illustrate a cross-sectional, longitudinal view of the optical fiber 300.

Referring to FIG. 3, the optical fiber 300 includes an outer substrate 304, which faces an exterior environment and is formed from a glass, a metal, a ceramic, a polymer, or another suitable material. For certain implementations, the outer substrate 304 can be formed from a suitable material that is optically transparent or translucent. In the illustrated embodiment, the outer substrate 304 serves as a cladding or a covering, and is formed as an elongated, hollow structure having a tubular shape with an annular cross-section defined by outer and inner circumferences. While both the outer and inner circumferences of the outer substrate 304 are illustrated as shaped in the form of circles, it is contemplated that the shapes of the outer and inner circumferences, in general, can be the same or different, and can be any of a number of shapes, such as elliptical, square-shaped, rectangular-shaped, and other polygonal and non-polygonal shapes. It is also contemplated that the outer substrate 304 can be optionally omitted for certain implementations.

Disposed within a hollow cavity defined by the outer substrate 304 is an inner substrate 302, which is formed from a glass, a metal, a ceramic, a polymer, or another suitable material. For certain implementations, the inner substrate 302 can be formed as a metal wire, such as a copper wire. In the illustrated embodiment, the inner substrate 302 serves as a structural core, and is formed as an elongated, solid structure having a rod shape with a cross-section defined by an outer circumference. While the outer circumference of the inner substrate 302 is illustrated as shaped in the form of a circle, it is contemplated that the shape of the outer circumference, in general, can be any of a number of shapes, such as elliptical, square-shaped, rectangular-shaped, and other polygonal and non-polygonal shapes. Also, while the inner substrate 302 and the outer substrate 304 are illustrated as substantially concentric, it is contemplated that a relative positioning of the inner substrate 302 and the outer substrate 304 can vary for other implementations.

As illustrated in FIG. 3, the optical fiber 300 also includes a luminescent stack 316, which is disposed within an annular cavity defined by the inner substrate 302 and the outer substrate 304, and is formed adjacent to an outer surface of the inner substrate 302 and adjacent to an inner surface of the outer substrate 304. By conforming to the shapes of the inner substrate 302 and the outer substrate 304, the luminescent stack 316 takes on a tubular shape, although it is contemplated that the shape of the luminescent stack 316 can vary for other implementations.

Certain aspects of the luminescent stack 316 are described next with reference to FIG. 3, in conjunction with FIG. 4A and FIG. 4B. In the illustrated embodiment, the luminescent stack 316 includes an emission layer 308, which includes a set of luminescent materials that is optically excited (through absorption of incident radiation) and emits radiation in a set of substantially monochromatic energy bands. In particular, the emission layer 308 is configured to perform down-conversion, such that incident radiation with higher energies is absorbed and converted into emitted radiation with lower energies. It is also contemplated that the emission layer 308 can be configured to perform up-conversion, such that incident radiation with lower energies is absorbed and converted into emitted radiation with higher energies. Emitted radiation is guided within the emission layer 308 and is directed towards an output end. By selecting a set of luminescent materials having desirable characteristics, a thickness of the emission layer 308 (along a radial direction) can be reduced, such as in the range of about 0.01 µm to about 2 µm, in the range of about 0.05 µm to about 1 µm, in the range of about 0.1 µm to about 1 µm, or in the range of about 0.1 µm to about 0.5 µm.

Referring to FIG. 3, FIG. 4A, and FIG. 4B, the emission layer 308 is sandwiched by an outer reflector 306 and an inner reflector 310, which are adjacent to an outer surface and an inner surface of the emission layer 308, respectively. This pair of reflectors 306 and 310 serve to reduce loss of emitted radiation out of the luminescent stack 316 as the emitted radiation is guided towards the output end. In the illustrated embodiment, each of the outer reflector 306 and the inner reflector 310 is omnireflective over emission wavelengths of the emission layer 308, thereby reducing loss of emitted radiation. Stated in another way, each of the outer reflector 306 and the inner reflector 310 has narrowband reflectivity with respect to emission wavelengths. It is contemplated that the reflectivity of the outer reflector 306 and the inner reflector 310 can vary for other implementations.

In the illustrated embodiment, each of the outer reflector 306 and the inner reflector 310 is implemented as a dielectric stack, including multiple dielectric layers and with the number of dielectric layers in the range of 2 to 1,000, such as in the range of 2 to 100, in the range of 30 to 90, or in the range of 30 to 80. Each dielectric layer can have a thickness (along a radial direction) in the range of about 0.001 µm to about 0.2 µm, such as in the range of about 0.01 µm to about 0.15 µm or in the range of about 0.01 µm to about 0.1 µm. Depending on the number of dielectric layers forming the outer reflector 306 and the inner reflector 310, a thickness (along a radial direction) of each of the outer reflector 306 and the inner reflector 310 can be in the range of about 0.1 µm to about 20 µm, such as in the range of about 1 µm to about 15 µm or in the range of about 1 µm to about 10 µm. For certain implementations, a dielectric stack can include multiple layers formed from different dielectric materials. Layers formed from different materials can be arranged in a periodic fashion, such as in an alternating fashion, or in a non-periodic fashion. Examples of dielectric materials that can be used to form the outer reflector 306 and the inner reflector 310 include oxides, such as silica (i.e., $SiO_2$ or $\alpha$-$SiO_2$), alumina (i.e., $Al_2O_3$), $TiO_2$, $Ta_2O_5$, $Nb_2O_5$, $ZrO_2$, $HfO_2$, $SnO_2$, $ZnO_2$, $La_2O_3$, $Y_2O_3$, $CeO_2$, $Sc_2O_3$, $Er_2O_3$, $V_2O_5$, and $In_2O_3$; nitrides, such as $SiO_xN_{2-x}$; fluorides, such as $CaF_2$, $SrF_2$, $ZnF_2$, $MgF_2$, $LaF_3$, and $GdF_2$; nanolaminates, such as $HfO_2/Ta_2O_5$, $TiO_2/Ta_2O_5$, $TiO_2/Al_2O_3$, $ZnS/Al_2O_3$, and AlTiO; and other suitable thin-film dielectric materials. Desirably, different materials forming a dielectric stack have different refractive indices so as to form a set of high index layers and a set of low index layers that are interspersed within the dielectric stack. For certain implementations, an index contrast in the range of about 0.3 to about 1 or in the range of about 0.3 to about 2 can be desirable. For example, $TiO_2$ and $SiO_2$ can be included in alternating layers of a dielectric stack to provide a relatively large index contrast between the layers. A larger index contrast can yield a larger stop band with respect to emitted radiation, thereby approaching the performance of an ideal omnireflector. In addition, a larger index contrast can yield a greater angular tolerance for reflectivity with respect to incident radiation, and can reduce a leakage of emitted radiation at larger angles from a normal direction. Either, or both, of the outer reflector 306 and the inner reflector 310 can be designed for relatively athermal behavior and can be matched to the emission layer 308 in terms of index changes with temperature and in terms of coefficient of thermal expansion.

Figure 5:
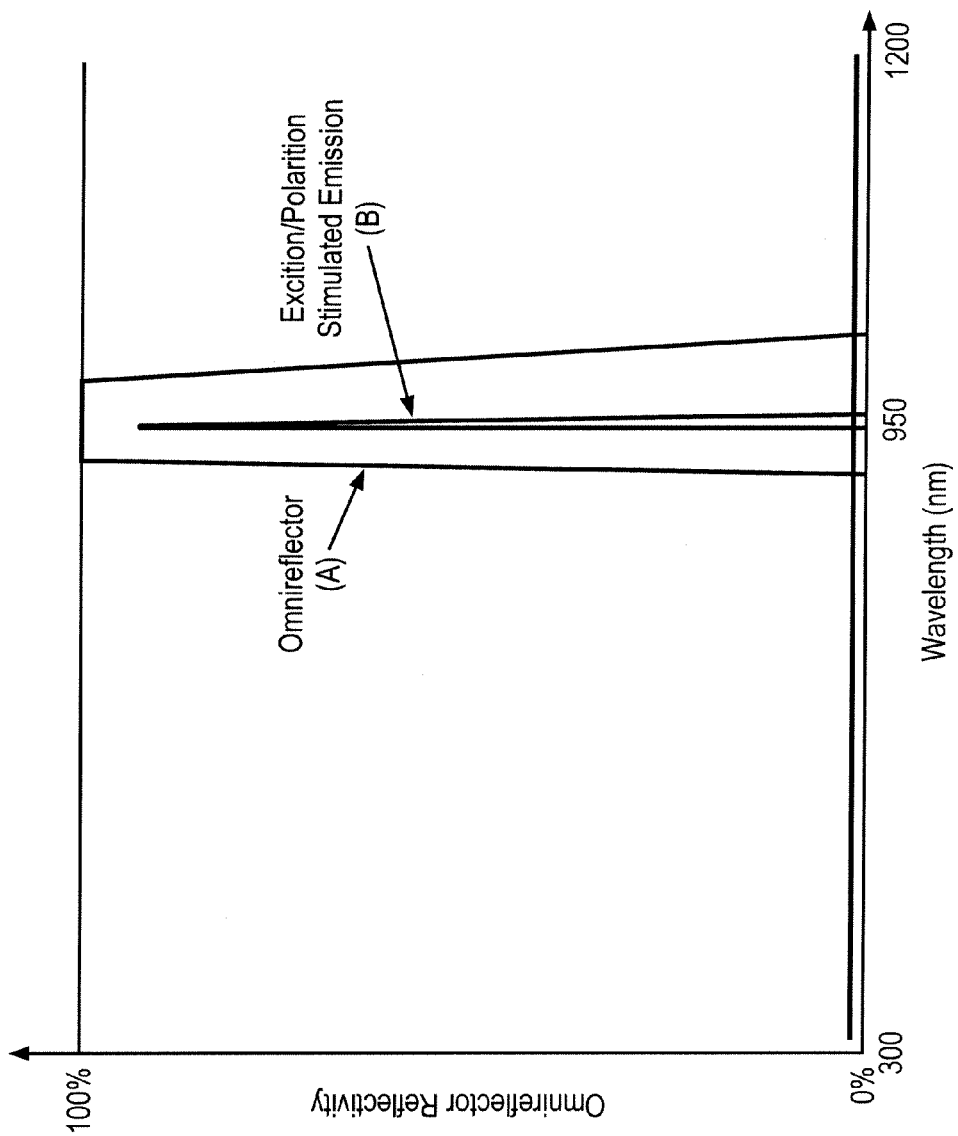
FIG. 5 illustrates a combined representation of an emission spectrum of an emission layer and a reflectivity spectrum of a reflector in accordance with an embodiment of the invention.

Desirable characteristics of the outer reflector 306 and the inner reflector 310 can be further appreciated with reference to FIG. 5, which illustrates a combined representation of an emission spectrum (referenced as (B)) of the emission layer 308 and a reflectivity spectrum (referenced as (A)) of either, or both, of the outer reflector 306 and the inner reflector 310. In particular, the reflectivity spectrum has a narrow stop band of relatively low transmittance (or relatively high reflectivity) centered around the peak emission wavelength (about 950 nm in the illustrated embodiment), and a wide transmission band of relatively high transmittance (or relatively low reflectivity) outside of the stop band, with a steep and distinct transition from the stop band to the transmission band. By selecting suitable materials and processing conditions, characteristics of the stop band, the transmission band, and the transition between the stop band and the transmission band can be optimized or otherwise tuned for various implementations. For certain implementations, the stop band has a reflectivity that is at least about 90 percent, such as at least about 97 percent, at least about 98 percent, or at least about 99 percent, and up to about 99.5 percent or 100 percent, with a spectral width or a bandwidth in the range of about 10 nm to about 100 nm at FWHM, such as in the range of about 30 nm to about 100 nm, in the range of about 30 nm to about 50 nm, or in the range of about 50 nm to about 100 nm. Within this bandwidth, the reflectivity can substantially lack angular dependence, and can apply for a wide range of angles relative to a normal direction, such as ±89°, ±70°, ±45°, +30°, ±20°, or ±10°. Also, the transmission band has a reflectivity that is no greater than about 40 percent, such as no greater than about 30 percent, no greater than about 20 percent, or no greater than about 10 percent, and down to about 5 percent or 1 percent, over a wide range of wavelengths encompassing the visible range and up to the transition between the stop band and the transmission band. Within this range of wavelengths, the reflectivity can substantially lack angular dependence, and can apply for a wide range of angles relative to the normal direction. By implementing in such manner, the outer reflector 306 and the inner reflector 310 can be tuned to reflect emitted radiation back towards the emission layer 308, without significant reduction of other relevant wavelengths that can pass through the outer reflector 306 and the inner reflector 310 and reach the emission layer 308. In such manner, the emission layer 308 can be optically excited through either, or both, of the outer reflector 306 and the inner reflector 310, while emitted radiation is substantially blocked from passing through the outer reflector 306 and the inner reflector 310.

Referring back to FIG. 4A and FIG. 4B, aspects of Cavity Quantum Electrodynamics can be used to implement the luminescent stack 316 as a micro-cavity or a resonant cavity structure. The resulting resonant cavity effects can provide a number of benefits. For example, resonant cavity effects can be exploited to control a direction of emitted radiation towards an output end and, therefore, enhance the fraction of emitted radiation reaching the output end. This directional control can involve suppressing emission for optical modes in non-guided directions, while allowing or enhancing emission for optical modes in guided directions towards the output end. In such manner, there can be a significant reduction in loss of emitted radiation via a loss cone. Also, resonant cavity effects can be exploited to modify emission characteristics, such as by enhancing emission of a set of wavelengths associated with certain optical modes and suppressing emission of another set of wavelengths associated with other optical modes. This modification of emission characteristics can reduce an overlap between an emission spectrum and an absorption spectrum via spectral pulling, and can reduce losses arising from self-absorption. This modification of emission characteristics can also yield a larger exciton binding energy, and can promote luminescence via exciton emission. In addition, resonant cavity effects can enhance absorption and emission characteristics of a set of luminescent materials, and can allow the use of semiconductor materials having indirect optical transitions or forbidden optical transitions. This enhancement of absorption and emission characteristics can involve optical gain as well as amplified spontaneous emission, such as via the Purcell effect. In some instances, the high intensity of emitted radiation within the luminescent stack 316 can lead to stimulated emission and lasing, which can further reduce losses as emitted radiation is guided towards the output end.

In the illustrated embodiment, a local density of optical states within the emission layer 308 can include both guided optical modes and radiative optical modes. Guided optical modes can involve propagation of emitted radiation along a substantially longitudinal direction within the emission layer 308, while radiative optical modes can involve propagation of emitted radiation along a substantially radial or transverse direction out of the emission layer 308. Guided optical modes can also include whispering-gallery optical modes, which can involve propagation of incident radiation or emitted radiation in orbital paths along a circumference of the emission layer 308. The whispering-gallery optical modes can yield improvements in efficiency by trapping radiation within the emission layer 308 with little or no losses, while allowing optical coupling of the trapped radiation to guided optical modes propagating along the longitudinal direction. For a relatively low degree of radial confinement, the local density of optical states and emission characteristics are modified to a relatively low degree. Increasing radial confinement, such as by increasing an index contrast between dielectric layers of the outer reflector 306 and the inner reflector 310, can introduce greater distortions in the local density of optical states, yielding modification of emission characteristics including directional control. Also, by adjusting a thickness of the emission layer 308 with respect to radial resonance, radiative optical modes can be suppressed. This suppression can reduce emission losses out of the emission layer 308, while enhancing probability of longitudinal emission along the emission layer 308 in a direction towards the output end. For certain implementations, the emission layer 308 can be disposed between the pair of reflectors 306 and 310 so as to be substantially centered at an anti-node position of a resonant electromagnetic wave, and the pair of reflectors 306 and 310 can be spaced to yield a cavity length in the range of a fraction of a wavelength to about ten wavelengths or more.

When implemented as a resonant cavity waveguide, a performance of the luminescent stack 316 can be characterized with reference to its quality or Q value, which can vary from low to high. A relatively low Q value can be sufficient to yield improvements in efficiency, with a greater Q value yielding additional improvements in efficiency. For certain implementations, the luminescent stack 316 can have a Q value that is at least about 5, such as at least about 10 or at least about 100, and up to about $10^5$ or more, such as up to about 10,000 or up to about 1,000. In the case of a high-Q resonant cavity waveguide, the luminescent stack 316 can exhibit an exciton emission in which excitons interact with cavity photons to form coupled exciton-photon quasi-particles referred as exciton-polaritons 402, as illustrated in FIG. 4B. The luminescent stack 316 can operate in a weak coupling regime or a strong coupling regime, depending upon an extent of coupling between excitons and cavity photons or among excitons in the case of bi-excitons.

In the strong coupling regime, the luminescent stack 316 can be implemented as a polariton laser, which can lead to highly efficient and intense emissions and extremely low lasing thresholds. A polariton laser can have substantially zero losses and an efficiency up to about 100 percent. A polariton laser is also sometimes referred as a zero threshold laser, in which there is little or no lasing threshold, and lasing derives at least partly from excitons or related quasi-particles, such as bi-excitons or exciton-polaritons. The formation of quasi-particles and a resulting modification of energy levels or states can reduce losses arising from self-absorption. Contrary to conventional lasers, a polariton laser can emit coherent and substantially monochromatic radiation without population inversion. Without wishing to be bound by a particular theory, emission characteristics of a polariton laser can occur when exciton-polaritons undergo Bose-condensation within a resonant cavity waveguide. Lasing can also occur in the weak coupling regime, although a lasing threshold can be higher than for the strong coupling regime. In the weak coupling regime, lasing can derive primarily from excitons, rather than from exciton-polaritons.

By implementing as a high-Q resonant cavity waveguide in the form of a polariton laser, the luminescent stack 316 can exhibit a number of desirable characteristics. In particular, lasing can be achieved with a very low threshold, such as with an excitation intensity that is no greater than about 200 mW cm$^{-2}$, no greater than about 100 mW cm$^{-2}$, no greater than about 50 mW cm$^{-2}$, or no greater than about 10 mW cm$^{-2}$, and down to about 1 mW cm$^{-2}$ or less, which is several orders of magnitude smaller than for a conventional laser. Also, lasing can occur with a short radiative lifetime, such as no greater than about 500 psec, no greater than about 200 psec, no greater than about 100 psec, or no greater than about 50 psec, and down to about 1 psec or less, which can avoid or reduce relaxation through non-radiative mechanisms. Furthermore, lasing can involve narrowing of a spectral width of an emission spectrum to form a narrow emission line, such as by a factor of at least about 1.5, at least about 2, or at least about 5, and up to about 10 or more, relative to the case where there is a substantial absence of resonant cavity effects. For example, in the case of UD930, a spectral width can be narrowed from a typical value of about 80 nm at FWHM to a value in the range of about 2 nm to about 10 nm, such as from about 3 nm to about 10 nm, when UD930 is incorporated in a high-Q resonant cavity waveguide. In such manner, lasing and low loss with distance can allow higher intensities of emissions reaching the output end. There can be little or no measurable loss of emissions that are guided towards the output end. With lasing, a photon quantum efficiency from incident radiation to emitted radiation can approach 100 percent.

During manufacturing, Atomic Layer Deposition ("ALD") can be used to form various layers of the luminescent stack 316 in a single deposition run to form a substantially monolithic, integrated cavity waveguide, and processing conditions can be optimized with respect to characteristics of those layers. ALD typically uses a set of reactants to form alternate, saturated, chemical reactions on a surface, resulting in self-limited growth with desirable characteristics such as conformity, high throughput, uniformity, repeatability, and precise control over thickness. For certain implementations, reactants are sequentially introduced to a surface in a gas phase to form successive monolayers. ALD can be used to incorporate a set of dopants in a controlled fashion so as to tune refractive indices or to introduce or modify photoluminescence characteristics for down-conversion or up-conversion. Also, ALD can be used to apply an optical coupling material adjacent to an interface between the luminescent stack 316 and another optical device, such as in the form of a dielectric stack. For example, the optical coupling material can be applied to an end surface of the luminescent stack 316, an outer surface of the luminescent stack 316, or to both surfaces. Certain aspects of ALD are described in Nanu et al., "CuInS$_2$—TiO$_2$ Heterojunctions Solar Cells Obtained by Atomic Layer Deposition," Thin Solid Films, Vol. 431-432, pp. 492-496 (2003); Spiering et al., "Stability Behaviour of Cd-free Cu(In,Ga)Se$_2$ Solar Modules with In$_2$S$_3$ Buffer Layer Prepared by Atomic Layer Deposition," Thin Solid Films, Vol. 480-481, pp. 195-198 (2005); and Klepper et al., "Growth of Thin Films of CO$_3$O$_4$ by Atomic Layer Deposition," Thin Solid Films, Vol. 515, No. 20-21, pp. 7772-7781 (2007); the disclosures of which are incorporated herein by reference in their entireties. It is contemplated that another suitable deposition technique can be used in place of, or in combination with, ALD to form a substantially monolithic, integrated cavity waveguide. Examples of suitable deposition techniques include vacuum deposition (e.g., thermal evaporation or electron-beam evaporation), Physical Vapor Deposition ("PVD"), Chemical Vapor Deposition ("CVD"), plating, spray coating, dip coating, web coating, wet coating, and spin coating.

Figure 6:
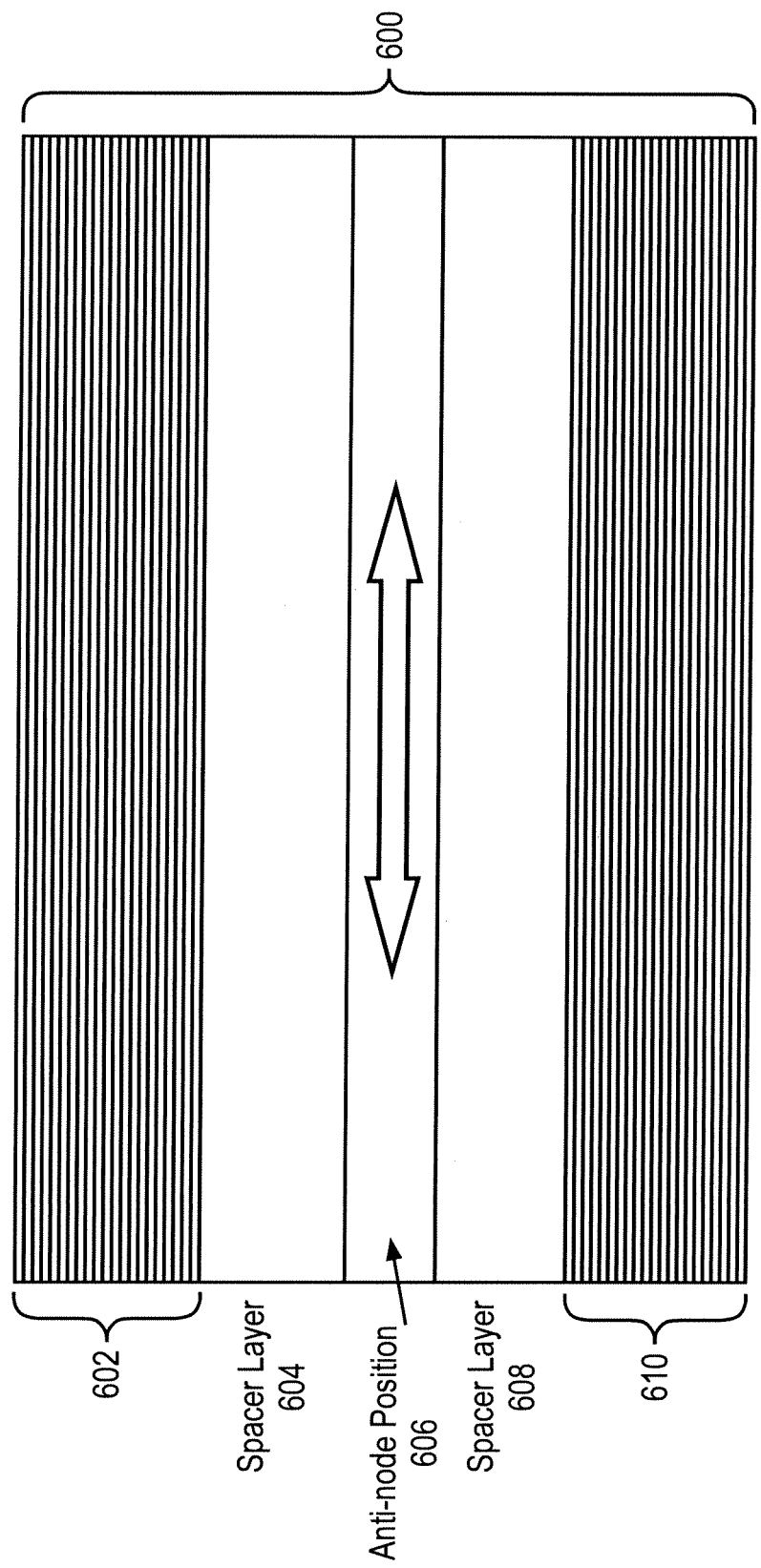
FIG. 6 through FIG. 12 illustrate cross-sectional, longitudinal views of luminescent stacks implemented as resonant cavity waveguides in accordance with various embodiments of the invention.

FIG. 6 illustrates a cross-sectional, longitudinal view of a luminescent stack 600 implemented as a resonant cavity waveguide in accordance with another embodiment of the invention. The luminescent stack 600 includes an outer reflector 602 and an inner reflector 610, which are implemented as dielectric stacks including multiple dielectric layers. The pair of reflectors 602 and 610 sandwich an emission layer 606, such that the outer reflector 602 is adjacent to an outer surface of the emission layer 606, and the inner reflector 610 is adjacent to an inner surface of the emission layer 606. The emission layer 606 is disposed between the pair of reflectors 602 and 610 so as to be substantially centered at an anti-node position of a resonant electromagnetic wave. While the single emission layer 606 is illustrated in FIG. 6, it is contemplated that additional emission layers can be included for other implementations. Certain aspects of the luminescent stack 600 can be implemented in a similar manner as described above, and, therefore, are not further described herein.

As illustrated in FIG. 6, an outer spacer layer 604 is included between the outer reflector 602 and the emission layer 606, and an inner spacer layer 608 is included between the emission layer 606 and the inner reflector 610. The pair of spacer layers 604 and 608 provide index matching and serve as a pair of passive in-plane waveguide layers for low loss guiding of emitted radiation within the emission layer 606. The outer spacer layer 604 can be formed from a suitable low index material, such as MgF$_2$ having a refractive index of about 1.37 or another material having a refractive index that is no greater than about 2 or no greater than about 1.5, or a suitable high index material, such as TiO$_2$ having a refractive index of about 2.5 or another material having a refractive index greater than about 2.5 or greater than about 3. Similarly, the inner spacer layer 608 can be formed from a suitable low index material or a suitable high index material. For certain implementations, the outer spacer layer 604 and the inner spacer layer 608 can be formed from similar dielectric materials used to form the outer reflector 602 and the inner reflector 610, such as oxides, nitrides, fluorides, or nanolaminates. ALD can be used to form the outer spacer layer 604 and the inner spacer layer 608, along with the other layers of the luminescent stack 600, in a single deposition run. Alternatively, another suitable deposition technique can be used, such as vacuum deposition, PVD, CVD, plating, spray coating, dip coating, web coating, wet coating, or spin coating. Each of the outer spacer layer 604 and the inner spacer layer 608 can have a thickness (along a radial direction) in the range of about 1 nm to about 200 nm, such as in the range of about 1 nm to about 100 nm or in the range of about 10 nm to about 100 nm. While two spacer layers 604 and 608 are illustrated in FIG. 6, it is contemplated that more or less spacer layers can be included for other implementations.

Figure 7:
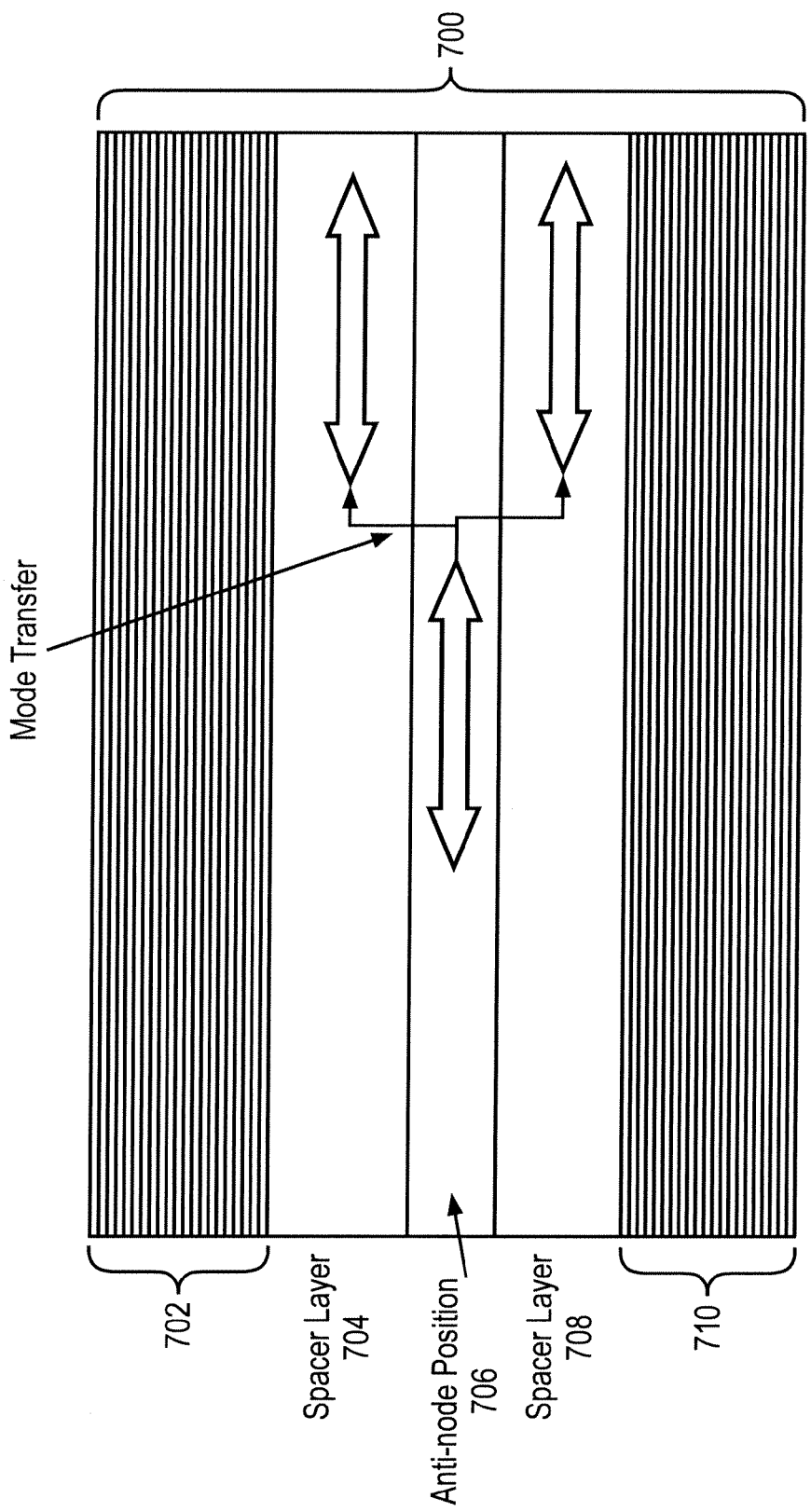

FIG. 7 illustrates a cross-sectional, longitudinal view of a luminescent stack 700 implemented as a resonant cavity waveguide in accordance with another embodiment of the invention. The luminescent stack 700 includes an outer reflector 702 and an inner reflector 710, which are implemented as dielectric stacks including multiple dielectric layers. The pair of reflectors 702 and 710 sandwich an emission layer 706, which is disposed so as to be substantially centered at an anti-node position of a resonant electromagnetic wave. While the single emission layer 706 is illustrated in FIG. 7, it is contemplated that additional emission layers can be included for other implementations. Certain aspects of the luminescent stack 700 can be implemented in a similar manner as described above, and, therefore, are not further described herein.

As illustrated in FIG. 7, an outer spacer layer 704 is included between the outer reflector 702 and the emission layer 706, and an inner spacer layer 708 is included between the emission layer 706 and the inner reflector 710. In the illustrated embodiment, at least one of the pair of spacer layers 704 and 708 is directly involved in conveyance of emitted radiation via optical mode transfer from the emission layer 706. In such manner, propagation of emitted radiation can at least partly occur in the pair of spacer layers 704 and 708, and self-absorption or scattering losses can be reduced relative to the case where substantial propagation of emitted radiation occurs in the emission layer 706. For certain implementations, at least one of the outer spacer layer 704 and the inner spacer layer 708 can be formed from a suitable low index material, such that the luminescent stack 700 serves as an Antiresonant Reflecting Optical Waveguide ("ARROW"). An ARROW is typically based on the Fabry-Perot effect for guiding, rather than total internal reflection, and can provide enhanced photoluminescence and low loss guiding towards an output end. The ARROW can allow certain optical modes to be substantially centered on a low index region corresponding to either, or both, of the outer spacer layer 704 and the inner spacer layer 708. In such manner, substantial propagation of emitted radiation can occur outside of the emission layer 706, and self-absorption can be reduced. Certain aspects of ARROW structures are described in Huang et al., "The Modal Characteristics of ARROW structures," Journal of Lightwave Technology, Vol. 10, No. 8, pp. 1015-1022 (1992); Litchinitser et al., "Application of an ARROW Model for Designing Tunable Photonic Devices," Optics Express, Vol. 12, No. 8, pp. 1540-1550 (2004); and Liu et al., "Characteristic Equations for Different ARROW Structures," Optical and Quantum Electronics, Vol. 31, pp. 1267-1276 (1999); the disclosures of which are incorporated herein by reference in their entireties. While two spacer layers 704 and 708 are illustrated in FIG. 7, it is contemplated that more or less spacer layers can be included for other implementations.

Figure 8:
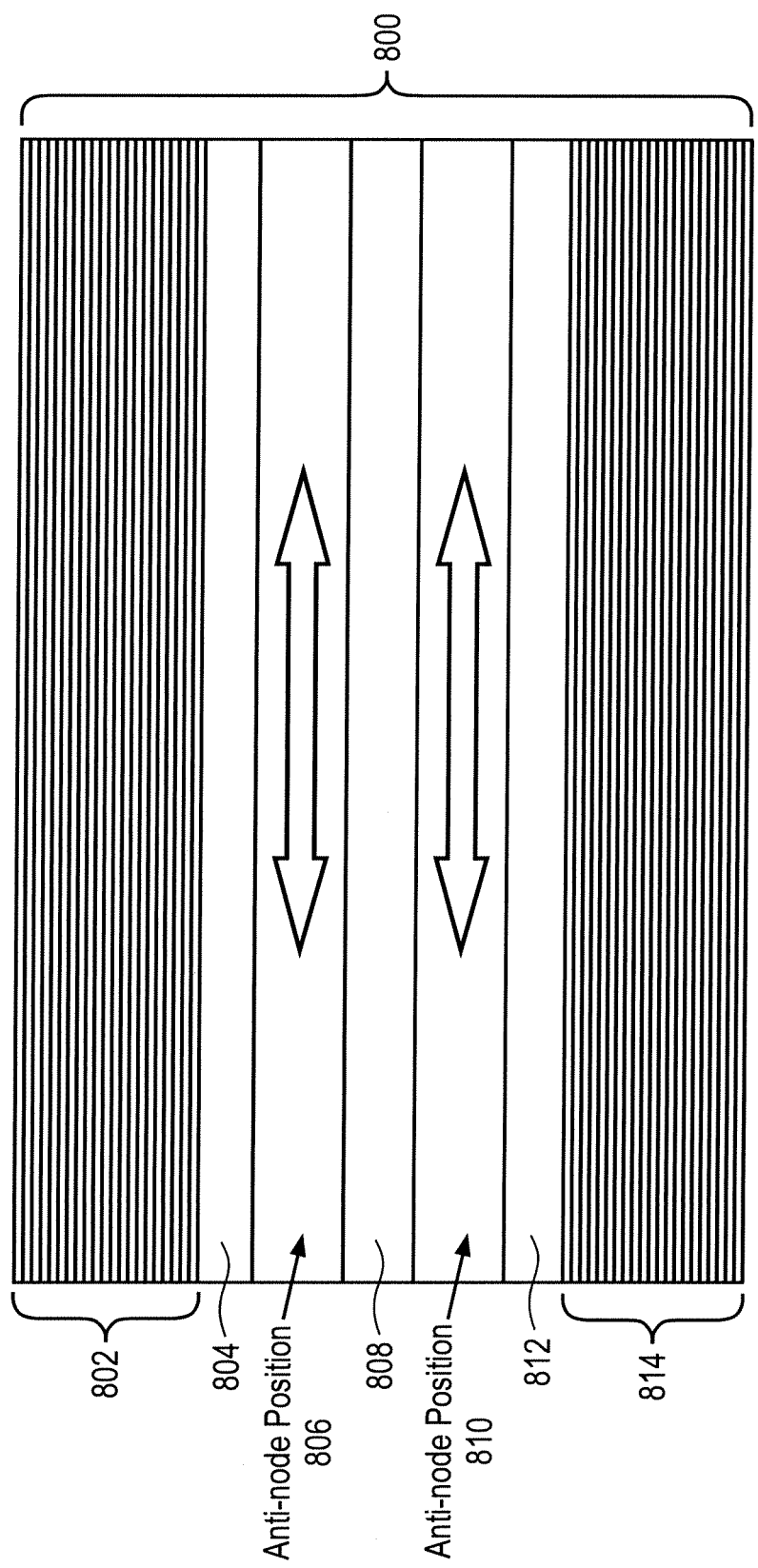

FIG. 8 illustrates a cross-sectional, longitudinal view of a luminescent stack 800 implemented as a resonant cavity waveguide in accordance with another embodiment of the invention. The luminescent stack 800 includes an outer reflector 802 and an inner reflector 814, which are implemented as dielectric stacks including multiple dielectric layers. Certain aspects of the luminescent stack 800 can be implemented in a similar manner as described above, and, therefore, are not further described herein.

In the illustrated embodiment, the pair of reflectors 802 and 814 sandwich a pair of emission layers, namely an outer emission layer 806 and an inner emission layer 810, such that the outer reflector 802 is adjacent to an outer surface of the outer emission layer 806, and the inner reflector 814 is adjacent to an inner surface of the inner emission layer 810. The pair of emission layers 806 and 810 are disposed so as to be substantially centered at respective anti-node positions. While two emission layers 806 and 810 are illustrated in FIG. 8, it is contemplated that more or less emission layers can be included for other implementations. Each of the pair of emission layers 806 and 810 includes a set of luminescent materials that emits radiation in a relatively narrow, substantially monochromatic energy band. The pair of emission layers 806 and 810 can be formed from the same set of luminescent materials or from different sets of luminescent materials.

Still referring to FIG. 8, an outer spacer layer 804 is included between the outer reflector 802 and the outer emission layer 806, a middle spacer layer 808 is included between the outer emission layer 806 and the inner emission layer 810, and an inner spacer layer 812 is included between the inner emission layer 810 and the inner reflector 814. In the illustrated embodiment, the spacer layers 804, 808, and 812 provide index matching and serve as passive in-plane waveguide layers for low loss guiding of emitted radiation within the outer emission layer 806 and the inner emission layer 810. It is also contemplated that at least one of the spacer layers 804, 808, and 812 can be directly involved in conveyance of emitted radiation via optical mode transfer. In such manner, propagation of emitted radiation can at least partly occur in the spacer layers 804, 808, and 812, thereby reducing self-absorption or scattering losses. While three spacer layers 804, 808, and 812 are illustrated in FIG. 8, it is contemplated that more or less spacer layers can be included for other implementations.

Figure 9:
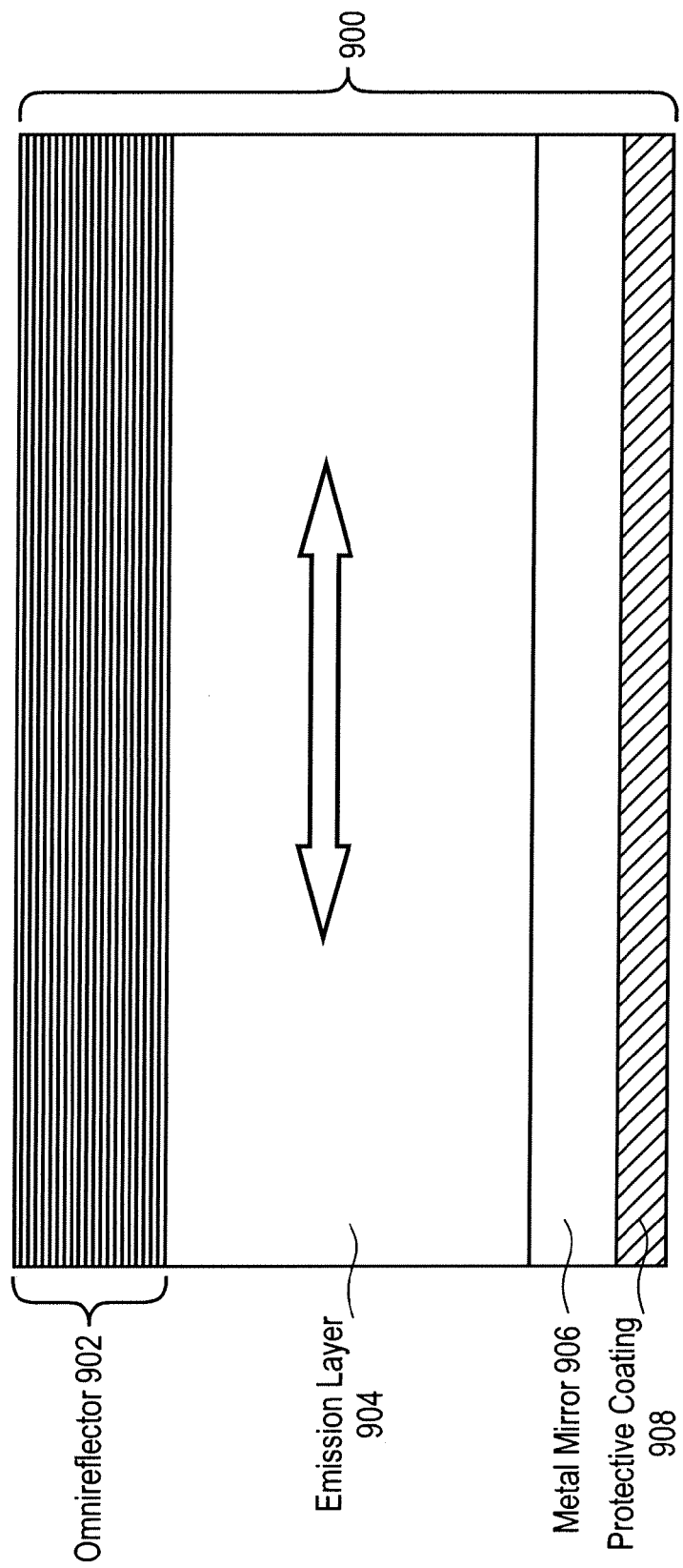

FIG. 9 illustrates a cross-sectional, longitudinal view of a luminescent stack 900 implemented as a resonant cavity waveguide in accordance with another embodiment of the invention. The luminescent stack 900 includes an outer reflector 902, which is implemented as a dielectric stack including multiple dielectric layers, and an inner reflector 906. The pair of reflectors 902 and 906 sandwich an emission layer 904, which is disposed so as to be substantially centered at an anti-node position of a resonant electromagnetic wave. While the single emission layer 904 is illustrated in FIG. 9, it is contemplated that additional emission layers can be included for other implementations. Certain aspects of the luminescent stack 900 can be implemented in a similar manner as described above, and, therefore, are not further described herein.

In the illustrated embodiment, the inner reflector 906 is omnireflective over a relatively wide range of wavelengths. Compared to the outer reflector 902, which has narrowband reflectivity over emission wavelengths, the inner reflector 906 can be relatively more lossy and less reflective with respect to emission wavelengths. However, broadband reflectivity of the inner reflector 906 can sometimes provide an overall efficiency gain relative to an implementation using a pair of narrowband reflectors. The inner reflector 906 can be formed from a metal, such as silver, aluminum, gold, copper, iron, cobalt, nickel, palladium, platinum, ruthenium, titanium, or iridium; a metal alloy; or another suitable material having broadband reflectivity, and can have a thickness (along a radial direction) in the range of about 1 nm to about 200 nm, such as in the range of about 1 nm to about 100 nm or in the range of about 10 nm to about 100 nm. As illustrated in FIG. 9, a protective layer 908 is formed as a coating adjacent to an inner surface of the inner reflector 906, and serves to protect the inner reflector 906 from environmental conditions. The protective layer 908 can be formed from a metal, a glass, a polymer, or another suitable material, and can have a thickness (along the radial direction) in the range of about 1 nm to about 500 nm, such as in the range of about 10 nm to about 300 nm or in the range of about 100 nm to about 300 nm. ALD can be used to form the inner reflector 906 and the protective layer 908, along with the other layers of the luminescent stack 900, in a single deposition run. Alternatively, another suitable deposition technique can be used. It is contemplated that the protective layer 908 can be optionally omitted for another implementation. It is further contemplated that the narrowband reflectivity and the broadband reflectivity roles of the pair of reflectors 902 and 906 can be switched or modified for other implementations, and that the relative positioning of the various layers of the luminescent stack 900 can be reversed, such that the inner reflector 906 corresponds to an outer reflector, the outer reflector 902 corresponds to an inner reflector, and so forth.

Figure 10:
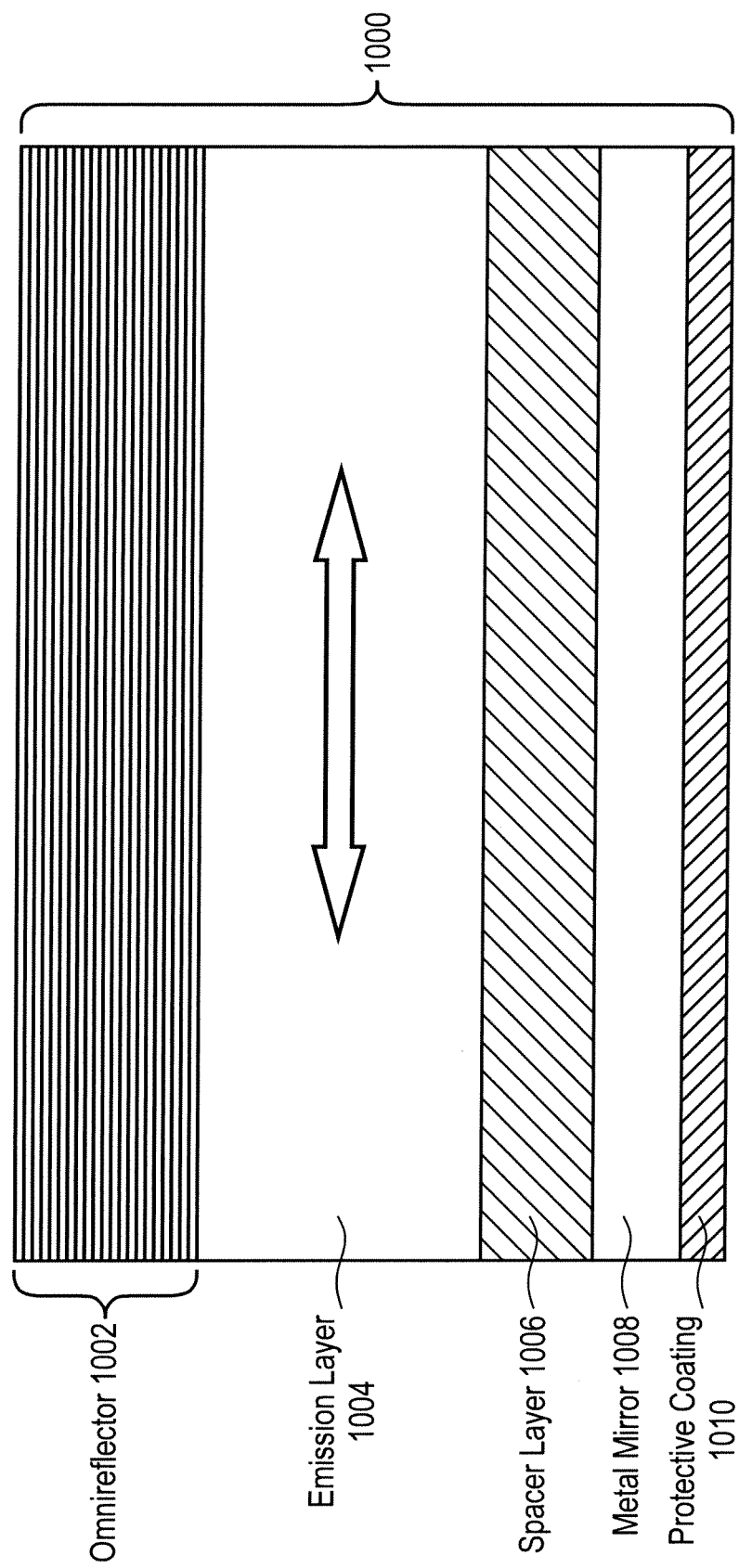

FIG. 10 illustrates a cross-sectional, longitudinal view of a luminescent stack 1000 implemented as a resonant cavity waveguide in accordance with another embodiment of the invention. The luminescent stack 1000 includes an outer reflector 1002, which has narrowband reflectivity over emission wavelengths, and an inner reflector 1008, which has broadband reflectivity. The pair of reflectors 1002 and 1008 sandwich an emission layer 1004, which is disposed so as to be substantially centered at an anti-node position of a resonant electromagnetic wave. While the single emission layer 1004 is illustrated in FIG. 10, it is contemplated that additional emission layers can be included for other implementations. A protective layer 1010 is formed adjacent to an inner surface of the inner reflector 1008, and serves to protect the inner reflector 1008 from environmental conditions. It is contemplated that the protective layer 1010 can be optionally omitted for another implementation. It is further contemplated that the narrowband reflectivity and the broadband reflectivity roles of the pair of reflectors 1002 and 1008 can be switched or modified for other implementations, and that the relative positioning of the various layers of the luminescent stack 1000 can be reversed, such that the inner reflector 1008 corresponds to an outer reflector, the outer reflector 1002 corresponds to an inner reflector, and so forth. Certain aspects of the luminescent stack 1000 can be implemented in a similar manner as described above, and, therefore, are not further described herein.

As illustrated in FIG. 10, a spacer layer 1006 is included between the emission layer 1004 and the inner reflector 1008. The spacer layer 1006 provides index matching and serves as a passive in-plane waveguide layer for low loss guiding of emitted radiation. It is also contemplated that the spacer layer 1006 can be directly involved in conveyance of emitted radiation via optical mode transfer. While the single spacer layer 1006 is illustrated in FIG. 10, it is contemplated that more or less spacer layers can be included for other implementations.

Figure 11:
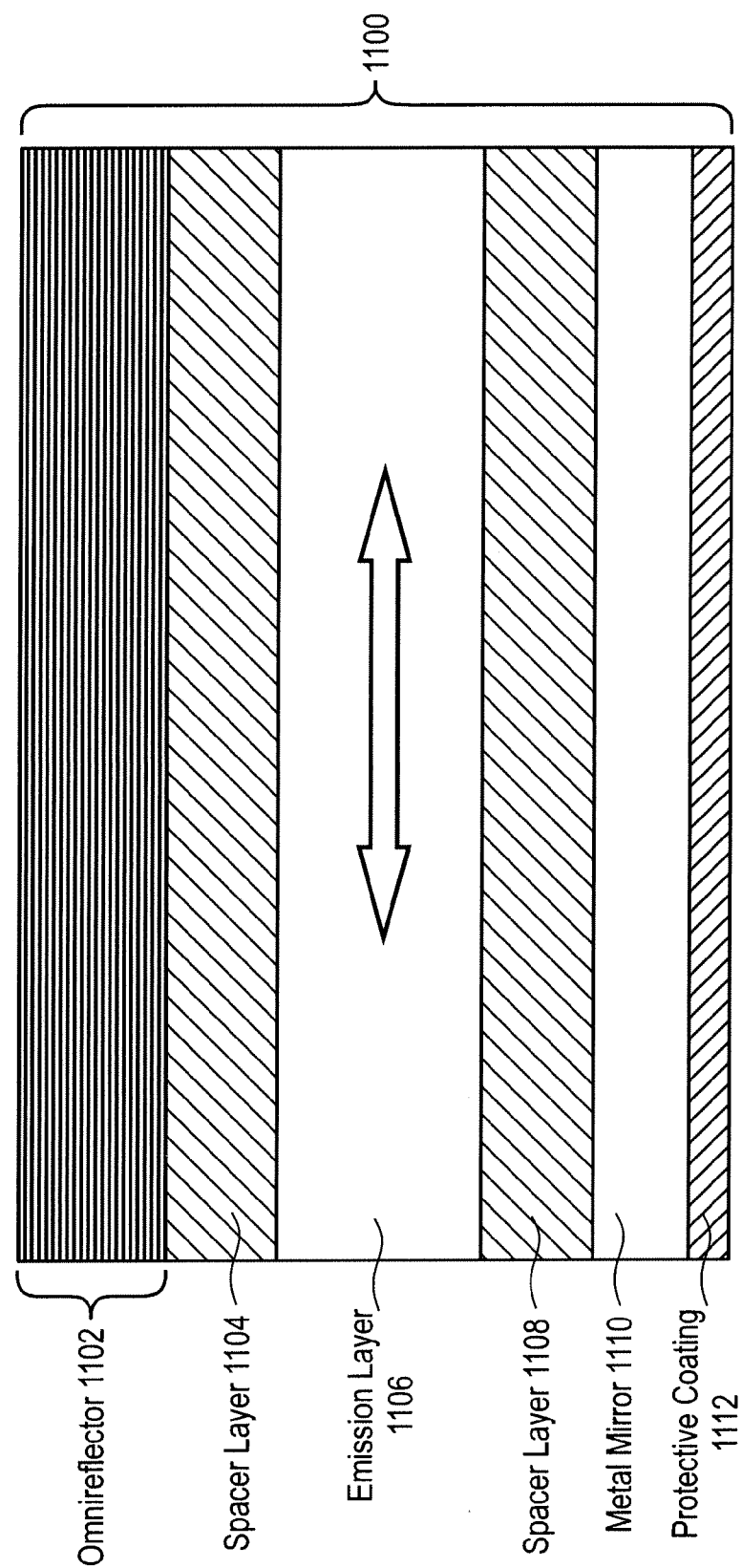

For example, FIG. 11 illustrates a cross-sectional, longitudinal view of a luminescent stack 1100 implemented as a resonant cavity waveguide in accordance with another embodiment of the invention. The luminescent stack 1100 includes an outer reflector 1102, which has narrowband reflectivity over emission wavelengths, and an inner reflector 1110, which has broadband reflectivity. The pair of reflectors 1102 and 1110 sandwich an emission layer 1106, which is disposed so as to be substantially centered at an anti-node position of a resonant electromagnetic wave. While the single emission layer 1106 is illustrated in FIG. 11, it is contemplated that additional emission layers can be included for other implementations. A protective layer 1112 is formed adjacent to an inner surface of the inner reflector 1110, and serves to protect the inner reflector 1110 from environmental conditions. It is contemplated that the protective layer 1112 can be optionally omitted for another implementation. It is further contemplated that the narrowband reflectivity and the broadband reflectivity roles of the pair of reflectors 1102 and 1110 can be switched or modified for other implementations, and that the relative positioning of the various layers of the luminescent stack 1100 can be reversed, such that the inner reflector 1110 corresponds to an outer reflector, the outer reflector 1102 corresponds to an inner reflector, and so forth. Certain aspects of the luminescent stack 1100 can be implemented in a similar manner as described above, and, therefore, are not further described herein.

In the illustrated embodiment, an outer spacer layer 1104 is included between the outer reflector 1102 and the emission layer 1106, and an inner spacer layer 1108 is included between the emission layer 1106 and the inner reflector 1110. The pair of spacer layers 1104 and 1108 provide index matching and serve as a pair of passive in-plane waveguide layers for low loss guiding of emitted radiation. It is also contemplated that at least one of the pair of spacer layers 1104 and 1108 can be directly involved in conveyance of emitted radiation via optical mode transfer. A symmetrical arrangement of the pair of spacer layers 1104 and 1108 with respect to the emission layer 1106, as illustrated in FIG. 11, can provide efficiency gains relative to an implementation having an unsymmetrical arrangement or lacking spacer layers.

Figure 12:
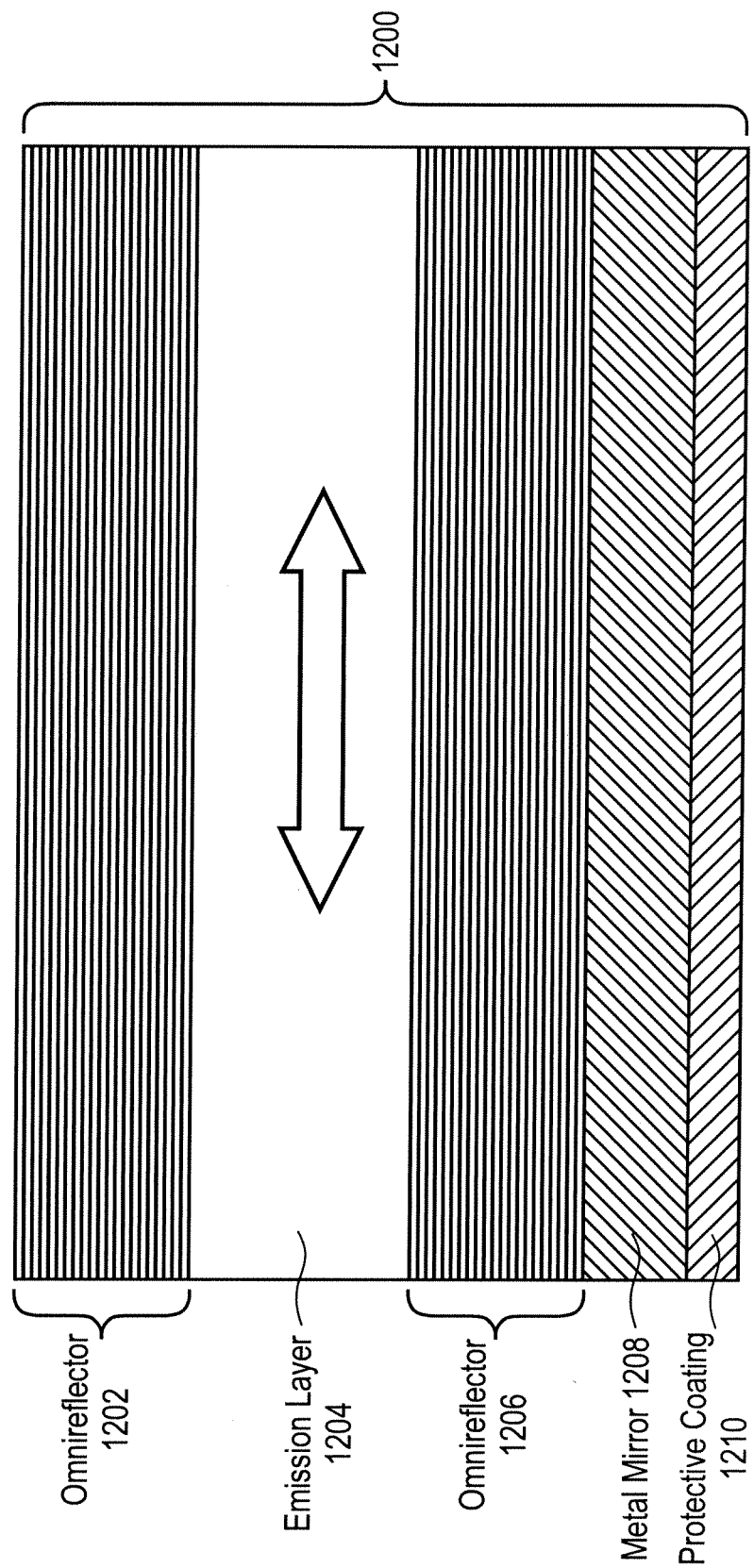

FIG. 12 illustrates a cross-sectional, longitudinal view of a luminescent stack 1200 implemented as a resonant cavity waveguide in accordance with another embodiment of the invention. The luminescent stack 1200 includes an outer reflector 1202, which has narrowband reflectivity over emission wavelengths, and an inner reflector 1208, which has broadband reflectivity. The pair of reflectors 1202 and 1208 sandwich an emission layer 1204, which is disposed so as to be substantially centered at an anti-node position of a resonant electromagnetic wave. While the single emission layer 1204 is illustrated in FIG. 12, it is contemplated that additional emission layers can be included for other implementations. A protective layer 1210 is formed adjacent to an inner surface of the inner reflector 1208, and serves to protect the inner reflector 1208 from environmental conditions. It is contemplated that the protective layer 1210 can be optionally omitted for another implementation. While spacer layers are not illustrated in FIG. 12, it is contemplated that one or more spacer layers can be included for other implementations. Certain aspects of the luminescent stack 1200 can be implemented in a similar manner as described above, and, therefore, are not further described herein.

As illustrated in FIG. 12, another inner reflector 1206 is included between the emission layer 1204 and the inner reflector 1208. Similar to the outer reflector 1202, the inner reflector 1206 is implemented as a dielectric stack and has narrowband reflectivity over emission wavelengths. The use of the pair of inner reflectors 1206 and 1208 in a combination yields enhanced reflectivity over emission wavelengths as well as broadband reflectivity over a wider range of wavelengths, thereby further reducing loss of emitted radiation through the pair of inner reflectors 1206 and 1208. It is contemplated that the relative positions of the pair of inner reflectors 1206 and 1208, with respect to the emission layer 1204, can be switched for other implementations. It is further contemplated that the relative positioning of the various layers of the luminescent stack 1200 can be reversed, such that the pair of inner reflectors 1206 and 1208 corresponds to a pair of outer reflectors, the outer reflector 1202 corresponds to an inner reflector, and so forth.

Figure 13:
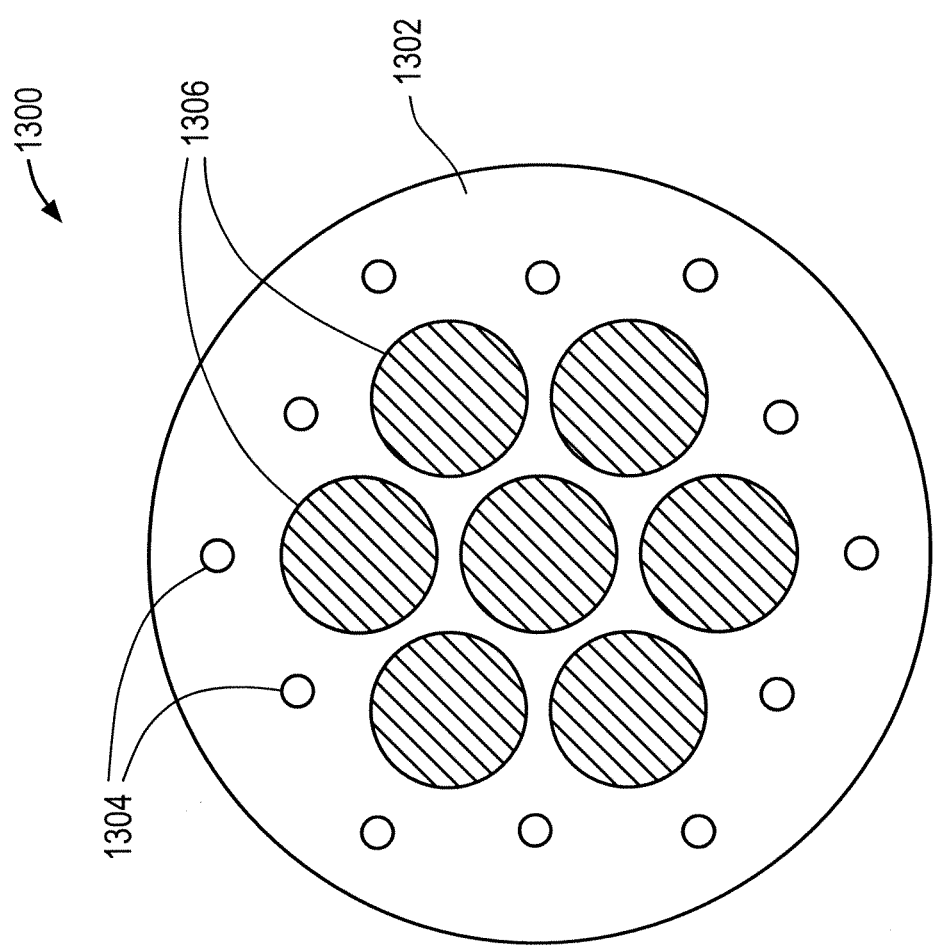
FIG. 13 illustrates a cross-sectional, radial view of an optical fiber implemented as a photonic crystal fiber in accordance with another embodiment of the invention.

FIG. 13 illustrates a cross-sectional, radial view of an optical fiber 1300 implemented as a photonic crystal fiber in accordance with an embodiment of the invention. The optical fiber 1300 includes a substrate 1302, which faces an exterior environment and is formed from a glass, a polymer, or another suitable material. For certain implementations, the substrate 1302 can be formed from a suitable material that is optically transparent or translucent. In the illustrated embodiment, the substrate 1302 serves as a cladding or a covering, and is formed as an elongated, structure having a rod shape with a cross-section defined by an outer circumference. While the outer circumference of the substrate 1302 is illustrated as shaped in the form of a circle, it is contemplated that the shape of the outer circumference, in general, can be any of a number of shapes, such as elliptical, square-shaped, rectangular-shaped, and other polygonal and non-polygonal shapes.

Referring to FIG. 13, the substrate 1302 is formed with an array of apertures or openings 1304, which are disposed adjacent to the outer circumference of the substrate 1302 and extend substantially along a length of the optical fiber 1300, and an array of apertures or openings 1306, which are disposed adjacent to a core of the substrate 1302 and extend substantially along the length of the optical fiber 1300. In the illustrated embodiment, the apertures 1304 are substantially filled with air or another suitable low index material, while the apertures 1306 are substantially filled with a set of luminescent materials. While each of the apertures 1304 and 1306 is illustrated as shaped in the form of a circle, it is contemplated that the shapes of the apertures 1304 and 1306, in general, can be the same or different, and can be any of a number of shapes, such as elliptical, square-shaped, rectangular-shaped, and other polygonal and non-polygonal shapes. It is also contemplated that the apertures 1304, in general, can be filled with the same low index material or different low index materials, and that the apertures 1306, in general, can be filled with the same set of luminescent materials or different sets of luminescent materials. Also, while reflectors are not illustrated in FIG. 13, it is contemplated that one or more reflectors can be included for other implementations, such as adjacent to the outer circumference of the substrate 1302 or within luminescent stacks that are disposed within respective ones of the apertures 1306.

During operation of the optical fiber 1300, the set of luminescent materials within the apertures 1306 is optically excited to yield substantially monochromatic, emitted radiation. As a result of the presence of the low index material within the apertures 1304, an effective refractive index adjacent to the outer circumference of the substrate 1302 is lower than that of the core of the substrate 1302 adjacent to the apertures 1306. The optical fiber 1300 can, therefore, substantially confine emitted radiation within the apertures 1306 or elsewhere within the core of the substrate 1302, in a fashion similar to conveyance by total internal reflection. Emitted radiation is guided longitudinally within the optical fiber 1300, and, by modulating incident radiation, this emitted radiation is suitably modulated so as to convey information from one end of the optical fiber 1300 to another end of the optical fiber 1300. By adjusting an extent of confinement, resonant cavity effects can be exploited to provide a number of benefits, such as directional control and enhanced absorption and emission characteristics. It is also contemplated that the distribution and periodicity of the apertures 1304 and 1306 can be adjusted such that confinement of emitted radiation occurs within a low index portion via bandgap effects, resulting in a photonic bandgap fiber.

During manufacturing, a preform can be obtained, such as by stacking capillaries formed from a glass or a polymer, which is then heated and drawn into the substrate 1302 with the apertures 1304 and 1306. ALD, or another suitable deposition technique, can be used to fill the apertures 1306 with a set of luminescent materials. Alternatively, or in conjunction, the set of luminescent materials can be included within the preform and drawn to form the optical fiber 1300.

Electro-Optical Devices

Figure 14B:
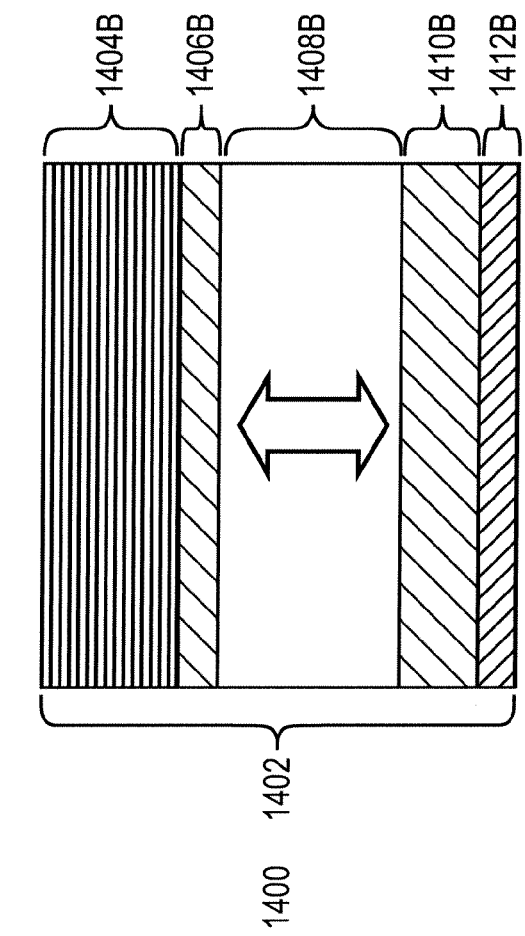
FIG. 14A and FIG. 14B illustrate cross-sectional, longitudinal views of luminescent stacks implemented as electro-optical devices in accordance with other embodiments of the invention.
Figure 14A:
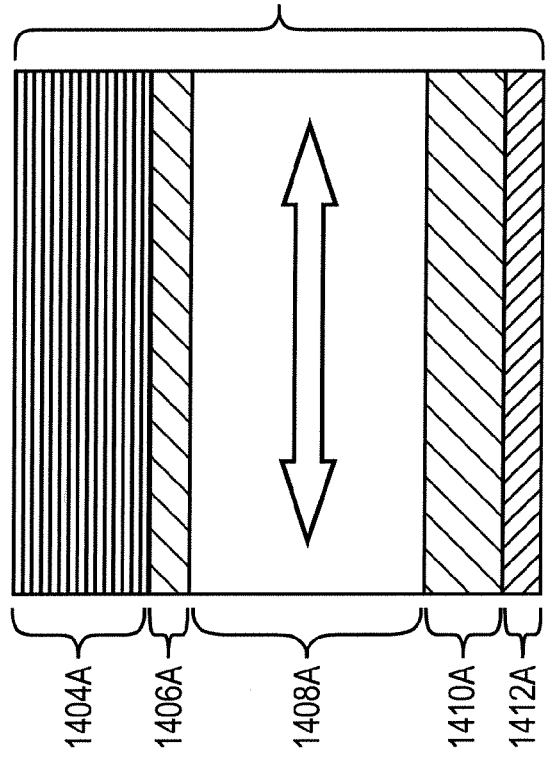

FIG. 14A and FIG. 14B illustrate cross-sectional, longitudinal views of luminescent stacks 1400 and 1402 implemented as electro-optical devices in accordance with other embodiments of the invention. Each of the luminescent stacks 1400 and 1402 includes an outer reflector 1404A or 1404B, which is implemented as a dielectric stack including multiple dielectric layers, and an inner reflector 1410A or 1410B, which also serves as an inner electrode layer and is formed from a metal or another suitable electrically conductive material having broadband reflectivity. A protective layer 1412A or 1412B is formed adjacent to an inner surface of the inner reflector 1410A or 1410B, and serves to protect the inner reflector 1410A or 1410B from environmental conditions. It is contemplated that the protective layer 1412A or 1412B can be optionally omitted for another implementation. It is further contemplated that the implementation of the pair of reflectors 1404A and 1410A, or the pair of reflectors 1404B and 1410B, can be switched or modified for other implementations, and that one or more spacer layers can be included for other implementations. Certain aspects of the luminescent stacks 1400 and 1402 can be implemented in a similar manner as described above, and, therefore, are not further described herein.

In the illustrated embodiment, each of the luminescent stacks 1400 and 1402 includes an emission layer 1408A or 1408B, which is sandwiched by the pair of reflectors 1404A and 1410A or the pair of reflectors 1404B and 1410B. The emission layer 1408A or 1408B includes a set of luminescent materials that is electrically excited (through an electrical current or voltage) and emits radiation in a substantially monochromatic energy band. The emission layer 1408A or 1408B can be formed from a single luminescent material (but having different doping levels or being of different doping types) so as to form a homojunction. For example, the emission layer 1408A or 1408B can be formed from a single luminescent material represented by formula (I) or (III) and suitably doped with p-dopants and n-dopants, such as elements of Group 111B, elements of Group VB, and elements of Group VIB, so as to form a homojunction. Alternatively, the emission layer 1408A or 1408B can be formed from different luminescent materials (and optionally being of different doping types) so as to form a heterojunction. For example, the emission layer 1408A or 1408B can be formed from a luminescent material represented by formula (I) or (III), along with another semiconductor material, such as intrinsic silicon, p-doped silicon, n-doped silicon, indium phosphide or InP, gallium arsenide or GaAs, a Group III-V material, or a Group II-VI material, so as to form a heterojunction. In addition to a p-n junction, whether in the form of a homojunction or a heterojunction, it is contemplated that the emission layer 1408A or 1408B can be formed in accordance with other junction designs, such as a Schottky heterojunction with a suitable semiconductor material and a suitable metal. While the single emission layer 1408A or 1408B is illustrated in FIG. 14A and FIG. 14B, it is contemplated that additional emission layers can be included for other implementations.

Referring to FIG. 14A and FIG. 14B, an electrical current is applied across the emission layer 1408A or 1408B through an electrically conductive layer 1406A or 1406B, which serves as an outer electrode layer, and the inner reflector 1410A or 1410B, which serves as the inner electrode layer. The electrically conductive layer 1406A or 1406B can be formed from a transparent conductive oxide, such as indium tin oxide or ITO, zinc oxide or ZnO, or fluorinated tin oxide; a transparent conductive polymer; or another suitable electrically conductive material that is optically transparent or translucent, and can have a thickness in the range of about 1 nm to about 200 nm, such as in the range of about 1 nm to about 100 nm or in the range of about 10 nm to about 100 nm. ALD can be used to form the electrically conductive layer 1406A or 1406B, along with the other layers of the luminescent stacks 1400 and 1402, in a single deposition run. Alternatively, another suitable deposition technique can be used.

During operation of the luminescent stacks 1400 and 1402, charge carriers, such as in the form of electrons and holes, are injected across a junction within the emission layer 1408A or 1408B, such that the charge carriers can interact or recombine to yield substantially monochromatic, emitted radiation via spontaneous emission or stimulated emission. By operating in such manner, the luminescent stacks 1400 and 1402 can be advantageously used in a number of applications, such as lasers, light-emitting diodes, solid-state lighting devices, and display devices. Control over a direction of emitted radiation can be achieved through suitable selection and control over characteristics of the outer reflector 1404A or 1404B, such as its reflectivity over emission wavelengths, and characteristics of the emission layer 1408A or 1408B, such as its thickness or its centering relative to an anti-node position or a node position of a resonant electromagnetic wave. For example, by selecting suitable materials having a particular index contrast, characteristics of a stop band, a transmission band, and a transition between the stop band and the transmission band can be optimized or otherwise tuned for either longitudinal emission, as illustrated in FIG. 14A, or vertical emission, as illustrated in FIG. 14B. For certain implementations, a stop band having a reflectivity that is in the range of about 50 percent to about 90 percent, such as in the range of about 60 percent to about 80 percent or in the range of about 65 percent to about 75 percent, can be desirable for vertical emissions, while a stop band having a reflectivity that is at least about 90 percent, such as at least about 97 percent or at least about 98 percent, can be desirable for longitudinal emissions. In such manner, the luminescent stacks 1400 and 1402 can be respectively implemented as an edge emitter and a vertical emitter. Also, by adjusting an extent of confinement, resonant cavity effects can be exploited to provide a number of benefits, such as directional control and enhanced emission characteristics.

Figure 15:
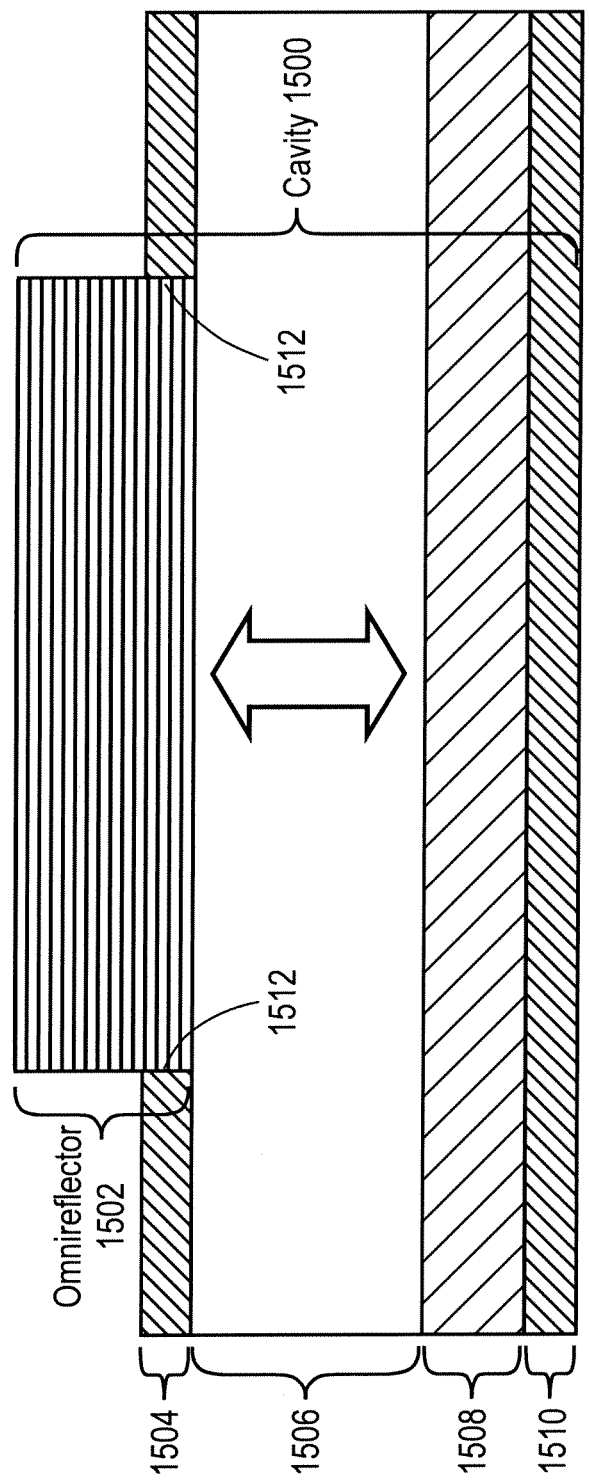
FIG. 15 illustrates a cross-sectional, longitudinal view of a luminescent stack implemented as an electro-optical device in accordance with another embodiment of the invention.

FIG. 15 illustrates a cross-sectional, longitudinal view of a luminescent stack 1500 implemented as an electro-optical device in accordance with another embodiment of the invention. In particular, the luminescent stack 1500 is implemented for vertical emission in the form of a Vertical Cavity Surface Emitting Laser ("VCSEL"). Referring to FIG. 15, the luminescent stack 1500 includes an outer reflector 1502, which is implemented as a dielectric stack including multiple dielectric layers, and an inner reflector 1508, which also serves as an inner electrode layer and is formed from a metal or another suitable electrically conductive material having broadband reflectivity. The pair of reflectors 1502 and 1508 sandwich an emission layer 1506, which emits radiation in a substantially monochromatic energy band upon electrical excitation.

While the single emission layer 1506 is illustrated in FIG. 15, it is contemplated that additional emission layers can be included for other implementations. A protective layer 1510 is formed adjacent to an inner surface of the inner reflector 1508, and serves to protect the inner reflector 1508 from environmental conditions. It is contemplated that the protective layer 1510 can be optionally omitted for another implementation. It is further contemplated that the implementation of the pair of reflectors 1502 and 1508 can be switched or modified for other implementations, and that one or more spacer layers can be included for other implementations. Certain aspects of the luminescent stack 1500 can be implemented in a similar manner as described above, and, therefore, are not further described herein.

As illustrated in FIG. 15, another outer reflector 1504 is included adjacent to an outer surface of the emission layer 1506. Similar to the inner reflector 1508, the outer reflector 1504 is formed from a metal or another suitable electrically conductive material having broadband reflectivity. In the illustrated embodiment, the outer reflector 1504 also serves as an outer electrode layer, and is formed as a ring-like structure defining an aperture or opening 1512 that is sized to accommodate the outer reflector 1502. During operation of the luminescent stack 1500, an electrical current is applied across the emission layer 1506 through the pair of reflectors 1504 and 1508, and a resulting emitted radiation is guided along a substantially vertical direction and out of the luminescent stack 1500 through the outer reflector 1502, which can be optimized or otherwise tuned for vertical emission. ALD can be used to form the outer reflector 1504, along with the other layers of the luminescent stack 1500, in a single deposition run. Alternatively, another suitable deposition technique can be used.

Figure 16:
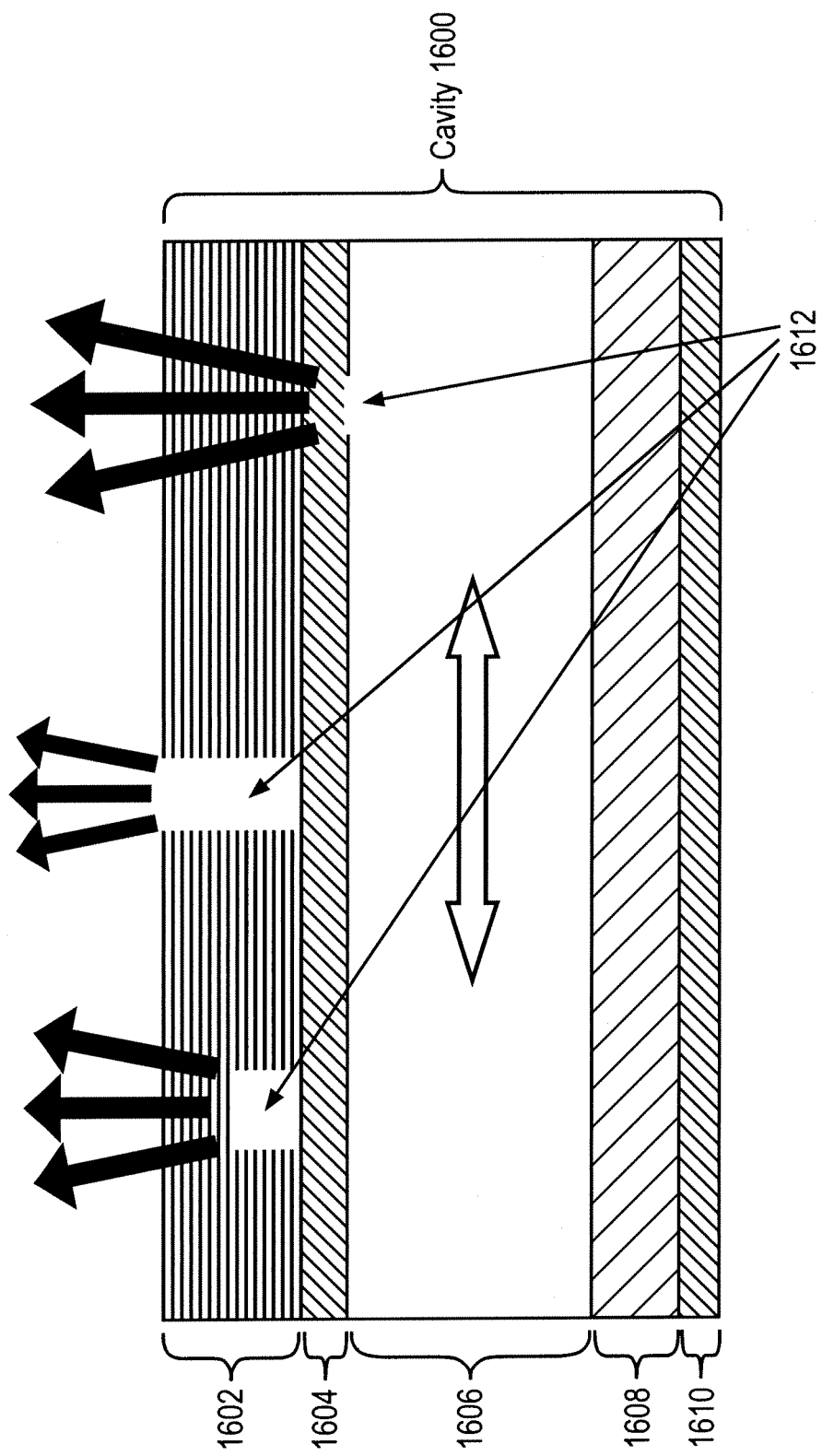
FIG. 16 illustrates a cross-sectional, longitudinal view of a luminescent stack implemented as an electro-optical device in accordance with another embodiment of the invention.

FIG. 16 illustrates a cross-sectional, longitudinal view of a luminescent stack 1600 implemented as an electro-optical device in accordance with another embodiment of the invention. In particular, the luminescent stack 1600 is implemented for vertical emission via longitudinal to vertical optical coupling. Referring to FIG. 16, the luminescent stack 1600 includes an outer reflector 1602, which is implemented as a dielectric stack including multiple dielectric layers, and an inner reflector 1608, which also serves as an inner electrode layer and is formed from a metal or another suitable electrically conductive material having broadband reflectivity. The pair of reflectors 1602 and 1608 sandwich an emission layer 1606, which emits radiation in a substantially monochromatic energy band upon electrical excitation. While the single emission layer 1606 is illustrated in FIG. 16, it is contemplated that additional emission layers can be included for other implementations. Referring to FIG. 16, an electrically conductive layer 1604, which serves as an outer electrode layer, is disposed between the outer reflector 1602 and the emission layer 1606, and is formed from a suitable electrically conductive material that is optically transparent or translucent. Also, a protective layer 1610 is formed adjacent to an inner surface of the inner reflector 1608, and serves to protect the inner reflector 1608 from environmental conditions. It is contemplated that the protective layer 1610 can be optionally omitted for another implementation. It is further contemplated that the implementation of the pair of reflectors 1602 and 1608 can be switched or modified for other implementations, and that one or more spacer layers can be included for other implementations. Certain aspects of the luminescent stack 1600 can be implemented in a similar manner as described above, and, therefore, are not further described herein.

As illustrated in FIG. 16, an array of reflective elements 1612 are included adjacent to an interface between the outer reflector 1602 and the emission layer 1606. It is contemplated that the reflective elements 1612 can be partially or fully incorporated within the outer reflector 1602, within the emission layer 1606, or within another layer, such as the electrically conductive layer 1604 that is included between the outer reflector 1602 and the emission layer 1606. During operation of the luminescent stack 1600, an electrical current is applied across the emission layer 1606, and a resulting emitted radiation is guided along a substantially longitudinal direction within the emission layer 1606. The reflective elements 1612 serve to scatter the emitted radiation and re-distribute or re-direct at least a fraction of the emitted radiation along a substantially vertical direction and out of the luminescent stack 1600. The reflective elements 1612 can extend in one dimension, two dimensions, or three dimensions, and can be formed as a periodic or non-periodic pattern of gaps or defects or as a grating structure using photolithography, nanoimprint lithography, or another suitable technique. It is also contemplated that other types of reflective structures can be included, such as an array of microparticles or nanoparticles that can be formed by deposition of pre-formed particles, in-situ growth, or another suitable technique.

EXAMPLES

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

Example 1

Formation of Luminescent Material

UD930

Samples of UD930 were formed in a reproducible manner by vacuum deposition in accordance with two main approaches. In accordance with one approach, tin chloride and cesium iodide were evaporated in sequential layers, from two layers to 16 layers total, and the ratio of tin chloride to cesium iodide was from about 2:1 to about 1:3. It is contemplated that the number of layers and the ratio of reactants can vary for other implementations. A resulting sample was annealed on a hot plate in air or nitrogen for about 20 seconds to about 120 seconds at a temperature in the range of about 150° C. to about 280° C. Higher temperatures were observed to yield higher photoluminescence intensity, but a resulting surface can be rougher. A temperature of about 180° C. was observed to yield adequate photoluminescence and a relatively smooth surface.

In accordance with another approach, tin iodide and cesium iodide were evaporated in sequential layers, from two layers to six layers total, and the ratio of tin iodide to cesium iodide was from about 1:1 to about 1:2. It is contemplated that the number of layers and the ratio of reactants can vary for other implementations. A resulting sample was annealed on a hot plate in air or nitrogen for about 20 seconds to about 120 seconds at a temperature in the range of about 250° C. to about 380° C. Air-annealed photoluminescence was observed to be sometimes unstable and decayed in a few hours, while nitrogen-annealed photoluminescence was observed to last for at least a few days.

For either approach, stability of photoluminescence was enhanced if samples of UD930 were encapsulated. One manner of encapsulation was by bonding using a layer of a polymer or another suitable adhesive material. Coating or deposition of a layer of silver or another non-reactive metal was also used to provide encapsulation. In both cases, namely bonding and metal deposition, photoluminescence was observed to be stable for at least several months.

Samples of UD930 were observed to exhibit substrate effects with respect to resulting photoluminescence characteristics. Substrates formed from silicon (with oxide), different types of glass, alumina-based ceramic, and porous alumina filter were observed to yield differences of up to ten times in photoluminescence intensity. For example, enhancements of about three times in photoluminescence intensity were observed for alumina-based ceramic substrates, in which alumina is doped with chromium ions and sometimes also titanium ions. Without wishing to be bound by a particular theory, it is believed that such enhancements can at least partly derive from a R1 R2 emission process. In accordance with the R1 R2 emission process, dopants within an alumina-based ceramic substrate down-convert radiation at wavelengths shorter than about 600 nm and emit radiation at about 695 nm, which then excites UD930 to emit radiation at about 950 nm. It is believed that such enhancements can also derive from surface roughness and high reflectivity at 950 nm of the alumina-based ceramic substrate, which promote reflection of radiation back towards UD930.

Example 2

Formation of Resonant Cavity Structure

Bonded Samples

Figure 17:
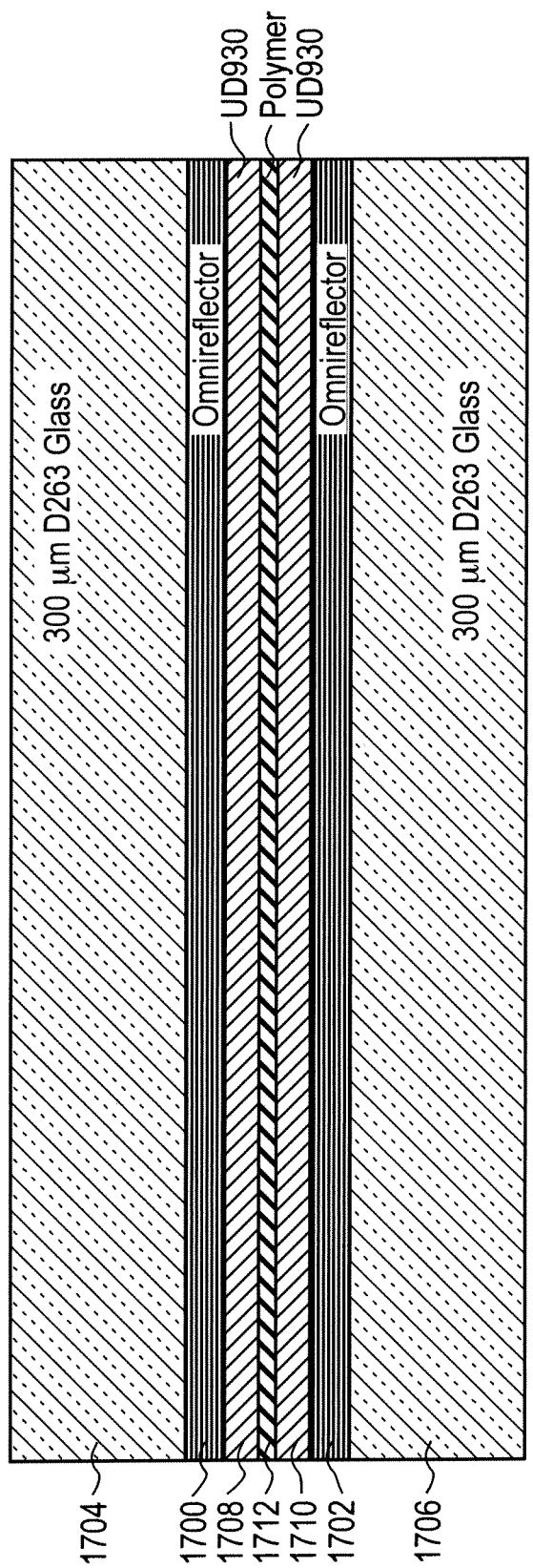
FIG. 17 illustrates a sample of a resonant cavity structure formed in accordance with a bonding approach, according to an embodiment of the invention.

Samples of resonant cavity structures were formed in accordance with a bonding approach, as illustrated in FIG. 17. Certain aspects regarding manufacturing via a bonding approach are described in co-pending and co-owned U.S. Patent Application Ser. No. 61/146,595, entitled "Solar Modules Including Spectral Concentrators and Related Manufacturing Methods" and filed on Jan. 22, 2009, the disclosure of which is incorporated herein by reference in its entirety. A top reflector 1700 and a bottom reflector 1702 were formed adjacent to a top substrate layer 1704 (D263 glass substrate; 300 μm thickness) and a bottom substrate layer 1706 (D263 glass substrate; 300 μm thickness), respectively. ALD was used to form the reflectors 1700 and 1702, each of which included alternating layers of $SiO_2$ and $TiO_2$ for a total of 86 layers. Next, UD930 layers 1708 and 1710 were formed adjacent to the top reflector 1700 and the bottom reflector 1702, respectively, by coating or depositing a set of reactants that are precursors of UD930. In particular, tin chloride and cesium iodide were evaporated in sequential layers, for a total of 4 layers and a total thickness of about 750 nm adjacent to each of the top reflector 1700 and the bottom reflector 1702. The coatings of the reactants were next subjected to annealing at about 185° C. on a hot plate in air. A bonding layer 1712 was formed adjacent to one of the resulting UD930 layers 1708 and 1710 by spin-coating a polymer for a thickness in the range of about 0.5 μm to about 30 μm. The assembly of layers was then subjected to bonding with heat and pressure so as to form a substantially monolithic, bonded structure.

Example 3

Characterization of Resonant Cavity Structure

Bonded Samples

Photoluminescence measurements were performed on bonded samples in accordance with an experimental set-up described as follows. Each bonded sample was placed in a sample holder, and a top surface of the bonded sample was excited with a laser source (10 mW), which directed an excitation spot with an area of about 1 $mm^2$ along a direction substantially normal to the top surface and having a wavelength of about 532 nm. Edge emissions were measured using a spectrometer.

Figure 18:
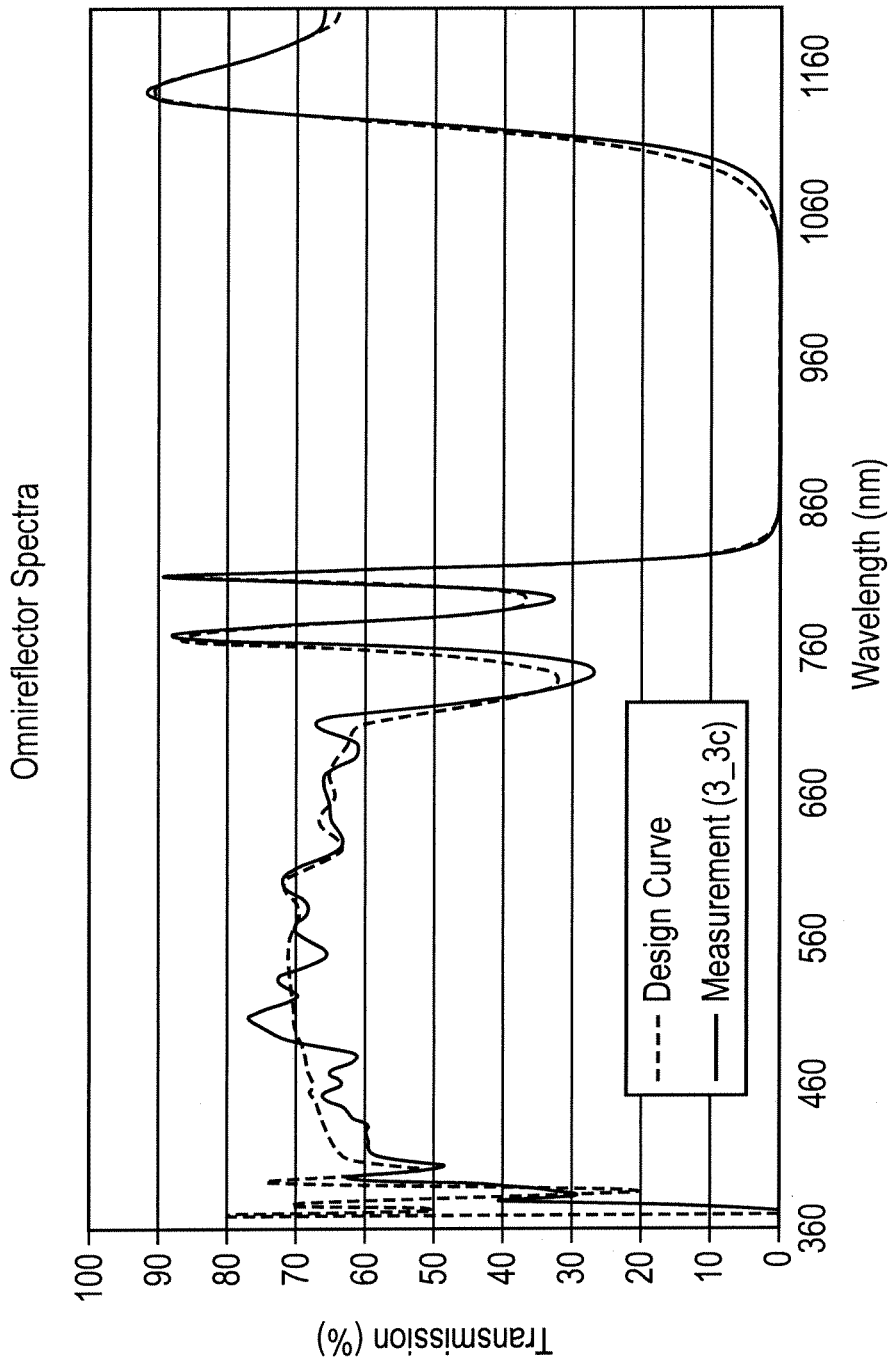
FIG. 18 illustrates a plot of transmittance of a reflector as a function of wavelength of light, according to an embodiment of the invention.

FIG. 18 illustrates a plot of transmittance of a reflector as a function of wavelength of light. As can be appreciated, the reflector has a stop band of relatively low transmittance (or relatively high reflectivity) centered around the peak emission wavelength of 950 nm, and a transmission band of relatively high transmittance (or relatively low reflectivity) outside of the stop band. Surface emissions were measured with respect to a top surface of the reflector, and no detectable surface emissions were observed at directions within a range of ±60° relative to a normal direction.

Example 4

Formation of Resonant Cavity Structure

Integrated Cavity Samples

Figure 19:
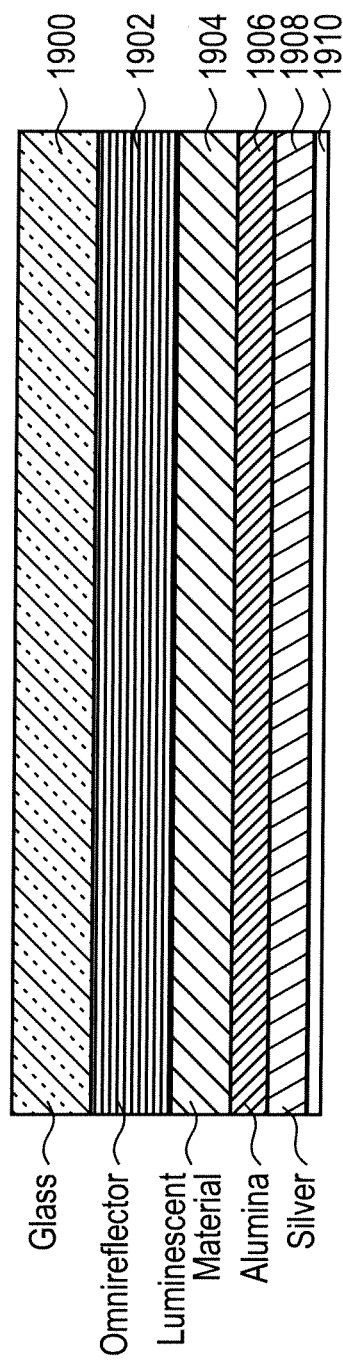
FIG. 19 illustrates a sample of a resonant cavity structure formed in accordance with an integrated cavity approach, according to an embodiment of the invention.

Samples of resonant cavity structures were formed in accordance with an integrated cavity approach, as illustrated in FIG. 19. In particular, various layers of an assembly of layers were sequentially formed adjacent to a glass substrate layer 1900. In the case of one sample, for example, ALD was used to form a reflector 1902 adjacent to the glass substrate layer 1900, and a UD930 layer 1904 was formed adjacent to the reflector 1902 by coating or depositing a set of reactants that are precursors of UD930. In particular, tin chloride and cesium iodide were evaporated in sequential layers, for a total of 6 layers and with a thickness of tin chloride of about 60 nm by thermal evaporation and a thickness of cesium iodide of about 150 nm by electron-beam evaporation. An alumina layer 1906 with a thickness of about 100 nm was formed adjacent to the UD930 layer 1904 by electron-beam evaporation, and then a silver metal layer 1908 with a thickness of about 100 nm was formed adjacent to the alumina layer 1906 by electron-beam evaporation. Next, the silver metal layer 1908 was protected from oxidation by forming an aluminum layer 1910 with a thickness of about 250 nm by electron-beam evaporation. The assembly of layers was then subjected to annealing so as to form a substantially monolithic, integrated cavity waveguide.

Integrated cavity samples were generally thinner than counterpart bonded samples as previously described in Examples 2 and 3. Three different types of reflectors were used in the integrated cavity samples, and are designated as B-type, O-type, and J-type. These reflectors each has a stop band centered around 950 nm, but differed somewhat in spectral width of their stop bands and characteristics of their side lobes. Integrated cavity samples using these reflectors were observed to exhibit differences with respect to resulting photoluminescence characteristics.

Example 5

Characterization of Resonant Cavity Structure

Integrated Cavity Samples with B-type Reflectors

Photoluminescence measurements were performed on integrated cavity samples with B-type reflectors in accordance with an experimental set-up similar to that of Example 3.

Figure 20:
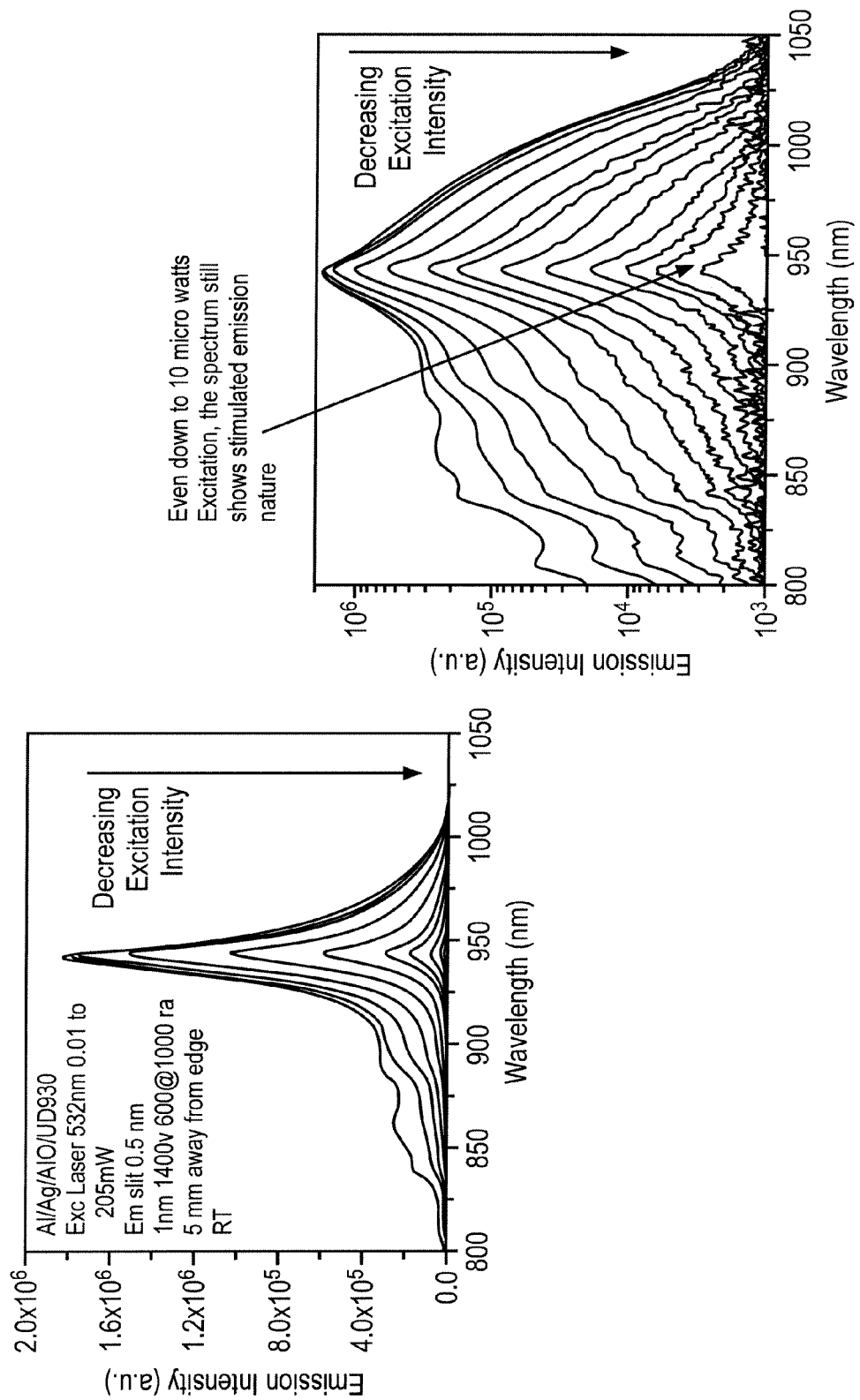
FIG. 20 illustrates superimposed plots of edge emission spectra as a function of excitation power, according to an embodiment of the invention.

FIG. 20 illustrates superimposed plots of edge emission spectra for one sample as a function of excitation power in the range of about 0.01 mW to about 205 mW. As can be appreciated, the emission spectra are indicative of stimulated emission, which was observed even with an excitation power down to about 0.01 mW and a corresponding excitation intensity down to about 1 mW cm$^{-2}$. The low excitation intensities for stimulated emission are indicative of a low lasing threshold associated with a polariton laser.

Figure 21:
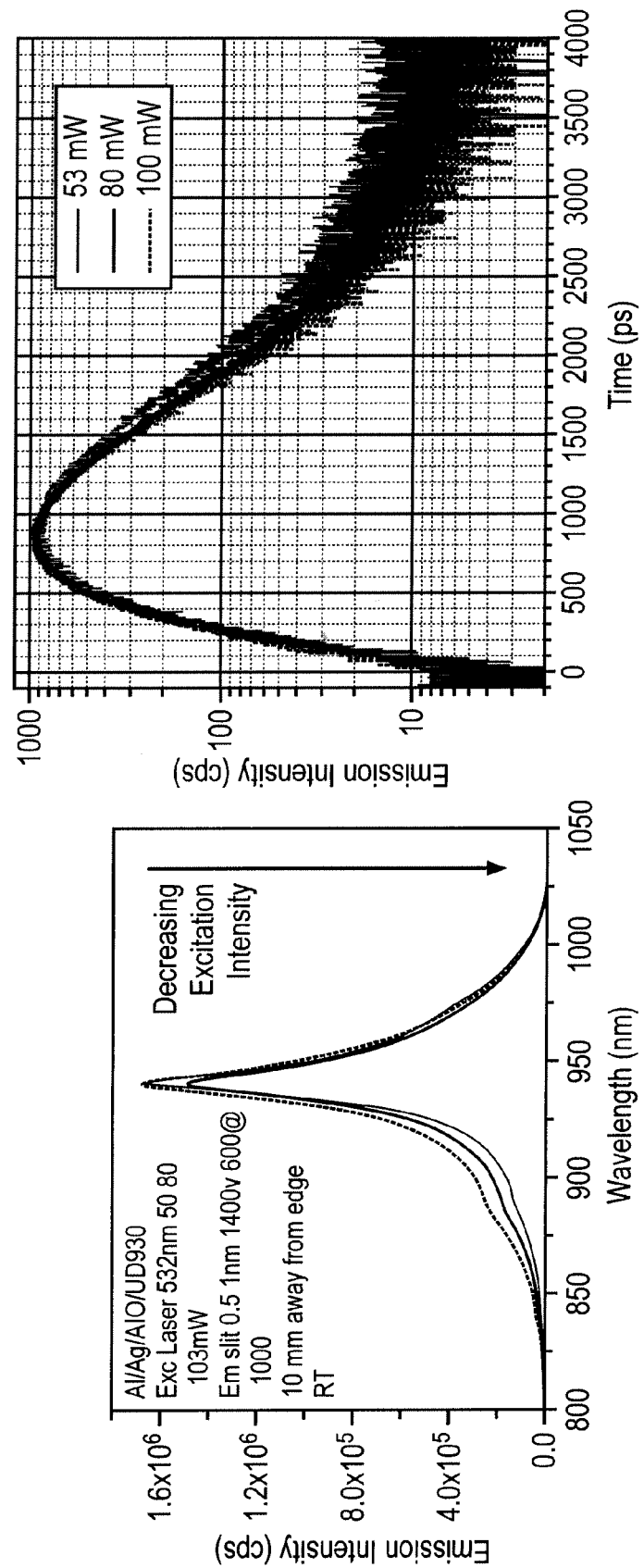
FIG. 21 illustrates superimposed plots of edge emission spectra for various excitation powers and superimposed plots of edge emission intensities as a function of time, according to an embodiment of the invention.

FIG. 21 illustrates superimposed plots of edge emission spectra for excitation powers of about 50 mW, about 80 mW, and about 100 mW. Again, the emission spectra are indicative of stimulated emission and a low lasing threshold associated with a polariton laser. FIG. 21 also illustrates superimposed plots of edge emission intensities as a function of time, with the origin corresponding to a start of excitation. As can be appreciated, a photoluminescence lifetime or a radiative lifetime typically corresponds to a time interval between a peak value in emission intensity to a (1/e) value as the emission intensity decays from its peak value. As illustrated in FIG. 21, radiative lifetimes were observed to be about 100 psec or less. These short radiative lifetimes are again indicative of a polariton laser.

Figure 22:
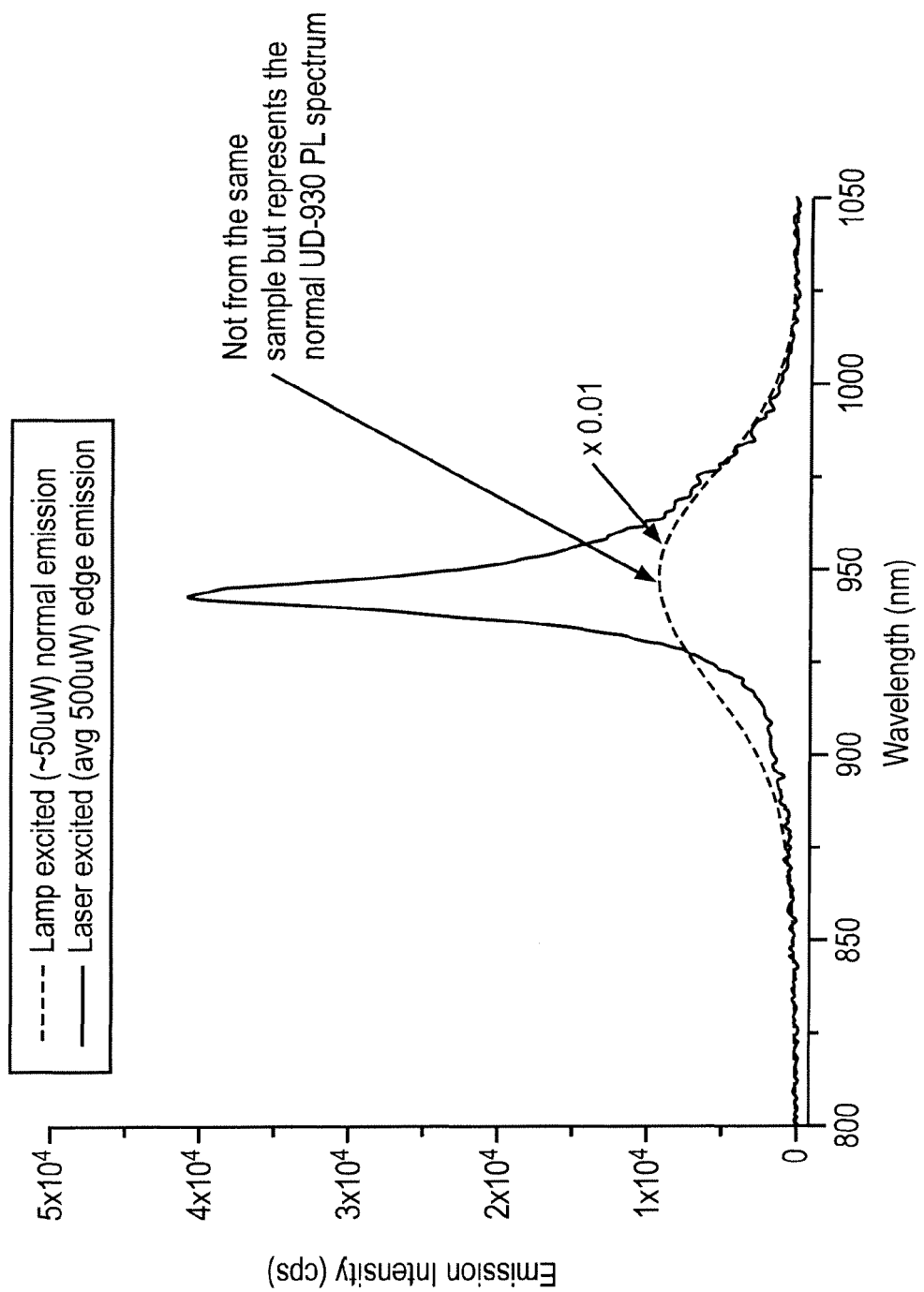
FIG. 22 illustrates superimposed plots of an edge emission spectrum for UD930 when incorporated within an integrated cavity sample and a typical emission spectrum for UD930 in the absence of resonant cavity effects, according to an embodiment of the invention.

FIG. 22 illustrates superimposed plots of an edge emission spectrum for UD930 when incorporated within an integrated cavity sample and a typical emission spectrum for UD930 in the absence of resonant cavity effects. As can be appreciated, incorporation of UD930 within the integrated cavity sample yields a narrowing of its emission peak, which is again indicative of a polariton laser.

Figure 23:
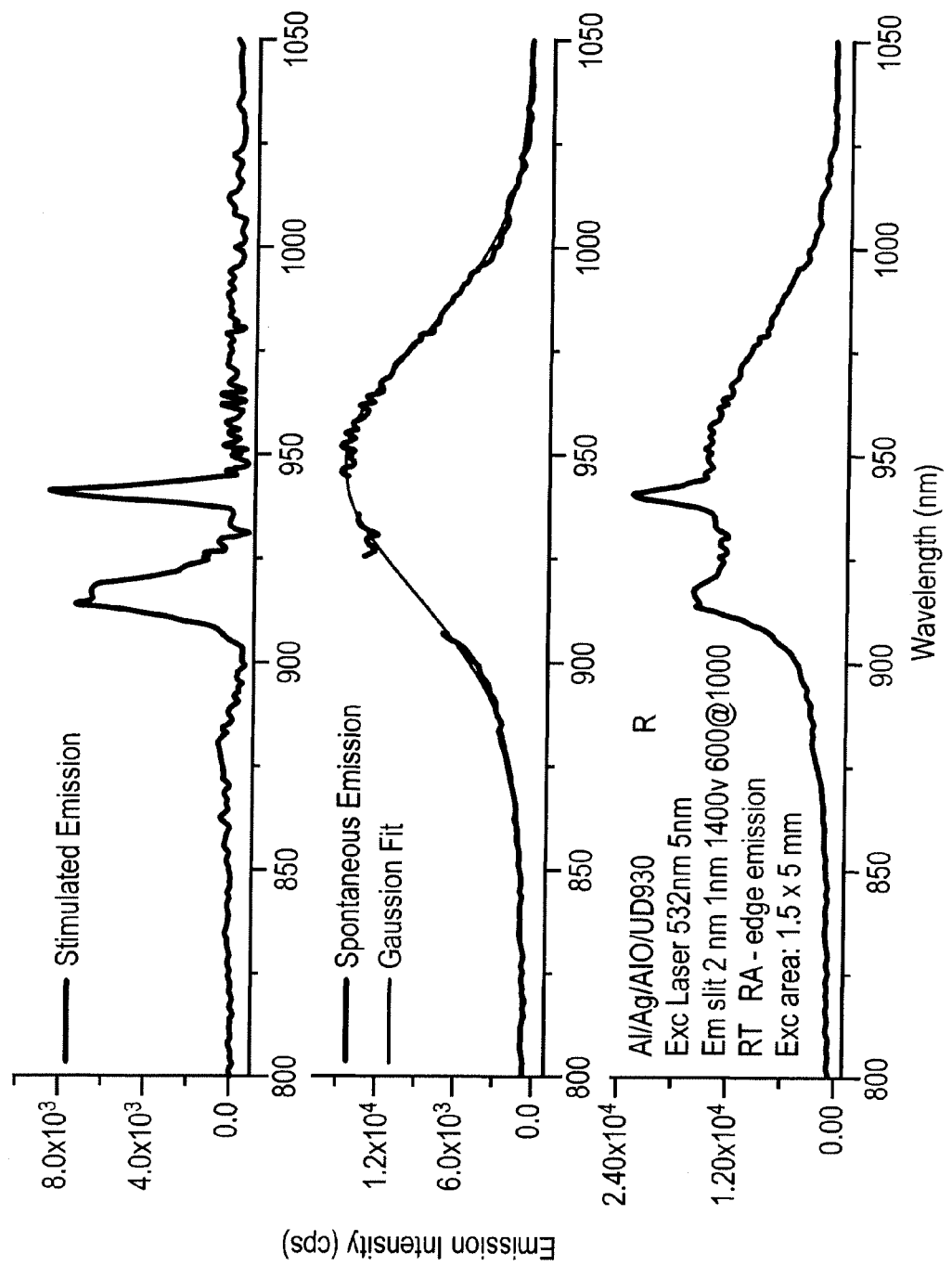
FIG. 23 illustrates an edge emission spectrum for UD930 when incorporated within an integrated cavity sample and when excited with a white light source, according to an embodiment of the invention.

FIG. 23 illustrates an edge emission spectrum for UD930 when incorporated within an integrated cavity sample and when excited with a white light source at an intensity of less than about 50 mW cm$^{-2}$ (lower plot). As can be appreciated, the emission spectrum can be represented as a combination of an emission spectrum associated with stimulated emission (upper plot) and an emission spectrum associated with spontaneous emission (middle plot). The emission spectrum associated with stimulated emission exhibits a splitting of peaks that is indicative of Rabi splitting.

Example 6

Characterization of Resonant Cavity Structure

Integrated Cavity Samples with O-type Reflectors

Photoluminescence measurements were performed on integrated cavity samples with O-type reflectors in accordance with an experimental set-up similar to that of Example 3.

Figure 24:
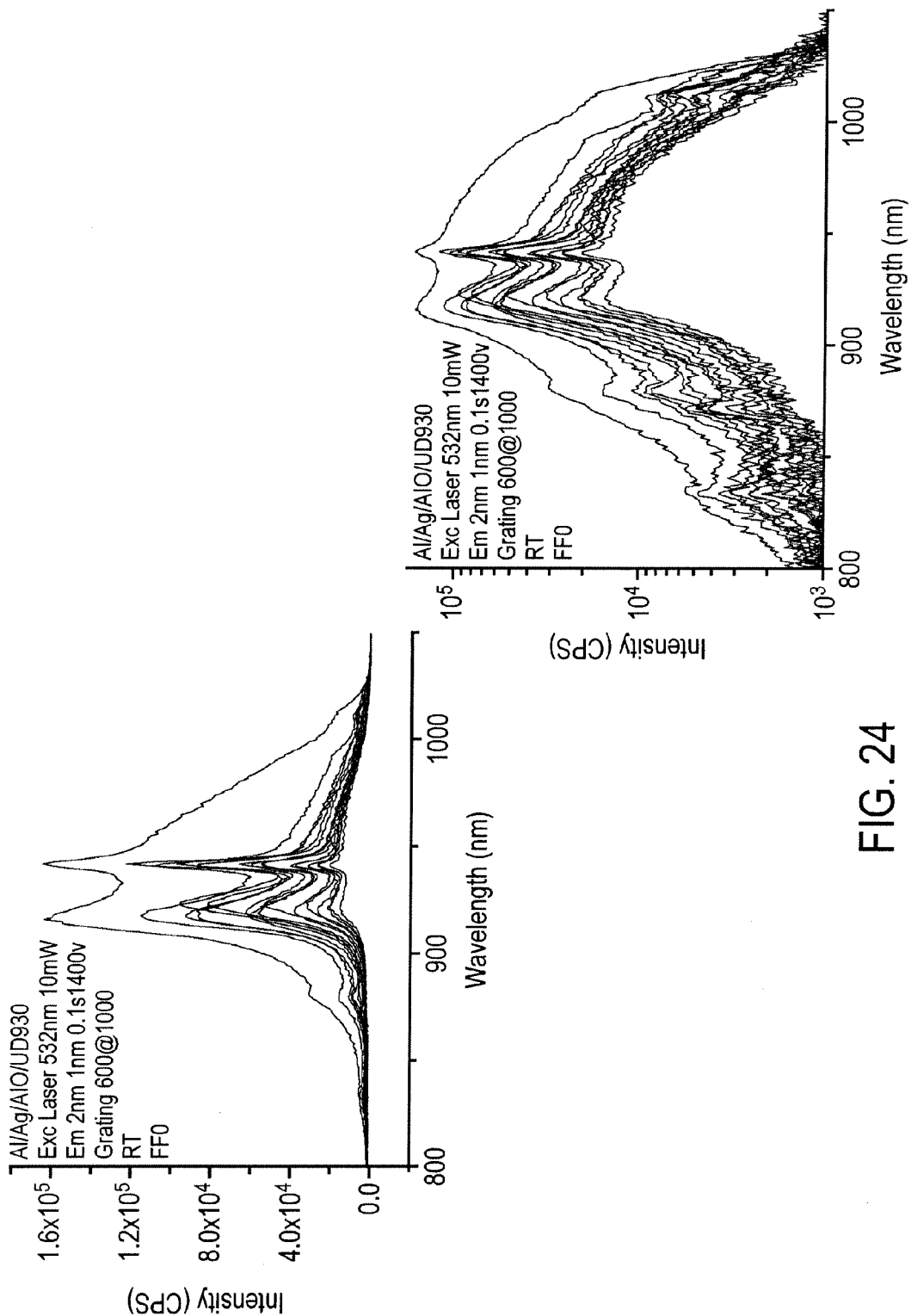
FIG. 24 illustrates superimposed plots of edge emission spectra, according to an embodiment of the invention.

FIG. 24 illustrates superimposed plots of edge emission spectra for one sample. As can be appreciated, the emission spectra are indicative of stimulated emission, and the low excitation intensities for stimulated emission are indicative of a low lasing threshold associated with a polariton laser. As illustrated in FIG. 24, a splitting of peaks in the emission spectra is indicative of Rabi splitting and the presence of exciton-polaritons in a strong coupling regime.

Example 7

Characterization of Resonant Cavity Structure

Integrated Cavity Samples with J-type Reflectors

Photoluminescence measurements were performed on integrated cavity samples with J-type reflectors in accordance with an experimental set-up similar to that of Example 3.

Figure 25:
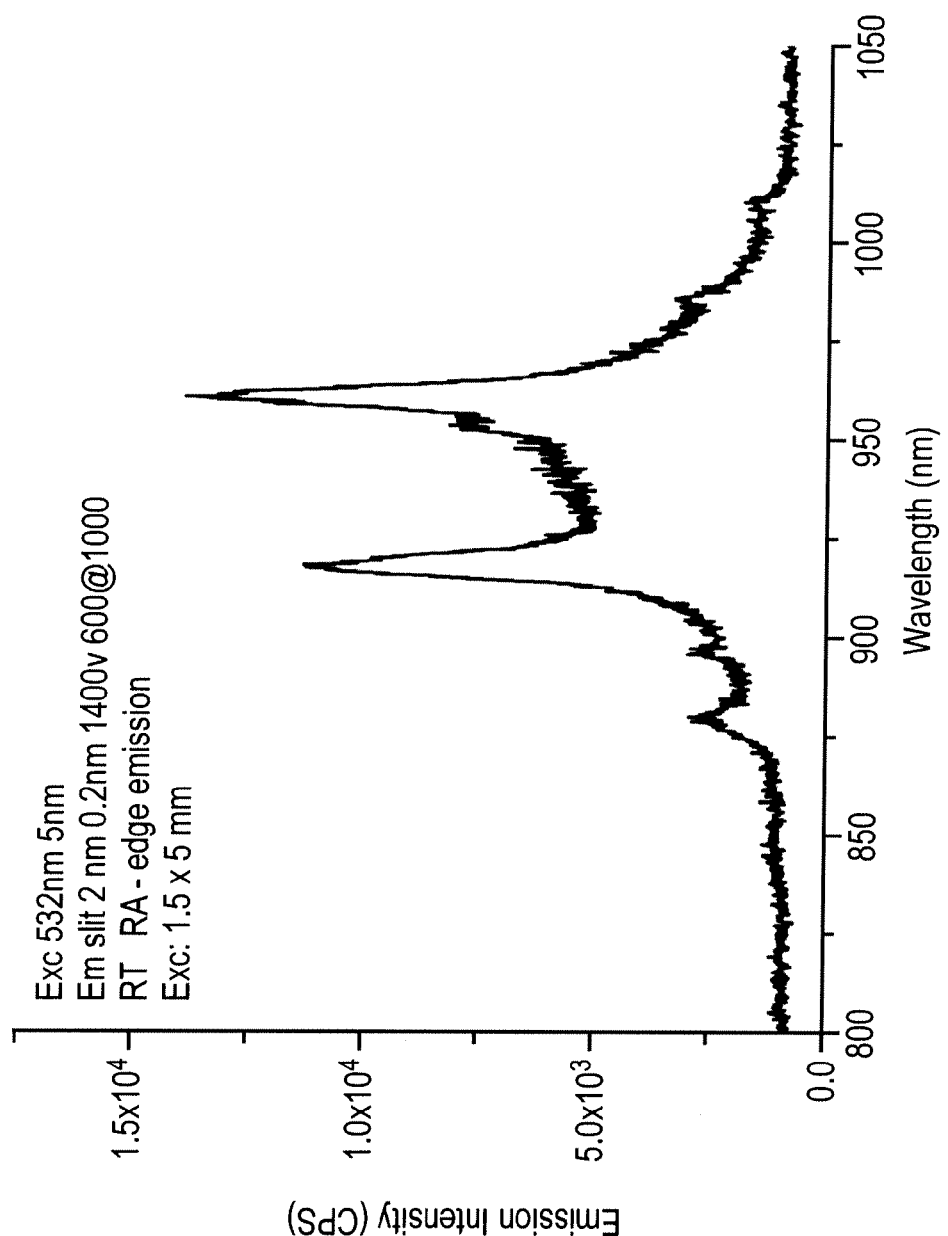
FIG. 25 illustrates an edge emission spectrum for UD930 when incorporated within another integrated cavity sample and when excited with a white light source, according to an embodiment of the invention.

FIG. 25 illustrates an edge emission spectrum for UD930 when incorporated within an integrated cavity sample and when excited with a white light source at an intensity of less than about 50 mW cm$^{-2}$. As can be appreciated, the emission spectrum exhibits a splitting of peaks that is indicative of Rabi splitting.

Example 8

Characterization of Resonant Cavity Structure

Resonant Cavity Effects

Figure 26:
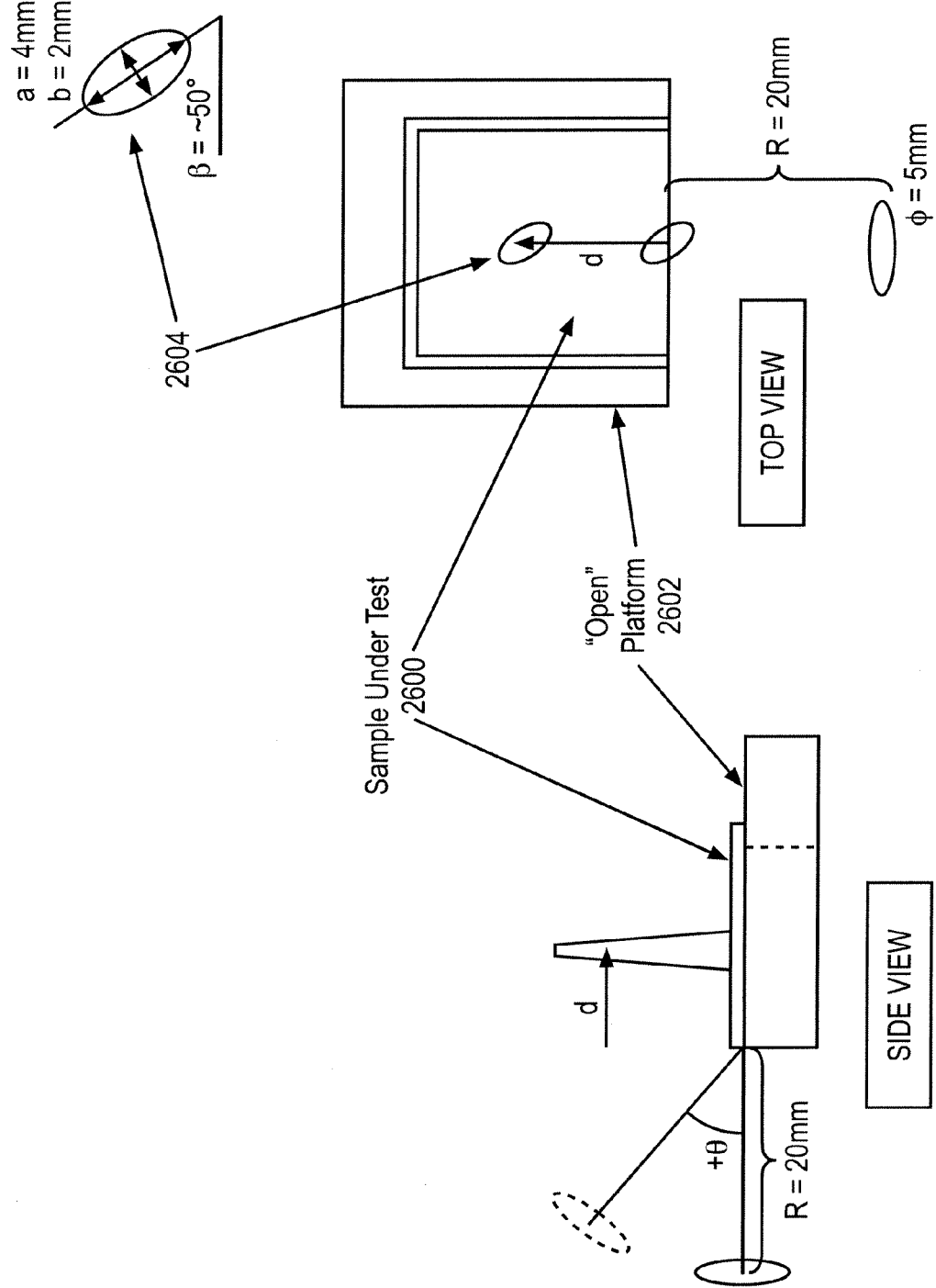
FIG. 26 illustrates an experimental set-up for performing photoluminescence measurements, according to an embodiment of the invention.

Photoluminescence measurements were performed on samples of spectral concentrators in accordance with an experimental set-up as illustrated in FIG. 26. Each sample 2600 was placed on a platform 2602, and a top surface of the sample 2600 was excited using a laser diode module, which directed an excitation spot 2604 with dimensions of about 4 mm by about 2 mm along a direction substantially normal to the top surface. The excitation spot 2604 was rotated by about 50° to account for an offset in the laser diode module. Edge emissions were measured with respect to a distance d of the excitation spot 2604 from an edge of the sample 2600 and with respect to an angle θ relative to a horizontal plane of the sample 2600. The distance d was varied in the range of about 0 mm to about 10 mm in increments of about 0.25 mm, and was offset based on an amount R in terms of total beam-edge displacement. The angle θ was varied in the range of about −50° to about +70° in increments of about 2.5°, with positive values denoting angles above the horizontal plane, and with negative values denoting angles below the horizontal plane. Edge emissions were measured for each angle θ at an initial distance d, the sample 2600 was repositioned to a subsequent distance d, edge emissions were then measured for each angle θ at that subsequent distance d, and so forth.

Figure 27A:
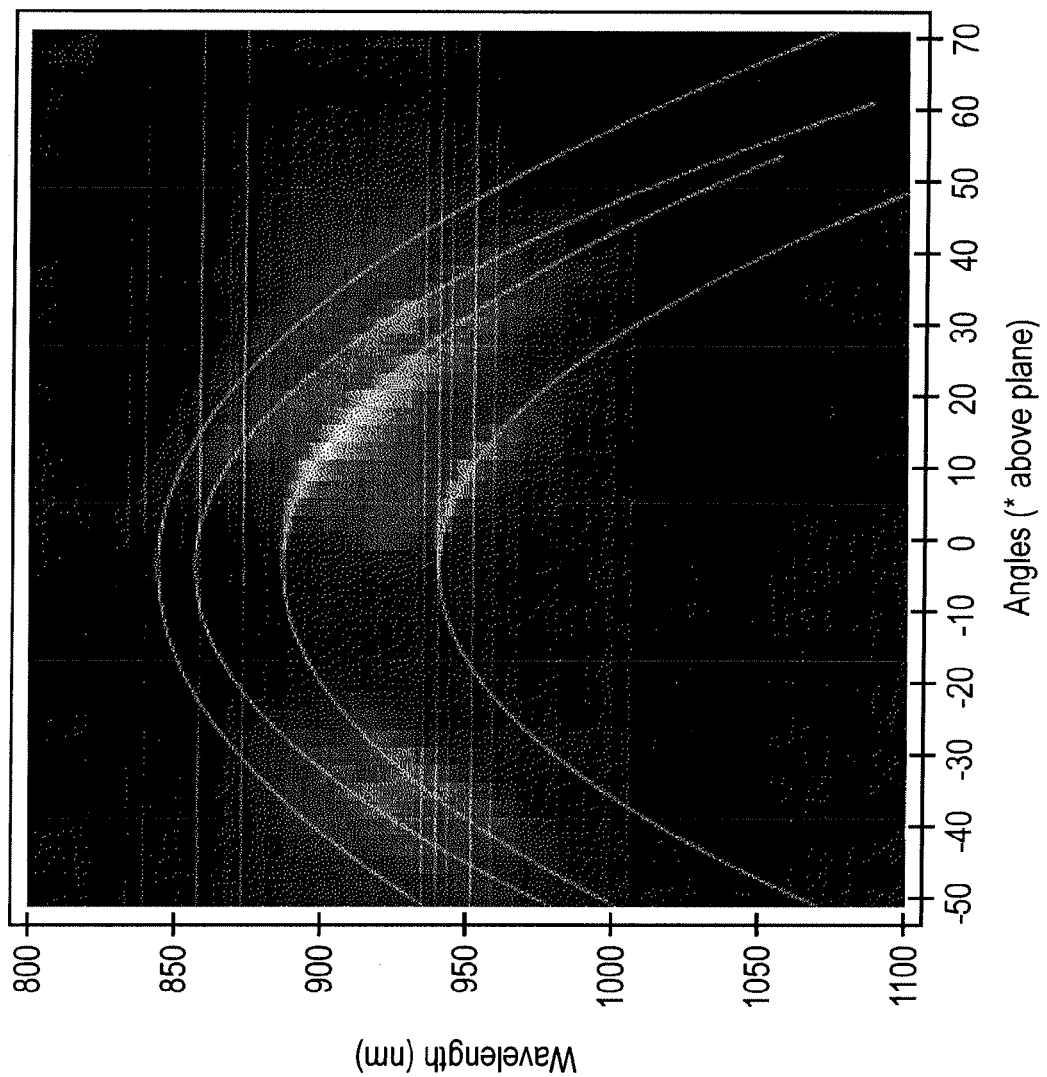
FIG. 27A through FIG. 27C illustrate plots of edge emission spectra in accordance with the experimental set-up of FIG. 38, according to an embodiment of the invention.
Figure 27B:
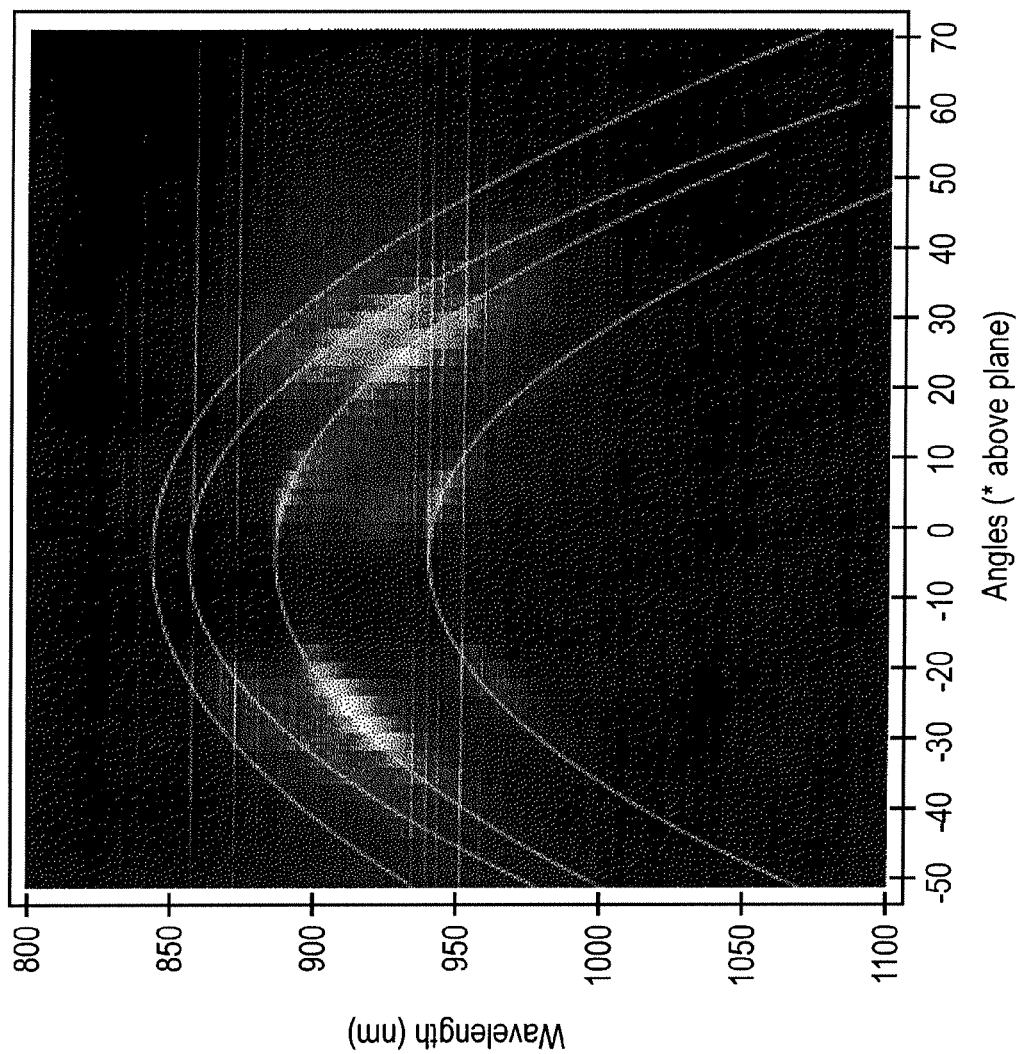
Figure 27C:
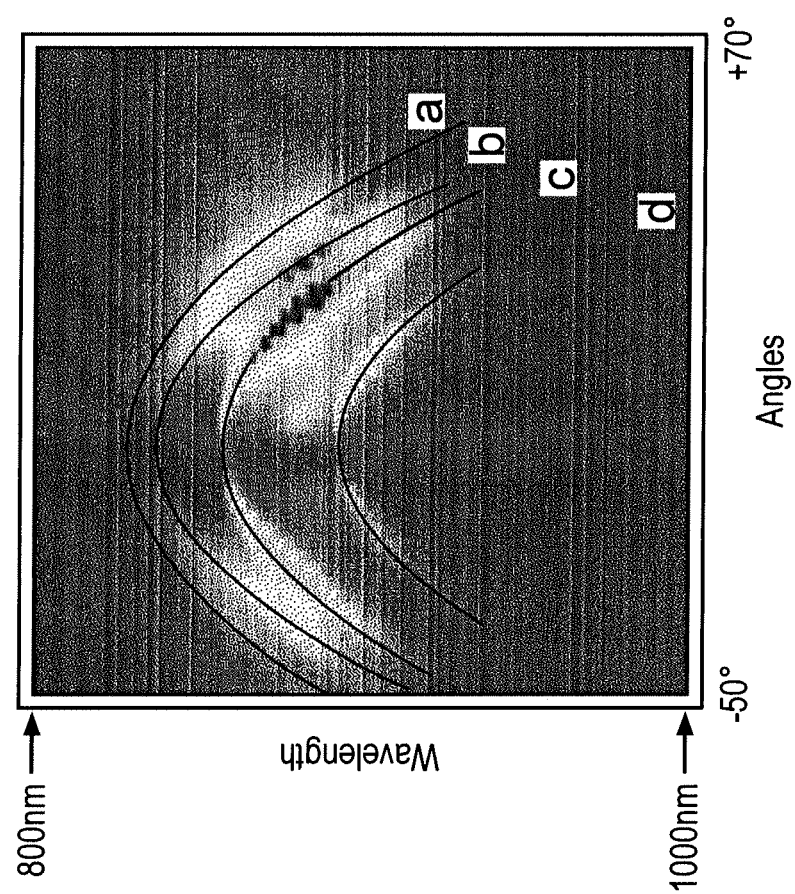

FIG. 27A illustrates a plot of edge emission spectra as a function of the angle θ and at a particular distance d, FIG. 27B illustrates a plot of edge emission spectra as a function of the angle θ and at another distance d, and FIG. 27C illustrates superimposed plots of edge emission spectra as a function of the angle θ and over all distances d. As can be appreciated, photoluminescence was manifested in the form of distinct bands of photoluminescence intensities, each band having an associated peak emission intensity that varies with the angle θ in accordance with a respective dispersion curve. In particular, at least four distinct bands were observed (labeled as "a," "b," "c," and "d"), and curve-fitting was carried out to yield the following parabolic dispersion curves: (1) $\lambda_a$(nm) =884+0.04128 θ(°)$^2$; (2) $\lambda_b$(nm)=857+0.05504 θ(°)$^2$; (3) $\lambda_c$(nm)=887+0.05160 θ(°)$^2$; and (4) $\lambda_d$(nm)=941+0.05848 θ(°)$^2$. Without wishing to be bound by a particular theory, these bands of photoluminescence intensities and their associated dispersion curves are indicative of distinct optical modes that propagate emitted radiation within a resonant cavity waveguide.

It should be appreciated that the specific embodiments of the invention described above are provided by way of example, and that various other embodiments are contemplated. For example, while certain elements have been described with reference to some embodiments, it is contemplated that these elements may be implemented in other embodiments or may be combined, sub-divided, or re-ordered in a number of other ways.

A practitioner of ordinary skill in the art requires no additional explanation in developing the optical devices described herein but may nevertheless find some helpful guidance regarding resonant cavity effects and related structures by examining U.S. patent application Ser. No. 12/144,548 (U.S. Patent Application Publication No. 2009/0056791), entitled "Solar Modules with Enhanced Efficiencies via Use of Spectral Concentrators" and filed on Jun. 23, 2008, the disclosure of which is incorporated herein by reference in its entirety.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

What is claimed is:

1. An electro-optical device comprising:
an outer electrode layer;
an inner electrode layer; and
an emission layer disposed between the outer electrode layer and the inner electrode layer, the emission layer including an electroluminescent material having the formula:

$[A_a B_b X_x]$,

A is selected from potassium, rubidium, and cesium;
B is selected from germanium, tin, and lead;
X is selected from chlorine, bromine, and iodine;
a is in the range of 1 to 9;
b is in the range of 1 to 5; and
x is equal to a+2b,
further comprising a reflector including a dielectric stack, and wherein the outer electrode layer defines an aperture, and the reflector is disposed within the aperture.

2. The electro-optical device of claim 1, wherein a is 1, and x is equal to 1+2b.

3. The electro-optical device of claim 2, wherein B is tin.

4. The electro-optical device of claim 3, wherein the electroluminescent material is at least one of n-doped and p-doped.

5. The electro-optical device of claim 1, wherein the electroluminescent material is configured to emit radiation in response to an electrical excitation applied through the outer electrode layer and the inner electrode layer, and the reflector has partial reflectivity with respect to the emitted radiation, such that at least a fraction of the emitted radiation passes through the reflector.

6. An electro-optical device comprising:
an outer electrode layer;
an inner electrode layer; and
a middle layer disposed between the outer electrode layer and the inner electrode layer, the middle layer including a material having the formula:

$[A_a B_b X_x X'_{x'} X''_{x''}]$,

A is cesium;
B is tin;
X, X', and X" are independently selected from fluorine, chlorine, bromine, and iodine;
a is in the range of 1 to 9;
b is in the range of 1 to 5; and
a sum of x, x', and x" is in the range of 1 to 9,
further comprising a reflector including a dielectric stack, and wherein the outer electrode layer defines an aperture, and the reflector is disposed within the aperture.

7. The electro-optical device of claim 6, wherein a is in the range of 1 to 5.

8. The electro-optical device of claim 6, wherein a is 1.

9. The electro-optical device of claim 6, wherein b is in the range of 1 to 3.

10. The electro-optical device of claim 6, wherein the sum of x, x', and x" is in the range of 1 to 5.

11. The electro-optical device of claim 6, wherein the material is at least one of n-doped and p-doped.

12. The electro-optical device of claim 6, wherein at least one of the outer electrode layer and the inner electrode layer includes a metal.

* * * * *